(12) United States Patent
Peffers et al.

(10) Patent No.: US 10,761,877 B2
(45) Date of Patent: Sep. 1, 2020

(54) APPARATUSES, METHODS, AND SYSTEMS FOR BLOCKCHAIN TRANSACTION ACCELERATION

(71) Applicant: Intel Corporation, Santa Clara, CA (US)

(72) Inventors: Simon N. Peffers, Acton, MA (US); Sean M. Gulley, Boston, MA (US)

(73) Assignee: INTEL CORPORATION, Santa Clara, CA (US)

( * ) Notice: Subject to any disclaimer, the term of this patent is extended or adjusted under 35 U.S.C. 154(b) by 26 days.

(21) Appl. No.: 15/884,259

(22) Filed: Jan. 30, 2018

(65) Prior Publication Data

US 2019/0026146 A1 Jan. 24, 2019

Related U.S. Application Data

(60) Provisional application No. 62/535,799, filed on Jul. 21, 2017.

(51) Int. Cl.
*G06F 9/46* (2006.01)
*G06F 9/50* (2006.01)
(Continued)

(52) U.S. Cl.
CPC .......... *G06F 9/466* (2013.01); *G06F 9/5044* (2013.01); *G06F 2209/509* (2013.01);
(Continued)

(58) Field of Classification Search
None
See application file for complete search history.

(56) References Cited

U.S. PATENT DOCUMENTS 6,665,297 B1 12/2003 Hariguchi et al.
8,924,741 B2 12/2014 Wolrich et al.
(Continued)

FOREIGN PATENT DOCUMENTS

WO 2010039167 A1 4/2010
WO 2012141677 A1 10/2012

OTHER PUBLICATIONS

Bernstein D.J., et al., "ChaCha, a Variant of Salsa20," National Science Foundation, M/C 249, Jan. 28, 2008, 6 pages.
(Continued)

*Primary Examiner* — Eric C Wai
(74) *Attorney, Agent, or Firm* — Nicholson De Vos Webster & Elliott LLP

(57) ABSTRACT

Methods and apparatuses relating to accelerating blockchain transactions are described. In one embodiment, a processor includes a hardware accelerator to execute an operation of a blockchain transaction, and the hardware accelerator includes a dispatcher circuit to route the operation to a transaction processing circuit when the operation is a transaction operation and route the operation to a block processing circuit when the operation is a block operation. In another embodiment, a processor includes a hardware accelerator to execute an operation of a blockchain transaction; and a network interface controller including a dispatcher circuit to route the operation to a transaction processing circuit of the hardware accelerator when the operation is a transaction operation and route the operation to a block processing circuit of the hardware accelerator when the operation is a block operation.

24 Claims, 24 Drawing Sheets

(51) Int. Cl.
H04L 9/08 (2006.01)
H04L 9/30 (2006.01)
H04L 9/32 (2006.01)

(52) U.S. Cl.
CPC .............. H04L 9/0894 (2013.01); H04L 9/30 (2013.01); H04L 9/3236 (2013.01); H04L 9/3252 (2013.01)

(56) References Cited

U.S. PATENT DOCUMENTS

| | | | |
|---|---|---|---|
| 9,223,392 | B2 | 12/2015 | Sood |
| 9,912,479 | B1 | 3/2018 | Yamada |
| 2003/0059045 | A1 | 3/2003 | Ruehle |
| 2007/0283349 | A1 | 12/2007 | Creamer et al. |
| 2016/0352870 | A1 | 12/2016 | Manapragada et al. |
| 2017/0236123 | A1* | 8/2017 | Ali ...................... G06Q 20/401 705/75 |
| 2018/0006808 | A1 | 1/2018 | Suresh et al. |
| 2018/0205536 | A1 | 7/2018 | Tomlinson |
| 2018/0212761 | A1 | 7/2018 | Bilgin et al. |
| 2018/0352033 | A1* | 12/2018 | Pacella ................. H04L 9/3239 |

OTHER PUBLICATIONS

Brown, "SEC 1: Elliptic Curve Cryptography," Standards for Efficient Cryptography, Certicom Research, Version 2.0, May 21, 2009, 144 pages.
Consensys, "Blockchain Underpinnings: Hashing," Medium, Jan. 13, 2016, downloaded from medium.com/@ConsenSys/blockchain-underpinnings-hashing-7f4746cbd66b on Jul. 25, 2017, 9 pages.
Extended European Search Report for Application No. 18178661.7, dated Nov. 14, 2018, 10 pages.
IBM Blockchain, "IBM Blockchain—Blockchain Solutions," Try IBM Blockchain on Bluemix, downloaded from www.ibm.com/blockchain/offerings.html on Jul. 26, 2017, 4 pages.
IBM corporation, "IBM z Systems: IBM z Systems is the Platform of Choice for Blockchain," IBM System group, 2016, downloaded from www-01.ibm.com/common/ssi/cgi-bin/ssialias?subtype=PS&infotype=SA&htmlfid=ZSP04578USEN&attachment=ZSP04578USEN.PDF, 14 pages.
IBM z Systems, "IBM Blockchain on z Systems," Blockchain transactions on Z, downloaded from www-03.ibm.com/systems/z/solutions/blockchain-transactions/ on Jul. 26, 2017, 5 pages.
Intel® Architecture, "Instruction Set Extensions and Future Features Programming Reference," 319433-034, May 2018, 145 pages.
Intel, "Intel® 64 and IA-32 Architectures Software Developer Manuals," Oct. 12, 2016, 19 pages.

Jeni, "How Might We Use Blockchains Outside Cryptocurrencies?," May 21, 2015, downloaded from www.ienitennison.com/2015/05/21/blockchain.html on Jul. 25, 2017, 9 pages.
Panneerselvam S., et al., "Rinnegan: Efficient Resource Use in Heterogeneous Architectures," Parallel Architectures and Compilation, PACT'16, Sep. 2016, pp. 373-386.
RFC 7539: Nir Y., et al., "ChaCha20 and Poly1305 for IETF Protocols," Internet Research Task Force (IRTF), Request for Comments: 7539, May 2015, 46 pages.
RFC 7693: Saarinen M.J., et al., "The BLAKE2 Cryptographic Hash and Message Authentication Code (MAC)," Independent Submission, Request for Comments: 7693, Nov. 2015, 31 pages.
Schutzer D., "CTO Corner: What is a Blockchain and why is it important?," BITS, Financial Services Roundtable, Jan. 14, 2016, downloaded from www.fsroundtable.org/cto-corner-what-is-a-blockchain-and-why-is-it-important/ on Jul. 25, 2017, 12 pages.
Sean, "If You Understand Hash Functions, You'll Understand Blockchains," Nov. 29, 2016, downloaded from decentralize.today/if-you-understand-hash-functions-youll-understand-blockchains-9088307b745d on Jul. 25, 2017, 5 pages.
Wikipedia, "Blockchain," downloaded from en.wikipedia.org/wiki/Blockchain on Jul. 25, 2017, 8 pages.
Wikipedia, "Encryption," downloaded from en.wikipedia.org/wiki/Encryption on Mar. 21, 2018, 4 pages.
At N., et al., "Compact Hardware Implementations of ChaGha, Blake, Threefish, and Skein on FPGA" Feb. 2014, IEEE Transactions on Circuits and Systems-I: Regular Papers, vol. 61, No. 2, 14 Pages.
Extended European Search Report for Application No. EP19160418.0, dated Aug. 27, 2019, 7 pages.
Henzen L., et al., "VLSI Characterization of the Cryptographic Hash Function BLAKE," IEEE Transactions on Very Large Scale Integration (VLSI) Systems, XP011371273, Oct. 31, 2011, vol. 19, No. 10, pp. 1746-1754.
Henzen L., et al., "VLSI Hardware Evaluation of the Stream Ciphers Salsa20 and ChaCha, and the Compression Function Rumba," 2nd International Conference on Signals, Circuits and Systems, XP031405857, Nov. 7, 2008, 5 pages.
Non-Final office action from U.S. Appl. No. 15/943,654, dated Sep. 11, 2019, 18 pages.
Tillich S., et al., "Compact Hardware Implementations of the SHA-3 Candidates Arirang, Blake, Grostl, and Skein," International Association for Cryptologic Research, XP061003497, Jul. 14, 2009, vol. 20090718:044612, 6 pages.
Wikipedia, "ChaCha Variant" retrieved from en.wikipedia.org/wiki/Salsa20, on Sep. 3, 2019, 3 Pages.
Notice of Allowance, U.S. Appl. No. 15/943,654, dated Feb. 26, 2020, 9 pages.
Non-Final Office Action, U.S. Appl. No. 16/147,652, dated Jun. 2, 2020, 6 pages.

* cited by examiner

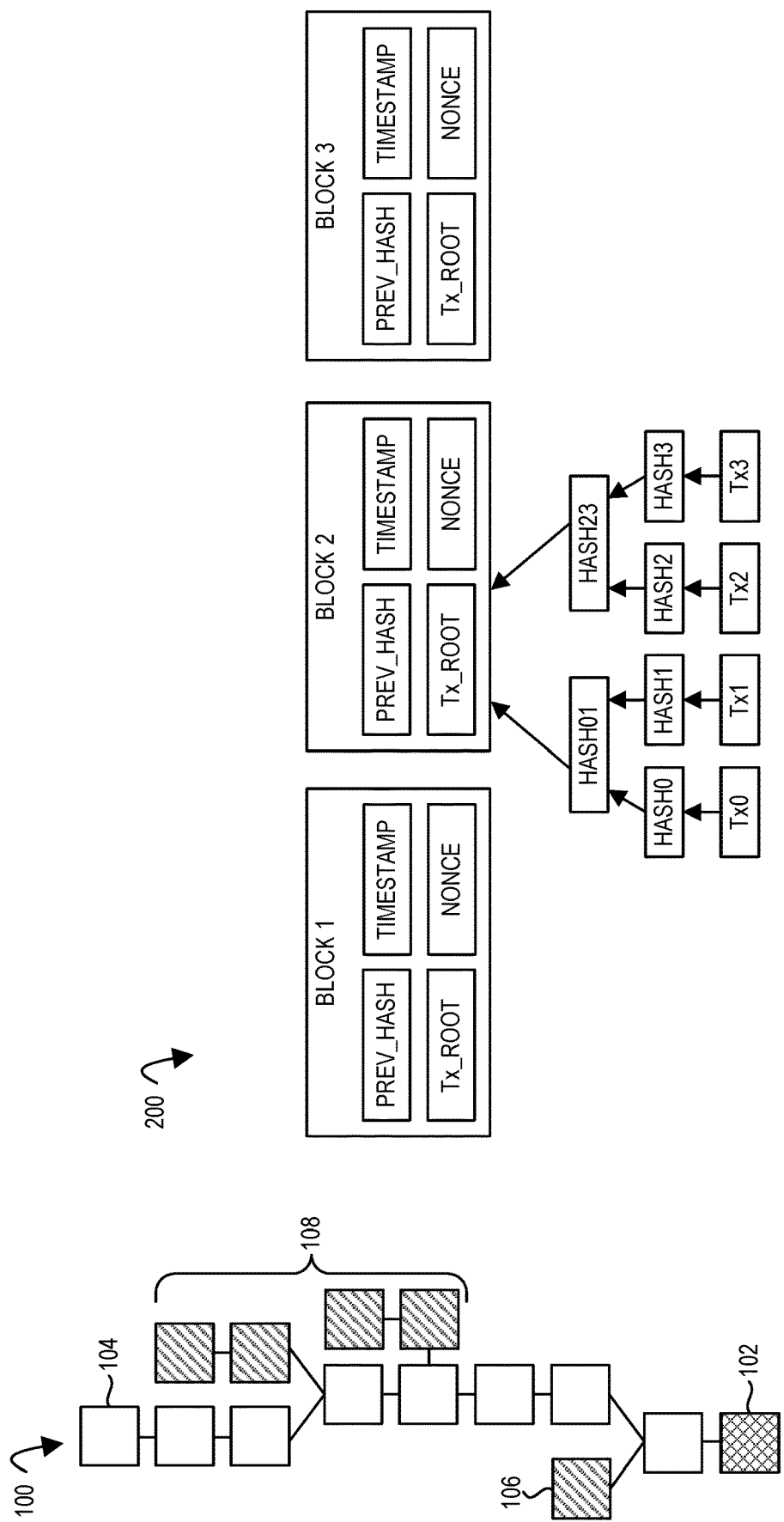

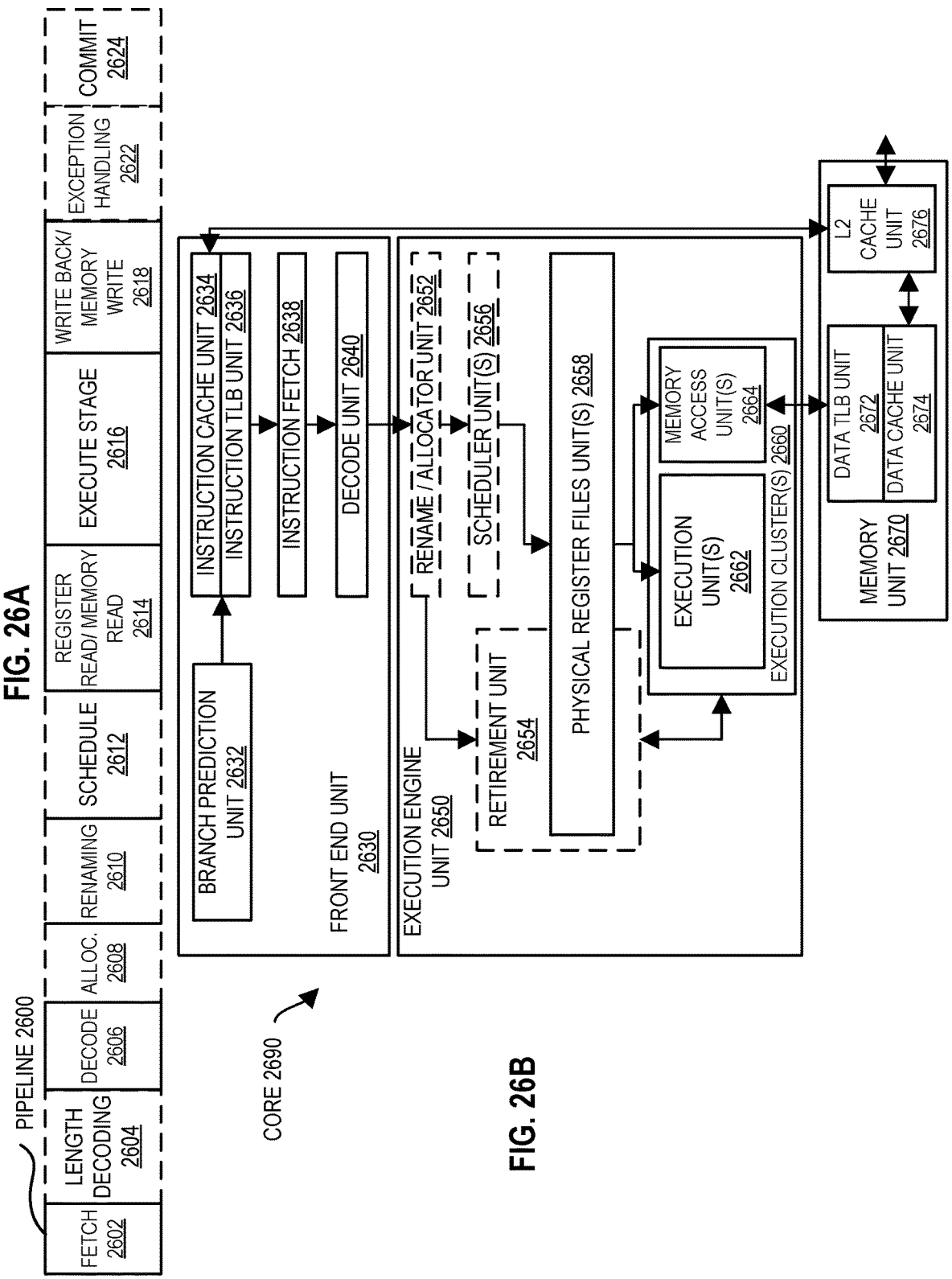

US 10,761,877 B2

APPARATUSES, METHODS, AND SYSTEMS FOR BLOCKCHAIN TRANSACTION ACCELERATION

CROSS-REFERENCE TO RELATED APPLICATIONS

The present patent application claims the benefit of U.S. Provisional Patent Application No. 62/535,799, filed Jul. 21, 2017, and titled: "Apparatuses, Methods, and Systems for Blockchain Transaction Acceleration", which is incorporated herein by reference in its entirety.

TECHNICAL FIELD

The disclosure relates generally to electronics, and, more specifically, an embodiment of the disclosure relates to a hardware circuitry for blockchain transaction acceleration.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 1 illustrates an example blockchain according to embodiments of the disclosure.

FIG. 2 illustrates an example blockchain according to embodiments of the disclosure.

FIG. 26A is a block diagram illustrating both an exemplary in-order pipeline and an exemplary register renaming, out-of-order issue/execution pipeline according to embodiments of the disclosure.

FIG. 26B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 3:
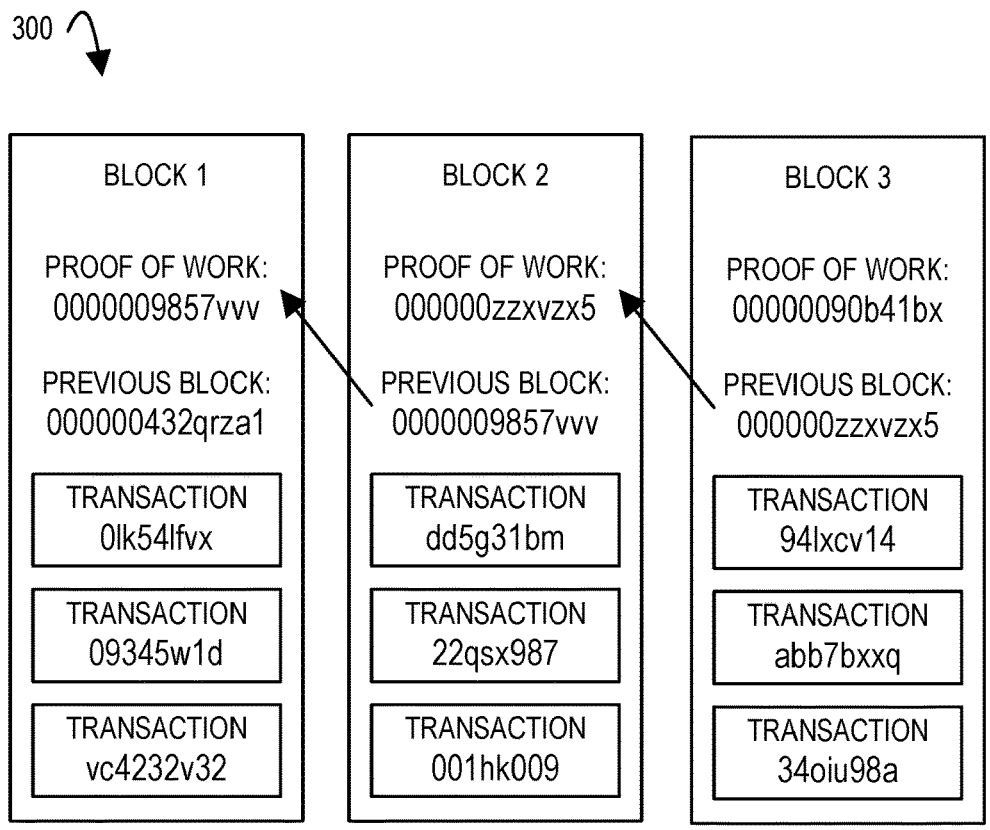
FIG. 3 illustrates an example blockchain according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions. In one embodiment, a processor is coupled to one or a plurality of (e.g., on die) accelerators (e.g., offload engines) to perform one or more (e.g., offloaded) operations, for example, instead of those operations being performed only on the processor. In one embodiment, a processor (e.g., central processing unit (CPU)) includes (e.g., on die) accelerators (e.g., offload engines) to perform one or more operations, for example, instead of those operations being performed only on the processor. Certain embodiments herein provide for circuitry (e.g., hardware accelerator) for blockchain transaction (e.g., blockchain operation) acceleration. Circuitry (e.g., hardware accelerator) for blockchain transactions may accelerate blockchain hashing, signing, and security, or other operation or operations (e.g., not including blockchain hashing, signing, or security). In one embodiment, an accelerator processes data independently from a processor core or cores.

Blockchain is a strategic emerging workload that is still early from a technology readiness and deployment perspective. Blockchain is an emerging technology which may have the potential to disrupt on the scale of the internet itself. While blockchain technology may very well have a lot of future promise, its implementation today comes with limitations that severely restrict the ways in which it may be applied, for example, transaction rates may be limited to about 4 per second for a Bitcoin type of blockchain implementation, while some other blockchain implementations may be limited to about 2, 3, 4, 5, 6, 7, 8, 9, 10's, 100 s, or 1000's of transactions per second. Certain embodiments herein may scale to a higher number of transactions, e.g., more than about 50,000 transactions per second or more than about 100,000 transactions per second. Certain embodiments herein allow for blockchain utilization (e.g., processing) to become production worthy in enterprise settings, e.g., by efficiently scaling to much higher transaction processing rates than possible previously. Certain embodiments herein provide for acceleration techniques (e.g., hardware accelerator, network interface circuit (NIC) and/or a dispatcher) to improve performance around blockchain transaction processing latency and throughput. Certain embodiments herein provide for hardware and combined hardware/software based techniques. Although certain of the discussion herein may apply to current blockchain implementation, it should not be so limited and use with future blockchain implementation(s) is foreseen. Certain embodiments herein provide for blockchain acceleration to reduce cost, improve efficiency, disintermediate, etc.

A blockchain at a high level may be viewed as a chain of blocks, for example, where each block contains a reference to the previous block(s) in the chain and may include some additional information, e.g., as discussed further below. A blockchain may generally be a distributed database that is used to maintain a continuously growing list of records, called blocks. Each block contains a timestamp and a link to a previous block in one embodiment. A blockchain (e.g., blockchain data structure) may be managed by a peer-to-peer network collectively adhering to a protocol for validating new blocks. By design, blockchains are inherently resistant to modification of the data. Once recorded, in certain embodiments, the data in any given block cannot be altered retroactively without the alteration of all subsequent blocks and a collusion of the network majority. Functionally, a blockchain may serve as an open, distributed ledger that can record transactions between two parties efficiently and in a verifiable and permanent way. The ledger itself can also be programmed to trigger transactions, e.g., automatically. Blockchains may be utilized for the recording of events, medical records, and other records management activities, such as, but not limited to, identity management, transaction processing (e.g., financial transactions), and documenting provenance. In one embodiment, a financial transaction is transferring something (e.g., a Bitcoin) from a first party to a second party.

Turning now to the Figures, FIG. 1 illustrates an example blockchain 100 according to embodiments of the disclosure. Each block may include one or more records, e.g., transactions. Each block may include batches of valid transactions that are hashed and encoded. Each block may include the hash of the prior block in the blockchain, e.g., linking the two blocks. The main chain (eight unshaded boxes) in depicted blockchain 100 is the longest series of blocks from the genesis block 102 to the current block 104. Orphan blocks (106 and 108) exist outside of the main chain in blockchain 100.

FIG. 2 illustrates an example blockchain 200 according to embodiments of the disclosure. Each block in the blockchain 200 includes a reference to the previous block in the chain (e.g., Prev_Hash in FIG. 2) and some additional information which makes up the content of the block. The link to the previous block is what makes it a chain, e.g., given a block you can find all the information in all the previous blocks that led to this one, right back to what is called the genesis block (the very first one in the chain). A blockchain may be managed (e.g., and stored) by a network of distributed nodes. Every node may have a copy of the entire blockchain. New nodes may come and go, e.g., synchronizing their copies of the blockchain against those of other nodes as they join the network. Multiple copies of the blockchain on a distributed network of nodes may be one of the powerful features of the blockchain. It may make the blockchain robust against nodes disappearing either temporarily or permanently, e.g., whether that is due to connectivity issues, hardware failures, or interference. The more nodes there are in the network, the harder it may be to disrupt the storage of the blockchain, e.g., there is no single point of failure, unlike in a centralized system with a single authority.

In the embodiment in FIG. 2, each block includes a header and a list of transactions (Tx0, Tx1 . . . Tx3). The header may include one or more of: a pointer to the previous block (e.g., Prev_Hash field in FIG. 2), a summary of the transactions the block contains (for example, a hash (e.g., Merkle hash) of those transactions (e.g., the Tx_Root field in FIG. 2), a timestamp that indicates when the block was created (e.g., Timestamp field in FIG. 2), and a proof of the work that went into creating the block (for example, the nonce field in FIG. 2, e.g., the nonce value may be used as part of a consensus mechanism or for another purpose). The timestamp (e.g., from a timestamp server) may provide irrefutable evidence that the data in a block existed at a particular time. As one example, the actual timestamp given in a particular block may not necessarily be to-the-second accurate. In one embodiment, if a block is in the blockchain, what is guaranteed is: the block was added (e.g., at most two hours) before its timestamp, the block before this block in the chain existed at the time the block was created, this block was added to the chain before the next block in the chain existed, and the data in this block (e.g., the transactions) existed at the time the block was created. The hash of the header of the block, incorporating each of these pieces of information, may become the identifier for the block which is used by the next block in the chain.

A (e.g., every) node in the network may add blocks to the blockchain. A (e.g., every) node is sent the data that needs to go into the blocks (e.g., the transactions). A (e.g., every) node may package up that data into a block that links back to the last block in the blockchain that they have knowledge (e.g., are aware) of. A (e.g., every) node may then transmit that block to the rest of the network to assert this is the new blockchain. To ensure that the nodes in the network have a consistent, consensus view of what the blockchain holds in certain embodiments, all nodes operate under a set of protocol rules that determine what a valid block looks like. These rules may include ensuring that each transaction is a valid transaction. Examples include that it is consuming resources that exist and have not already been consumed, that (e.g., smart) contract validation rules are satisfied, that it has been signed by the creator of the transaction, or that the transaction creator owns or has permission to operate on the specified resources. Another example is that it is spending money that actually exists for financial transaction (e.g., by pointing to a previous matching transaction within the blockchain) and that it has been signed by the creator of the transaction. These rules may ensure integrity between transactions: e.g., that the same resource (e.g., money) is not being consumed (e.g., spent) twice (e.g., each output of a transaction only forming the input of one other transaction). Another test for a valid block is where its nonce comes in. In one embodiment, to be a valid block, the hash of the header of the block always has to start with a certain number of zeros, e.g., it has to be below a certain target number. A header may contains the hash of the previous block in the chain, the (e.g., Merkle) hash of the transactions in the block a timestamp, and a nonce value. So if a node include a plurality of transactions that are to be put together into a block to add to the chain, the node may know the hash of the previous block in the chain. The node may calculate the Merkle hash for the transactions to be put in the block and the current time. But what may not be known, and what is to be calculated, is what nonce will result in the header of the new block having a hash that starts with a plurality of zeros. In one embodiment, the hashing means that there is no realistic way a node can algorithmically compute what nonce is going to give the block this property. A valid block, e.g., whose hash begins with a plurality of zeros, may be proof that the node that created it did lots of work, hence the nonce is sometimes called a proof of work.

The number of zeros that a block's hash has to start with, or the target number that it has to be below, may determine the difficulty of creating a new block, and hence the average time that it will take. The smaller the target number, the more zeros a hash may have to start with, the lower the probability of hitting on such a hash, and the harder it is to create a new block.

FIG. 3 illustrates an example blockchain 300 according to embodiments of the disclosure. Each block in the blockchain 300 includes a reference to the previous block in the chain and some additional information which makes up the content of the block (e.g., proof of work and transactions). The numbers under each heading in FIG. 3 are merely examples. Transactions may be digitally-signed and chained into blocks, with each transaction cryptographically linked to all earlier ones by hashing paired data, the leaves, then pairing and hashing the results until a single hash remains (for example, the (e.g., Merkle) root hash or master hash). Every new transaction in a blockchain may carries with it an unforgeable record of the entire history of the currency and all previous transactions. This tight cryptographic coupling of all past transactions makes it difficult to assume multiple identities or to modify a transaction's details. At the same time, it may enable any party to verify the transaction details are authentic and has not been tampered. Hashes are one-way functions, so there is no easy way to find the right nonce or to engineer a block to be correct in certain embodiments, e.g., changing a block requires regenerating all successors and redoing the work they contain.

A hash function may take any input and produce an output of a specific (e.g., fixed) size. The process of applying a hash function to some data, is generally called hashing. The output of a hash function is generally called a hash. The basic feature of a particular hash function is the (e.g., fixed) size of the output it produces. One characteristic of a secure cryptographic hash function is that it is one-way. This means that from the output, it is virtually impossible, or mathematically and computationally improbable, to determine what the input is. That is, given a hash, it should be infeasible to learn about or find the input data that was provided to the hash function. A term for this is pre-image resistance. In one embodiment, secure hash functions produce drastically different outputs, e.g., even if inputs differ by only a single bit. Cryptographic hash functions may also be collision resistant. A collision is when a hash function produces the same output, for more than one input. If hashing data item one and hashing different, data item 2 produce the same output, then a collision has occurred. Hashing may be extensively used with blockchains. Addresses on a blockchain may be derived by a process of hashing public keys, e.g., a Bitcoin address may be currently computed by hashing a public key with SHA2-256 and RIPEMD160. Collision resistance of the hash functions may be important because if two users generate the same address (a collision) then either could have access (e.g., spend the money sent) to that address. Signatures may also be a fundamental part of blockchains. Similar to signing a check, cryptographic signatures may determine which transactions are valid. Signatures may be generated from a hash of data to be signed, and a private key. Transaction hashes are highly visible in certain blockchains, e.g., transactions are referred to by their hash. For example, 5c504ed432cb51138bcf09aa5e8a410dd4a1e204ef84bfed1be16dfba1b22060 may be a transaction in a blockchain. Transaction hashes are also more direct to use, as compared to a description like the "1024th transaction in block 1337". Blocks in a blockchain may be identified by their hash, which serves the dual purpose of identification as well as integrity verification. An identification string that also provides its own integrity may be called a self-certifying identifier. For blockchains that use mining, the proof-of-work may be a number, generally called a nonce, that when combined with other data and hashed, produces a value smaller than a specified target, e.g., one of over 10 septillion hashes. When a valid nonce is found, verifying it may be done within a second, and then the new block propagates across the network, forming the latest consensus and blockchain.

Since storage in blockchains may be considered permanent, and storing large amounts of data on a blockchain is not economical, the practical way to store data on a blockchain may be to store a fixed (e.g., and normally smaller) size representation of the data called the "hash of the data." Another use for a blockchain is as a timestamping service. One may store data in the blockchain now, and anytime later, they may show it on the blockchain to prove it existed previously. In certain blockchains, the data itself is hashed and store the hash on the blockchain instead. When data is to be proved to be of that age, one may provide the data, then one may hash the picture and compare it against the hash that was stored on the blockchain. There are also more advanced examples where hashing is involved, for example in Merkle trees which are at the root of current innovation for blockchains and scalability.

Certain embodiments herein provide for blockchain transaction processing (e.g., acceleration) based on core scaling, hardware accelerators (e.g., field-programmable gate array (FPGA) circuit and/or application-specific integrated circuit (ASIC)), and/or (e.g., smart) network interface controller (NIC) hardware (e.g., circuit). In one embodiment, a NIC connects a computer (e.g., component thereof) to a network. Certain embodiments herein provide for software and hardware techniques, for example, secure enclaves, hardware security modules, and/or a set of data plane libraries and network interface controller drivers for data (e.g., packet) processing (e.g., a data plane development kit (DPDK)) as a way to accelerate certain types of private and secure transaction processing, e.g., where custom hardware is not appropriate. Certain embodiments herein provide an architecture for integrating hardware circuitry (e.g., hardware accelerator or accelerators) into a computing system, e.g., including a new dispatcher component to distribute work to processing (e.g., execution) units and/or perform initial processing on incoming transactions. Certain embodiments herein scale beyond a threshold of (e.g., about 1,000) transactions per second. Certain embodiments herein reduce the bottleneck for transaction processing due to complex functions, for example, (e.g., elliptic curve digital signature algorithm (ECDSA)) key recovery, (e.g., ECDSA) signature verify, and execution of the transaction (or smart contract) itself. Certain embodiments herein reduce the bottleneck for transaction processing for enhanced privacy and security guarantees, e.g., such as zero knowledge proofs and homomorphic encryption having a higher compute cost. Certain embodiments herein provide for hardware and methods for accelerating transaction processing to improve throughput, latency, and/or security. The actual approach taken in any given deployment may vary based on the requirements of the domain. To ease the burden in developing domain specific solutions, certain embodiments herein provide a modular architecture supporting multiple accelerator types and/or a dispatcher to intelligently distribute transactions to heterogeneous execution units and/or accelerators for processing. Certain embodiments herein provide for acceleration techniques and hardware for blockchain transaction processing, e.g., with multicore scaling, hardware accelerators (e.g., field-programmable gate array (FPGA) circuit and/or application-specific integrated circuit (ASIC)), (e.g., smart) network interface controller (NIC) hardware (e.g., circuit), instruction level enhancements, hardware security modules, secure enclaves, and/or a set of data plane libraries and network interface controller drivers for data (e.g., packet) processing (e.g., a data plane development kit (DPDK)). Certain embodiments herein provide for added value in one or more of the following domains: financial settlement, payments, remittance, supply chain, autonomous vehicle, and/or black box vehicle recorder.

Certain embodiments herein provide for blockchain workload acceleration with a focus on hardware based and hardware enabled mechanisms. The below includes examples of several possible hardware based accelerators. The following includes a description of various accelerator options, while the discussion of FIG. 10 describes a examples of resource allocation in a blockchain hardware system.

Figure 4:
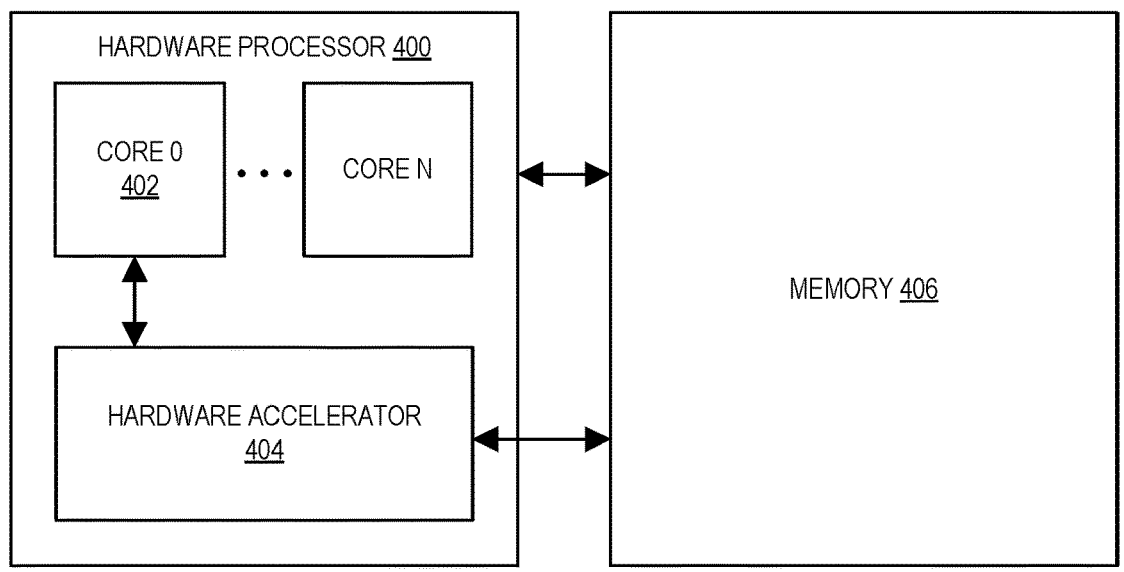
FIG. 4 illustrates a hardware processor having a hardware accelerator according to embodiments of the disclosure.

FIG. 4 illustrates a hardware processor 400 having a hardware accelerator 404 according to embodiments of the disclosure. Hardware processor 400 (e.g., core 402) may receive a request (e.g., from software) to perform a blockchain transaction and may offload performing (e.g., at least part of) the blockchain transaction to a hardware accelerator (e.g., hardware accelerator 404). Hardware processor 400 may include one or more cores (0 to N). In one embodiment, each core may communicate with (e.g., be coupled to) hardware accelerator 404. In one embodiment, each core may communicate with (e.g., be coupled to) one of multiple hardware accelerators. Core(s), accelerator(s), and memory (e.g., data storage device) 406 may communicate (e.g., be coupled) with each other. Arrows indicate two-way communication (e.g., to and from a component), but one-way communication may be used. In one embodiment, a (e.g., each) core may communicate (e.g., be coupled) with the memory, for example, storing and/or outputting data. Hardware accelerator may include any hardware (e.g., circuit or circuitry) discussed herein. In one embodiment, an (e.g., each) accelerator may communicate (e.g., be coupled) with the memory, for example, to receive data.

Figure 5:
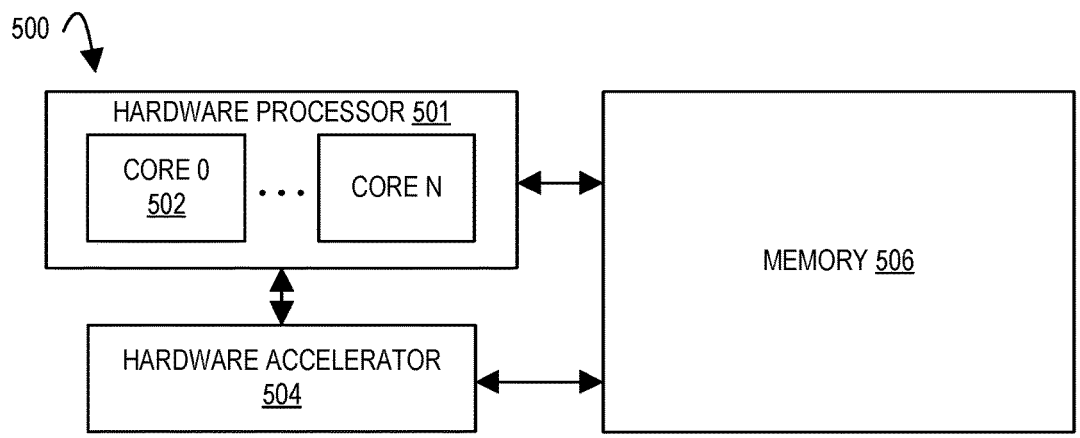
FIG. 5 illustrates a hardware processor and a hardware accelerator according to embodiments of the disclosure.

FIG. 5 illustrates a hardware processor 501 and a hardware accelerator 504 according to embodiments of the disclosure. In one embodiment, a hardware accelerator is on die with a hardware processor. In one embodiment, a hardware accelerator is off die of a hardware processor. In one embodiment, system 500 includes at least a hardware processor 501 and a hardware accelerator 504 as a system-on-a-chip (SoC). Hardware processor 501 (e.g., core 502) may receive a request (e.g., from software) to perform a blockchain transaction and may offload performing (e.g., at least part of) the blockchain transaction to a hardware accelerator (e.g., hardware accelerator 504). Hardware processor 501 may include one or more cores (0 to N). In one embodiment, each core may communicate with (e.g., be coupled to) hardware accelerator 504. In one embodiment, each core may communicate with (e.g., be coupled to) one of multiple hardware accelerators. Core(s), accelerator(s), and memory (e.g., data storage device) 506 may communicate (e.g., be coupled) with each other. Arrows indicate two-way communication (e.g., to and from a component), but one-way communication may be used. In one embodiment, a (e.g., each) core may communicate (e.g., be coupled) with the memory, for example, storing and/or outputting data. Hardware accelerator may include any hardware (e.g., circuit or circuitry) discussed herein. In one embodiment, an (e.g., each) accelerator may communicate (e.g., be coupled) with the memory, for example, to receive data.

Figure 6:
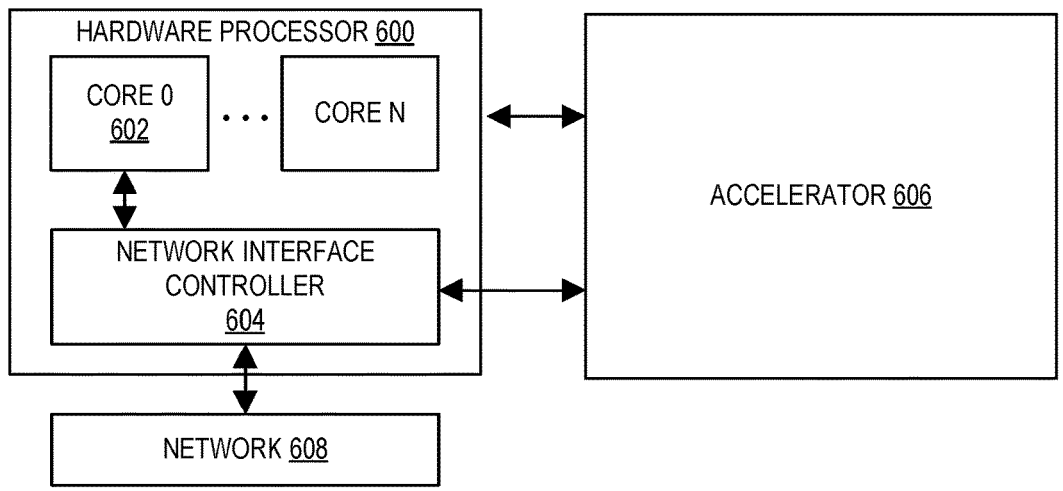
FIG. 6 illustrates a hardware processor having a network interface controller (NIC) according to embodiments of the disclosure.

FIG. 6 illustrates a hardware processor 600 having a network interface controller (NIC) 604 accelerator according to embodiments of the disclosure. NIC 604 may provide an interface to networks (e.g., network 608) that utilize the Internet Protocol Suite of networking protocols. NIC 604 may respond to various types of networking protocol packets, e.g., without involving the processor. Additionally or alternatively, NIC 604 may perform (e.g., a portion of) a blockchain transaction. Network 608 may provide access to other nodes storing a blockchain.

Hardware processor 600 (e.g., core 602) may receive a request (e.g., from software) to perform a blockchain transaction and may offload performing (e.g., at least part of) the blockchain transaction to a hardware accelerator (e.g., hardware accelerator 606) and/or NIC 604. Hardware processor 600 may include one or more cores (0 to N). In one embodiment, each core may communicate with (e.g., be coupled to) hardware accelerator 606 and/or NIC 604. In one embodiment, each core may communicate with (e.g., be coupled to) one of multiple hardware accelerators and/or NICs. Core(s), accelerator(s), NIC, and memory (e.g., data storage device) may communicate (e.g., be coupled) with each other. Arrows indicate two-way communication (e.g., to and from a component), but one-way communication may be used. In one embodiment, a (e.g., each) core may communicate (e.g., be coupled) with the memory, for example, storing and/or outputting data. Hardware accelerator or NIC may include any hardware (e.g., circuit or circuitry) discussed herein. In one embodiment, an (e.g., each) accelerator or NIC may communicate (e.g., be coupled) with the memory, for example, to receive data. NIC may communicate with network 608.

Figure 7:
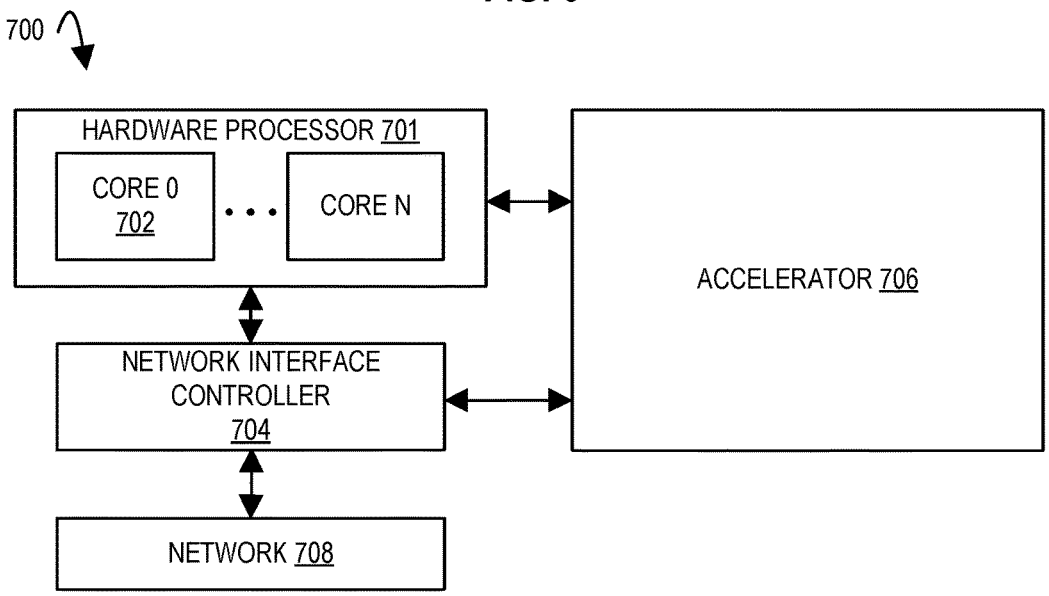
FIG. 7 illustrates a hardware processor and a network interface controller (NIC) according to embodiments of the disclosure.

FIG. 7 illustrates a hardware processor 701 and a network interface controller (NIC) 704 according to embodiments of the disclosure. In one embodiment, a hardware accelerator is on die with a hardware processor. In one embodiment, a hardware accelerator is off die of a hardware processor. In one embodiment, a NIC is on die with a hardware processor and/or accelerator. In one embodiment, a NIC is off die of a hardware processor and/or accelerator. In one embodiment, system 700 includes at least a hardware processor 701 and a NIC 704 as a SoC.

NIC 704 may provide an interface to networks (e.g., network 708) that utilize the Internet Protocol Suite of networking protocols. NIC 704 may respond to various types of networking protocol packets, e.g., without involving the processor. Additionally or alternatively, NIC 704 may perform (e.g., a portion of) a blockchain transaction. Network 708 may provide access to other nodes storing a blockchain.

Hardware processor 701 (e.g., core 702) may receive a request (e.g., from software) to perform a blockchain transaction and may offload performing (e.g., at least part of) the blockchain transaction to a hardware accelerator (e.g., hardware accelerator 706) and/or NIC 704. Hardware processor 701 may include one or more cores (0 to N). In one embodiment, each core may communicate with (e.g., be coupled to) hardware accelerator 706 and/or NIC 704. In one embodiment, each core may communicate with (e.g., be coupled to) one of multiple hardware accelerators and/or NICs. Core(s), accelerator(s), NIC, and memory (e.g., data storage device) may communicate (e.g., be coupled) with each other. Arrows indicate two-way communication (e.g., to and from a component), but one-way communication may be used. In one embodiment, a (e.g., each) core may communicate (e.g., be coupled) with the memory, for example, storing and/or outputting data. Hardware accelerator or NIC may include any hardware (e.g., circuit or circuitry) discussed herein. In one embodiment, an (e.g., each) accelerator or NIC may communicate (e.g., be coupled) with the memory, for example, to receive data. NIC may communicate with network 708.

Figure 8:
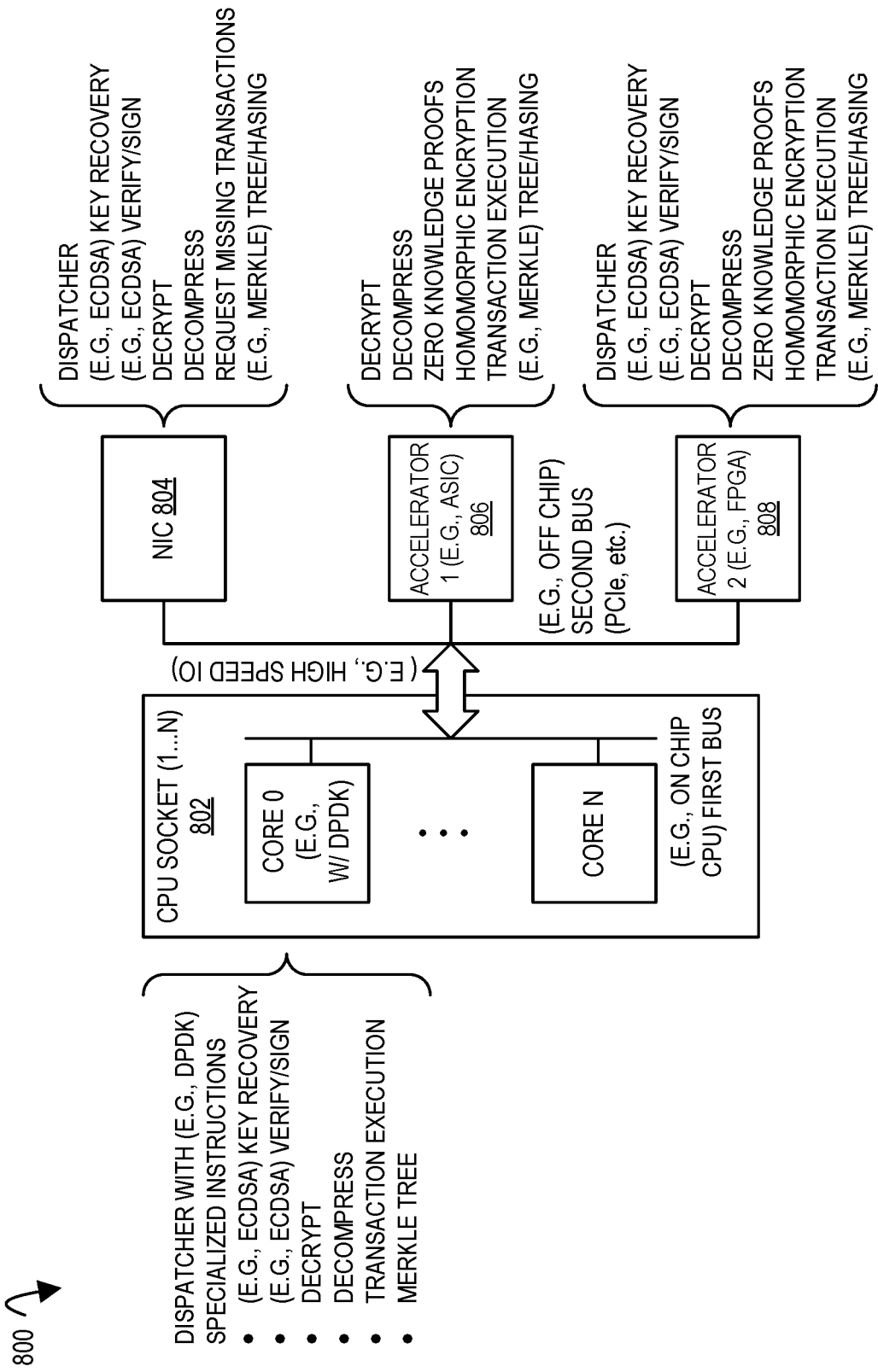
FIG. 8 illustrates circuitry for blockchain transaction acceleration according to embodiments of the disclosure.

FIG. 8 illustrates circuitry 800 for blockchain transaction acceleration according to embodiments of the disclosure. Block diagram of circuitry 800 shows one embodiment and options for where the various acceleration functions may be implemented. Examples of each of the acceleration functions is described in more detail in the following text. Block diagram of circuitry 800 includes one or more processors (e.g., central processing unit (CPU)) sockets 802), each of which contains one or more cores, which may in turn support decoding and/or execution of one or more execution threads (e.g., instructions thereof). The cores may be connected via a (e.g., high speed) on chip interconnect or (e.g., high speed) bus to each other and/or a high speed input/output (IO) circuit, such as a Peripheral Component Interconnect Express (PCIe) circuit. Three companion circuits (e.g., chips) are shown connected via an (e.g., high speed) interconnect or (e.g., high speed) bus: a (e.g., smart) network interface controller (NIC) 804, a first accelerator 806 (e.g., ASIC), and a second accelerator 808 (e.g., FPGA). A blockchain acceleration system may have any one, any combination, or all of the described components. Block diagram of circuitry 800 also shows example lists of the one or more acceleration functions that may be assigned to the various components. There is flexibility in where these functions are assigned in certain embodiments. The assignment in certain implementations may take into account the application requirements, cost budget, power budget, maturity of the blockchain architecture/implementation/algorithms, security requirements, etc. This diagram is not intended to show an exhaustive set of accelerators or mappings to physical implementations, but is an example.

Transaction Execution

Transaction (or smart contract) execution generally refers to the task of executing the blockchain transactions. In one embodiment, this takes place on general purpose cores. In another embodiment, (e.g., at least part of) this takes place on reprogrammable and/or dedicated hardware (e.g., in the form of an FPGA, ASIC, and/or specialized instructions) to provide higher performance than general purpose cores and/or with lower power consumption. This may be especially true in cases where a specialized and possibly restricted language is supported in the transactions. Bitcoin is an example of a blockchain that may support a minimal scripting language to describe transactions and is amenable to a hardware level implementation, e.g., including a hardware state machine.

Key Recovery, Sign/Verify

Elliptic Curve Digital Signature Algorithm (ECDSA) or other (e.g., signature) algorithms may be used by blockchain implementations for proof of identity and transaction signing purposes. Because many messages (including all transactions) may be signed with an algorithm (e.g., ECDSA), and because in many implementations the public key is recovered and not forwarded with the message, key recovery may become a significant portion of the blockchain workload. While ECDSA is an example of digital signature technology used in blockchains, the key recovery and/or sign/verify accelerator concepts proposed here would also apply to other digital signature algorithms, for example, but not limited to, the RSA algorithm.

Two possible accelerator functions relating to Key Recovery and Sign/Verify are:

(I) Key Recovery—As defined by digital signal algorithms (e.g., ECDSA), the public key may be recovered from an (e.g., ECDSA) signed message. Key recovery may be an expensive (e.g. in processing resources and/or time) operation and need to occur to validate the origin of transactions and messages using the public key. As a result, it may become a bottleneck in transaction processing. The following are two options for key recovery acceleration:
  a. (a) Function specific accelerator—Purpose built hardware (e.g., in the form of an ASIC, a CPU instruction, FPGA, or other circuit) may be utilized to accelerate the key recovery function.
  b. Public key caching—A caching approach may be taken whereby the public key is recovered as needed and stored for future use. A protocol may use a concept of a random unique identifier to identify every participant in the system. The identifier may be sent with the message, e.g., and be (e.g., much) shorter in length than the public key. This identifier may be used as the key in a dictionary containing the associated public key, greatly reducing the key recovery load in workloads with locality of key use.

(II) Sign/Verify—A message (e.g., blockchain transaction message) may be signed once and verified many times (e.g., once per peer (e.g., node) in the network). Function specific accelerators (e.g., in the form of an ASIC, a CPU instruction, FPGA, or other circuit) may be utilized to accelerate the sign/verify operations.

Hashing (e.g., Merkle Tree)

A Merkle tree may generally refer to a data structure where every nonleaf node represents the cryptographic hash of its children. Both Merkle trees and hashing in general may be frequent operations in blockchains and may warrant acceleration. Adding (e.g., high speed) hashing and/or Merkle tree engines to a processor (e.g., CPUs, ASICs, FPGAs, or NICs) may accelerate transaction and block construction and/or verification.

Parallelization

Parallel execution of blockchain transactions has the potential to greatly improve throughput in many applications. In certain embodiments, the majority of transactions have no data dependencies and can be executed fully independently. Various types of hardware (e.g., execution resources) may be used depending on the specific requirements of the application. For example:

(1) A hardware accelerator (e.g., FPGA/ASIC)—where specialized hardware supports transaction execution, multiple engines or chips may execute many transactions in parallel.

(2) Cores—Use multiple cores in the form of multicore processors or multisocket platforms. This may provide per core scaling up until the number of cores starts to exceed the availability of independent transactions.

(3) Multiple nodes—For larger scale parallelization, multiple nodes may be used, e.g., as in a rack or multiple racks. In this case, specialized nodes (e.g., FPGAs, ASICs, or Hardware Security Modules (discussed below)) may be shared so that only certain types of transactions are sent to these (e.g., scarce) resources.

(4) Map/Reduce—This may be used for distributed processing on a cluster. Data may be distributed to many hosts, which filter and sort the data. Data from multiple hosts may then be merged and reduced in an iterative tree fashion to get a final answer. This architecture may be applied to blockchain functions, including: building or validating Merkle trees, such as for blocks with extremely large transaction counts, e.g., each node could build a portion of the Merkle tree, which is then combined with other nodes to build the root, and/or processing large numbers of transactions, e.g., transaction state is assigned to leaf hosts where the transactions are actually executed. The local state can then be hashed map/reduced to build a signature of the entire state after applying the transactions in the block.

Security/Privacy

In some cases, security or privacy imposes additional demands on transaction processing (e.g., execution) resulting in a need for specialized acceleration hardware and/or a more secure execution environment. The below considers four such cases:

(1) Zero Knowledge Proof—Zero knowledge proofs are a method for proving that a statement is true without revealing any information about the statement. This technology underpins some blockchain implementations that focus on user privacy. Since such proofs may be relatively expensive compared to transactions without strong privacy guarantees, certain embodiments herein include acceleration hardware (e.g., in the form of FPGAs or ASICs) to accelerate these algorithms. This may lead to improved execution time, increased throughput, and reduced latency.

(2) Homomorphic Encryption—Homomorphic encryption provides improved privacy and security by allowing computations to be performed directly on encrypted data rather than decrypting it first. Blockchain applications may employ homomorphic encryption by storing encrypted data on the blockchain and operating on it directly as is. However, even more than zero knowledge proofs these techniques may be computationally expensive, leading to an opportunity to use acceleration hardware (e.g., FPGA or ASIC) to improve performance.

(3) Hardware Security Module (HSM) (e.g., circuit)—In one embodiment, a hardware security module is a computing device that safeguards private keys used in cryptographic algorithms. In blockchain applications where increased security or privacy is required (e.g., yet homomorphic encryption or zero knowledge proofs are considered too costly or otherwise not applicable), hardware security circuits (e.g., module) may be used as a platform to provide higher levels of security and/or privacy with high performance. A hardware security circuit (e.g., module) may ensure that the correct software code is running and that privacy is protected.

(4) Secure Enclave—In one embodiment, a secure enclave technology uses one or more instructions that when executed allow user-level code to allocate private regions of memory, called enclaves, that are protected from processes running at higher privilege levels. The enclave may run on a core rather than dedicated HSM hardware and may provide secure and private execution of blockchain transactions.

Trusted Synchronized Time

Timestamps are an important aspect of certain distributed systems, including blockchains, however an accurate and precise source of time may not be available in a typical computing environment. The Network Time Protocol may provide synchronized time, but is subject to precision and accuracy limitations that reduce its usefulness across many peers. Distributed synchronized time derives a highly accurate time along with error bounds from a combination of GPS, atomic clock, or other reliable sources. Building trust into this system, for example through a tamper proof environment, encrypted firmware and data links, and data integrity checks, provides confidence that the resulting time has not been tampered with. This allows peers in a distributed system to rely on timestamps for ordering or other purposes, e.g., without the need for a centralized timestamp server.

Blockchain Accelerator Implementation Examples

Certain embodiments herein include a hardware accelerator to fill in missing transactions, e.g., via accessing a network. Certain embodiments herein include a hardware accelerator to recover a key from encrypted data, e.g., from a block of a blockchain. Certain embodiments herein cache the recovered key. In one embodiment, specialized hardware (e.g., including an accelerator) is to construct the entire blockchain block given a set of transactions. In some systems, e.g., when parallel execution of transactions is desired, a dispatcher (e.g., dispatcher circuit) may be used (e.g., as a component of an accelerator) to accept packets off the network, perform initial processing, and/or hand them off to the appropriate component (e.g., transaction execution circuit, such as, but not limited to, an accelerator) for further processing. In this context, an execution circuit may be any circuit (and software running on that circuit) that is responsible for processing a transaction. A dispatcher may account for components (e.g., accelerators) that may be heterogeneous in type and capable of processing a variety of types of operations and/or transactions. The dispatcher itself may be software, firmware, or hardware based. In software, a dedicated thread, process, or CPU may perform the function. Network stack acceleration libraries such as the Data Plane Development Kit (DPDK), e.g., which reduces network overhead and latency, may be employed to improve the performance of software. As hardware, an accelerator (e.g., an ASIC, FPGA, or some combination thereof) and/or NIC may perform the accelerated functionality. The following flow diagram in FIG. 9 and the associated text illustrates an embodiment of how a blockchain transaction is to flow through a dispatcher (e.g., dispatcher circuit).

Figure 9:
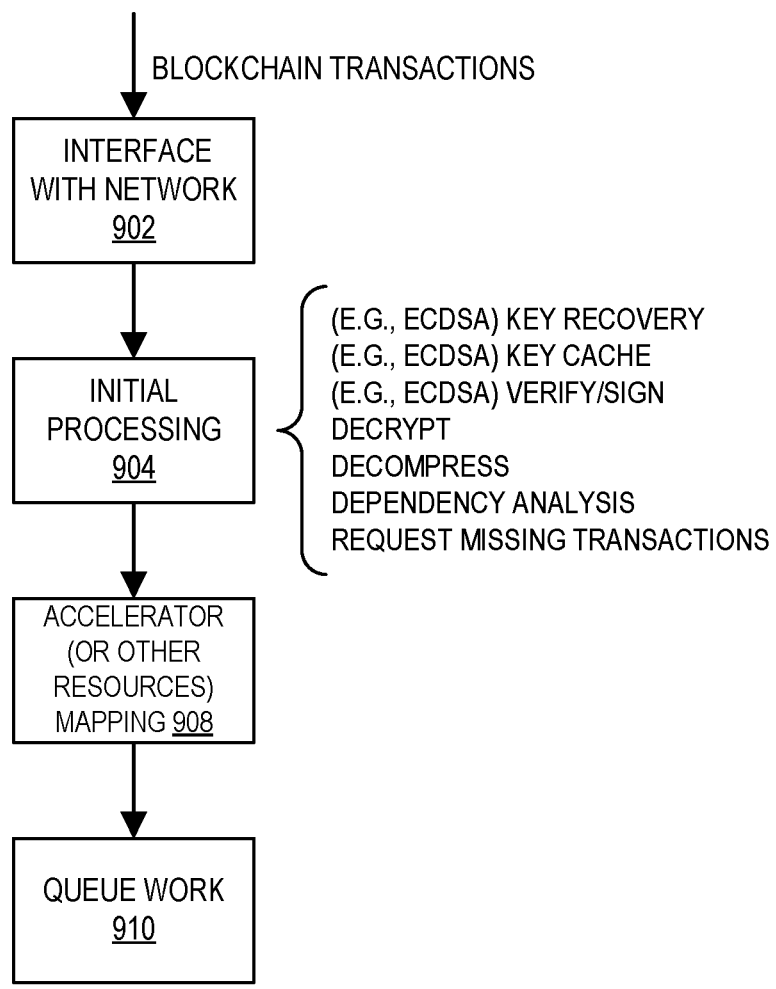
FIG. 9 illustrates a blockchain dispatcher flow diagram according to embodiments of the disclosure.

FIG. 9 illustrates a blockchain dispatcher flow diagram 900 according to embodiments of the disclosure. Blockchain transaction(s) may be initially received off the network from a peer node (e.g., via NIC), for example, by a dispatcher interfacing with a network 902. The initial processing 904 may include performing functions for the dispatcher to perform its job, e.g., such as key recover and caching. Initial processing 904 may additionally include functions that are not needed by the dispatcher, but may be better done in the dispatcher, e.g., because it has more suitable resources. Examples of such functions include digital signature operations, (e.g., ECDSA) signature verification, decompression, decryption, requesting missing transactions from peers, or other functions. In order to request missing transactions, a dispatcher may need to identify any missing transactions by performing dependency analysis on the transactions, e.g., using supplied dependency information, or using transaction identification (ID) information such as from an ordering service. Once identified, the dispatcher may send requests to peer nodes to retrieve the missing transaction information, e.g., reducing latency compared to waiting until later in the pipeline to make the requests.

After the initial processing, the dispatcher may map 908 the transaction to hardware (e.g., an accelerator or NIC), for example, using one of many possible mapping algorithms. One proposed mapping is based on the state updated by the transaction, e.g., where a range of state space is mapped to each execution resource (e.g., accelerator or NIC) of a plurality of execution resources. This may provide locality of state to the execution resource(s), e.g., helping to improve performance. Other mappings may utilize the originator's identity or the hash of the message itself to distribute the work, e.g., while the type of transaction may dictate which accelerator and/or NIC is capable of processing it. The dispatcher may queue the work 910 with the appropriate accelerator and/or NIC (e.g., for further processing).

Figure 10:
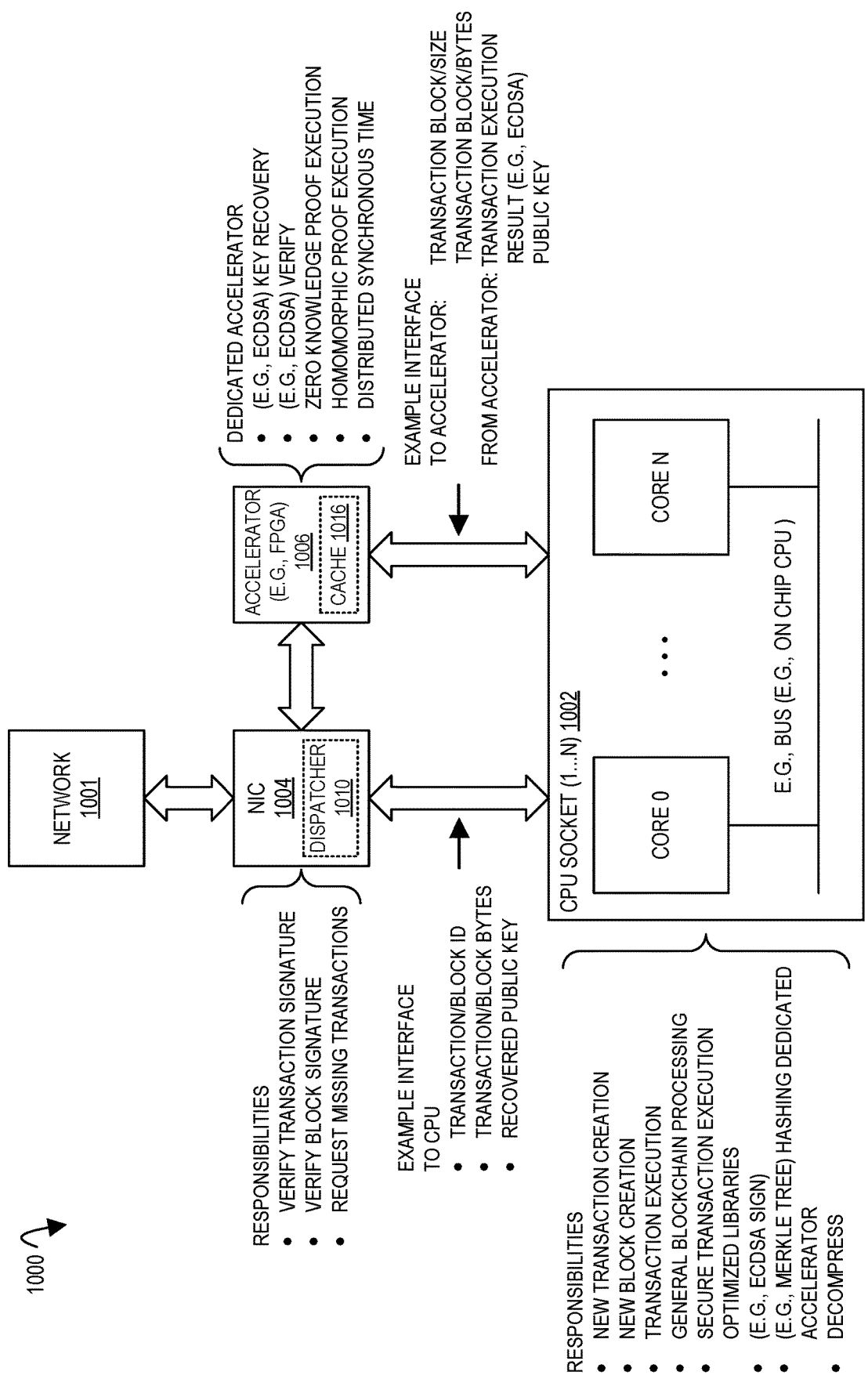
FIG. 10 illustrates circuitry for blockchain transaction acceleration according to embodiments of the disclosure.
Figure 13:
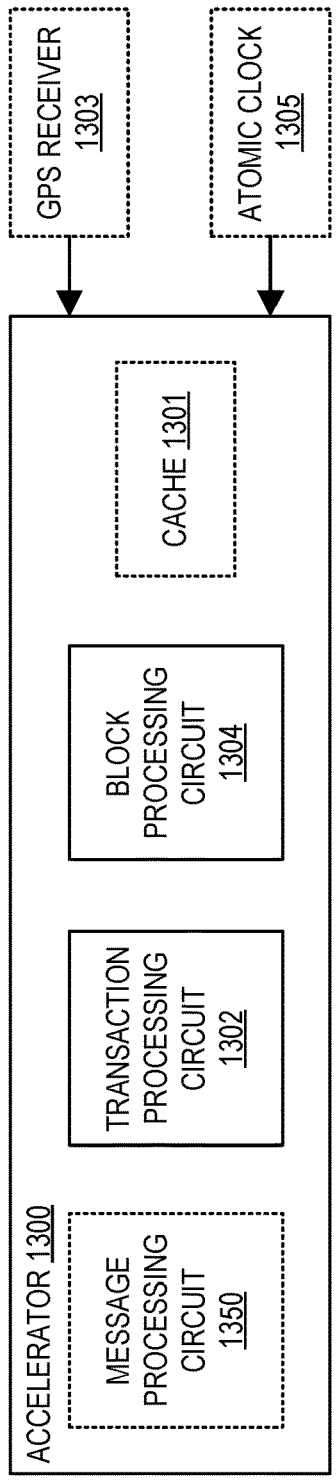
FIG. 13 illustrates a hardware accelerator for blockchain transaction acceleration according to embodiments of the disclosure.
Figure 14:
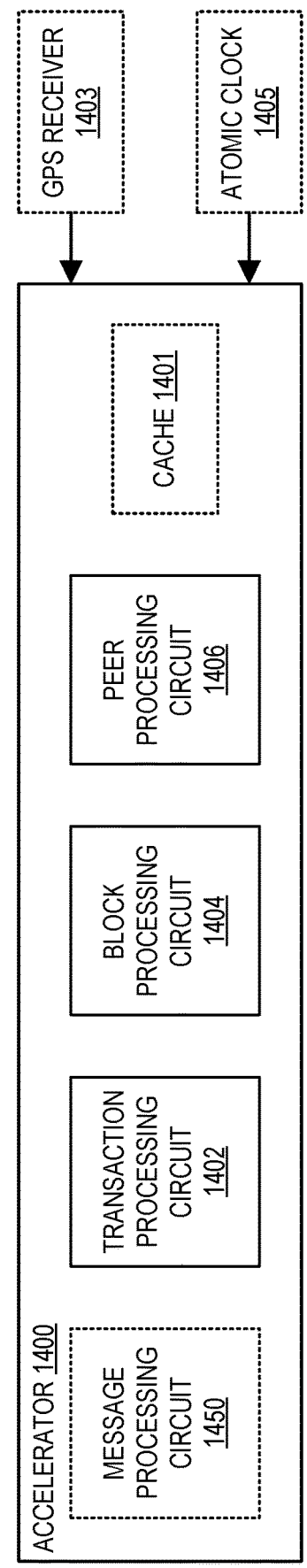
FIG. 14 illustrates a hardware accelerator for blockchain transaction acceleration according to embodiments of the disclosure.

FIG. 10 illustrates circuitry 1000 for blockchain transaction acceleration according to embodiments of the disclosure. In this section, a specific implementation of blockchain accelerator circuitry is discussed utilizing one or more of the components discussed herein. In FIG. 10, example functionality (e.g., responsibilities) are depicted next to each component and example interfaces are depicted next to each interface (shown as block arrows). Note that these are examples, and one or more of the functionalities may be performed by one or more of the components. Externally generated transactions and blocks enter circuitry 1000 at the top of the drawing from a network 1001 (e.g., through the NIC 1004). The depicted (e.g., smart) NIC 1004 may offload computationally expensive (e.g., ECDSA) key recovery and signature validation to dedicated circuits on the accelerator 1006 (e.g., FPGA or ASIC). The NIC 1004 and/or accelerator 1006 may track block content and send out requests to peers for any missing transactions. The core(s) of socket 1002 (e.g., processor) may be responsible for running the distributed ledger system. Valid blocks and transactions may be passed to the core(s) (e.g., from cache 1016) where they are executed against the ledger. New transactions may be initiated out of the core(s) at the request of users, and new blocks may be initiated as part of the peer to peer consensus protocol. Optimized libraries may accelerate (e.g., Merkle tree) hashing and (e.g., ECDSA) signing, and dedicated accelerator(s) 1006 may compress and decompress data which may be stored directly on chain or hashed and stored off chain with an on chain signature. Instructions (e.g., secure enclave instructions) may be executed by the core(s) to provide an isolated execution environment for secure or private transactions, which may include a private side ledger. An attached accelerator 1006 (e.g., FPGA or ACIS) may provide dedicated hardware resources to accelerate highly expensive zero knowledge proof or homomorphic encryption operations, returning either valid/invalid, and a set of ledger state updates. The accelerator 1006 may also connect to a GPS receiver and/or an atomic clock (e.g., as shown in FIGS. 13 and 14) to provide a source of trusted absolute time. Cache 1016 may be included within the accelerator 1006, e.g., to store blockchain data.

In certain embodiments, dispatcher circuit 1010 is to route blockchain data (e.g., packets) between accelerator 1006 and network 1001, e.g., and not route that data to the socket 1002

(e.g., processor core(s)). In one embodiment, the network 1001 is the internet. In the depicted embodiment, the dispatcher 1010 is shown as a component of the NIC 1004. In certain embodiments, dispatcher circuit 1010 is to route non blockchain data (e.g., packets) between socket 1002 (e.g., to a processor or a core or cores of a processor) and network 1001, e.g., and not route that data to the accelerator 1006. In one embodiment, dispatcher circuit 1010 is to cause a port or ports of the NIC 1004 to be reserved (e.g., assigned) for blockchain data (e.g., packets) of the network 1001 and send that data to and/or from accelerator 1006. In one embodiment, dispatcher circuit 1010 is to cause a (e.g., different) port or ports of the NIC 1004 to be reserved (e.g., assigned) for non blockchain data (e.g., packets) of the network 1001 and send that data to and/or from socket 1002. In certain embodiments, a dispatcher circuit is to inspect incoming data (e.g., an incoming packet) for information that identifies it as a blockchain transaction or a non blockchain transaction. In one embodiment, the dispatcher circuit is to inspect a header of the incoming data (e.g., an incoming packet) for information to determine if the data a blockchain transaction or a non blockchain transaction. In one embodiment, the dispatcher circuit and/or NIC is to determine which port of the NIC that the incoming data (e.g., an incoming packet) is arriving on and compare it to a list of port(s) that are assigned (e.g., only) for blockchain data and a list of port(s) that are assigned (e.g., only) for non blockchain data to determine if the data a blockchain transaction or a non blockchain transaction, respectively. In one embodiment, the dispatcher and/or NIC is to send outgoing data (e.g., an outgoing packet) on a port of the NIC reserved for blockchain data when the source of the outgoing data is a blockchain accelerator (e.g., a component thereof). In one embodiment, the dispatcher and/or NIC is to send outgoing data (e.g., an outgoing packet) on a port of the NIC reserved for non blockchain data when the source of the outgoing data is not the blockchain accelerator (e.g., not a component thereof). Example components of accelerator 1006 are discussed herein, for example, in reference to FIGS. 13-17. Example components of NIC 1004 are discussed herein, for example, in reference to FIGS. 18-21. In one embodiment, dispatcher circuit is a message processing circuit, e.g., as in FIG. 21. In one embodiment, dispatcher circuit includes one or more of the components in FIGS. 20-21. In one embodiment, dispatcher circuit is to receive an incoming blockchain message (or portion of the message) (e.g., but not receive any incoming non blockchain messages) and route the blockchain message to the corresponding component of the accelerator, e.g., one or more of the components in FIGS. 15-17. In one embodiment, the blockchain message includes blockchain data (e.g., payload) and/or a request for a blockchain operation (e.g., on blockchain data). In one embodiment, dispatcher circuit is to receive an incoming blockchain packet (or portion of the packet) (e.g., but not receive any incoming non blockchain packets) and route the blockchain packet to the corresponding component of the accelerator, e.g., one or more of the components in FIGS. 15-17.

In one embodiment, socket 1002 (e.g., or a core) is to send (e.g., in response to an instruction being decoded into a decoded instruction by a decoder circuit and the decoded instruction being executed by an execution unit (circuit)) a message (e.g., command) into the accelerator, for example, as an offload for the accelerator to process (e.g., outgoing) blockchain messages and/or to configure the accelerator to perform blockchain operations. In one embodiment, (e.g., during startup) there is a configuration phase where the socket (e.g., or core) prepares the accelerator to perform the desired functionality (e.g., one or more of the functionalities discussed herein).

Figure 11:
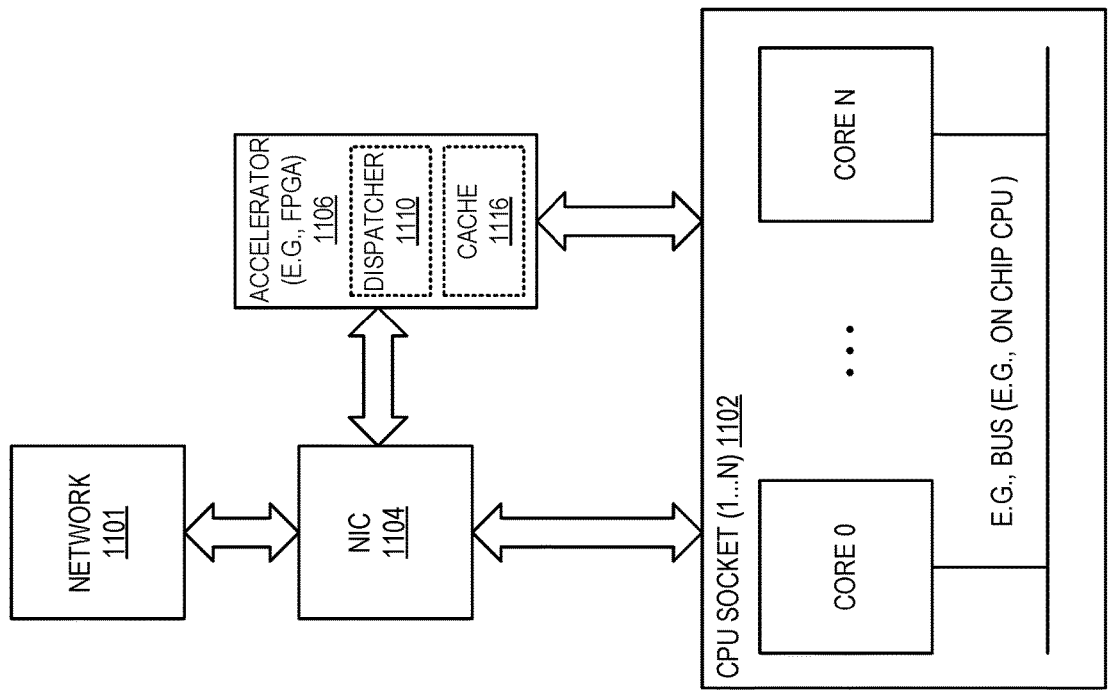
FIG. 11 illustrates circuitry for blockchain transaction acceleration according to embodiments of the disclosure.

FIG. 11 illustrates circuitry 1100 for blockchain transaction acceleration according to embodiments of the disclosure. In this section, a specific implementation of blockchain accelerator circuitry is discussed utilizing one or more of the components discussed herein. In FIG. 11, example functionality (e.g., responsibilities) may be the functionality depicted next to each component in FIG. 10 and example interfaces depicted next to each interface (shown as block arrows) in FIG. 10. Note that these are examples, and one or more of the functionalities may be performed by one or more of the components. Externally generated transactions and blocks enter circuitry 1100 at the top of the drawing from a network 1101 (e.g., through the NIC 1104). The depicted (e.g., smart) NIC 1104 may offload computationally expensive (e.g., ECDSA) key recovery and signature validation to dedicated circuits on the accelerator 1106 (e.g., FPGA or ASIC). The NIC 1104 and/or accelerator 1106 may track block content and send out requests to peers for any missing transactions. The core(s) of socket 1102 (e.g., processor) may be responsible for running the distributed ledger system. Valid blocks and transactions may be passed to the core(s) (e.g., from cache 1116) where they are executed against the ledger. New transactions may be initiated out of the core(s) at the request of users, and new blocks may be initiated as part of the peer to peer consensus protocol. Optimized libraries may accelerate (e.g., Merkle tree) hashing and (e.g., ECDSA) signing, and dedicated accelerator(s) 1106 may compress and decompress data which may be stored directly on chain or hashed and stored off chain with an on chain signature. Instructions (e.g., secure enclave instructions) may be executed by the core(s) to provide an isolated execution environment for secure or private transactions, which may include a private side ledger. An attached accelerator 1106 (e.g., FPGA or ACIS) may provide dedicated hardware resources to accelerate highly expensive zero knowledge proof or homomorphic encryption operations, returning either valid/invalid, and a set of ledger state updates. The accelerator 1106 may also connect to a GPS receiver and/or an atomic clock (e.g., as shown in FIGS. 13 and 14) to provide a source of trusted absolute time. Cache 1116 may be included within the accelerator 1106, e.g., to store blockchain data.

In certain embodiments, dispatcher circuit 1110 is to route blockchain data (e.g., packets) between accelerator 1106 and NIC 1104 (e.g., to network 1101), e.g., and not route that data (e.g., directly) to the socket 1102 (e.g., processor core(s)). In one embodiment, the network 1101 is the internet. In the depicted embodiment, the dispatcher 1110 is shown as a component of the accelerator 1106, for example, and not a part of the NIC 1104. In certain embodiments, dispatcher circuit 1110 is to route non blockchain data (e.g., packets) between socket 1002 (e.g., to a processor or a core or cores of a processor) and NIC 1104 (e.g., to network 1101), e.g., and not route that data to the accelerator 1006. In one embodiment, dispatcher circuit 1010 is to cause a port or ports of the NIC 1004 to be reserved (e.g., assigned) for blockchain data (e.g., packets) of the network 1101 and send that data to and/or from accelerator 1106. In one embodiment, dispatcher circuit 1110 is to cause a (e.g., different) port or ports of the NIC 1104 to be reserved (e.g., assigned) for non blockchain data (e.g., packets) of the network 1101 and send that data to and/or from socket 1102. In certain embodiments, a dispatcher circuit is to inspect incoming data (e.g., an incoming packet) for information that identifies it as a blockchain transaction or a non blockchain transaction. In one embodiment, the dispatcher circuit is to inspect a header of the incoming data (e.g., an incoming packet) for information to determine if the data a blockchain transaction or a non blockchain transaction. In one embodiment, the dispatcher circuit and/or NIC is to determine which port of the NIC that the incoming data (e.g., an incoming packet) is arriving on and compare it to a list of port(s) that are assigned (e.g., only) for blockchain data and a list of port(s) that are assigned (e.g., only) for non blockchain data to determine if the data a blockchain transaction or a non blockchain transaction, respectively. In one embodiment, the dispatcher and/or NIC is to send outgoing data (e.g., an outgoing packet) on a port of the NIC reserved for blockchain data when the source of the outgoing data is a blockchain accelerator (e.g., a component thereof). In one embodiment, the dispatcher and/or NIC is to send outgoing data (e.g., an outgoing packet) on a port of the NIC reserved for non blockchain data when the source of the outgoing data is not the blockchain accelerator (e.g., not a component thereof). Example components of accelerator 1106 are discussed herein, for example, in reference to FIGS. 13-17, and 21. Example components of NIC 1104 are discussed herein, for example, in reference to FIGS. 18-20. In one embodiment, dispatcher circuit is a message processing circuit, e.g., as in FIG. 21. In one embodiment, dispatcher circuit includes one or more of the components in FIG. 21. In one embodiment, dispatcher circuit is to receive an incoming blockchain message (or portion of the message) (e.g., but not receive any incoming non blockchain messages) and route the blockchain message to the corresponding component of the accelerator, e.g., one or more of the components in FIGS. 15-17. In one embodiment, the blockchain message includes blockchain data and/or a request for a blockchain operation (e.g., on that blockchain data). In one embodiment, dispatcher circuit is to receive an incoming blockchain packet (or portion of the packet) (e.g., but not receive any incoming non blockchain packets) and route the blockchain packet to the corresponding component of the accelerator, e.g., one or more of the components in FIGS. 15-17.

In one embodiment, socket 1102 (e.g., or a core) is to send (e.g., in response to an instruction being decoded into a decoded instruction by a decoder circuit and the decoded instruction being executed by an execution unit (circuit)) a message (e.g., command) into the accelerator, for example, as an offload for the accelerator to process (e.g., outgoing) blockchain messages and/or to configure the accelerator to perform blockchain operations. In one embodiment, (e.g., during startup) there is a configuration phase where the socket (e.g., or core) prepares the accelerator to perform the desired functionality (e.g., one or more of the functionalities discussed herein).

Figure 12:
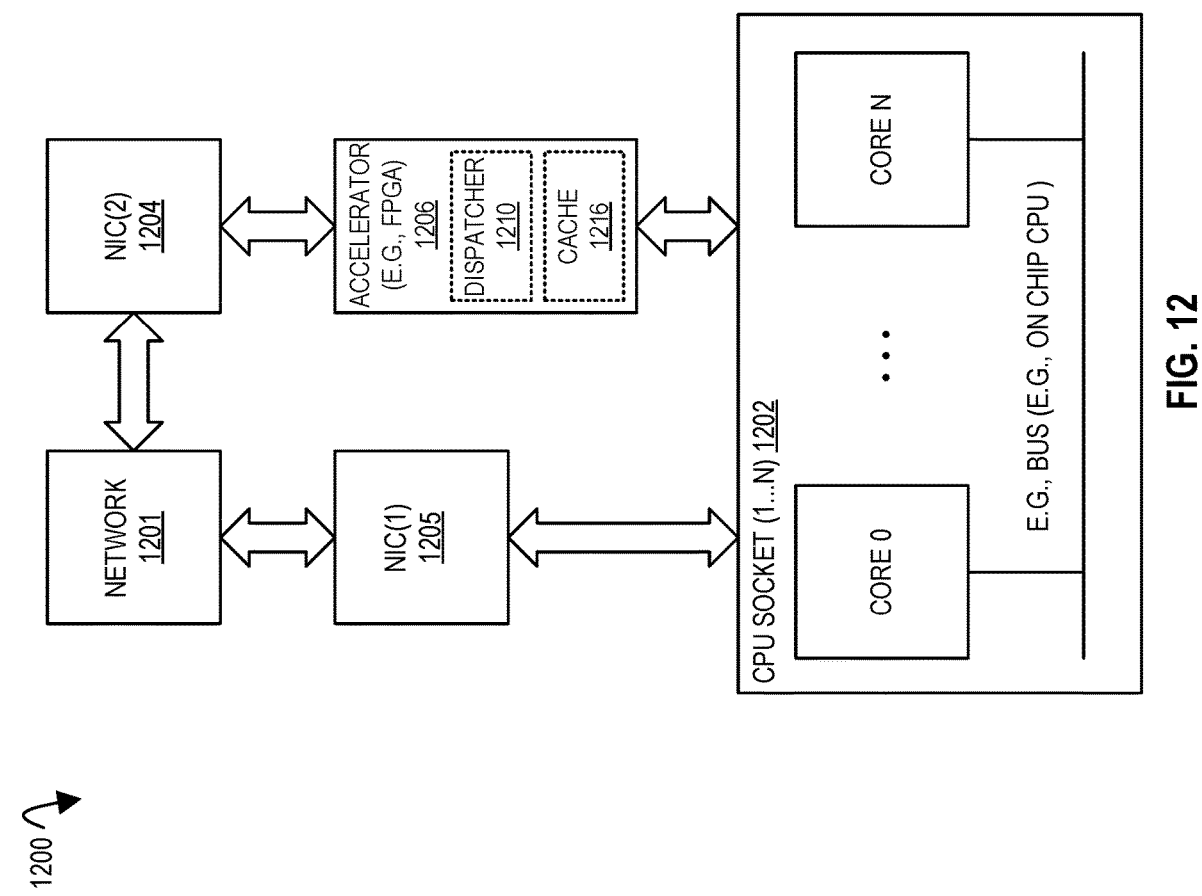
FIG. 12 illustrates circuitry for blockchain transaction acceleration according to embodiments of the disclosure.

FIG. 12 illustrates circuitry 1200 for blockchain transaction acceleration according to embodiments of the disclosure. In this section, a specific implementation of blockchain accelerator circuitry is discussed utilizing one or more of the components discussed herein. In FIG. 12, example functionality (e.g., responsibilities) may be the functionality depicted next to each component in FIG. 10 and example interfaces depicted next to each interface (shown as block arrows) in FIG. 10. Note that these are examples, and one or more of the functionalities may be performed by one or more of the components. Externally generated transactions and blocks enter circuitry 1200 at the top of the drawing from a network 1201, through the first NIC 1205 or the second NIC 1204). The depicted (e.g., smart) NIC 1204 may offload computationally expensive (e.g., ECDSA) key recovery and signature validation to dedicated circuits on the accelerator 1206 (e.g., FPGA or ASIC). The NIC 1204 and/or accelerator 1206 may track block content and send out requests to peers for any missing transactions. The core(s) of socket 1202 (e.g., processor) may be responsible for running the distributed ledger system. Valid blocks and transactions may be passed to the core(s) (e.g., from cache 1216) where they are executed against the ledger. New transactions may be initiated out of the core(s) at the request of users, and new blocks may be initiated as part of the peer to peer consensus protocol. Optimized libraries may accelerate (e.g., Merkle tree) hashing and (e.g., ECDSA) signing, and dedicated accelerator(s) 1206 may compress and decompress data which may be stored directly on chain or hashed and stored off chain with an on chain signature. Instructions (e.g., secure enclave instructions) may be executed by the core(s) to provide an isolated execution environment for secure or private transactions, which may include a private side ledger. An attached accelerator 1206 (e.g., FPGA or ACIS) may provide dedicated hardware resources to accelerate highly expensive zero knowledge proof or homomorphic encryption operations, returning either valid/invalid, and a set of ledger state updates. The accelerator 1206 may also connect to a GPS receiver and/or an atomic clock (e.g., as shown in FIGS. 13 and 14) to provide a source of trusted absolute time. Cache 1216 may be included within the accelerator 1206, e.g., to store blockchain data.

In certain embodiments, dispatcher circuit 1210 is to route blockchain data (e.g., packets) between accelerator 1206 and NIC 1204 (e.g., to network 1101), e.g., and not route that data (e.g., directly) to the socket 1202 (e.g., processor core(s)). In one embodiment, a port or ports of the second NIC 1204 are reserved (e.g., assigned) for blockchain data (e.g., packets) of the network 1201 and send that data to and/or from accelerator 1206. In one embodiment, a port or ports of the first NIC 1205 is reserved (e.g., assigned) for blockchain data (e.g., packets) of the network 1201 and send that data to and/or from accelerator 1206. In one embodiment, the network 1201 is the internet. In the depicted embodiment, the dispatcher 1210 is shown as a component of the accelerator 1206, for example, and not a part of the NIC 1204 or NIC 1205. In one embodiment, NIC 1204 is not coupled to (e.g., communicate with) NIC 1205. In one embodiment, the dispatcher is a component of NIC 1204. In certain embodiments, dispatcher circuit 1210 is to route non blockchain data (e.g., packets) between socket 1202 (e.g., to a processor or a core or cores of a processor) and NIC 1204 (e.g., to network 1201), e.g., and not route that data to the accelerator 1206. In one embodiment, dispatcher circuit 1210 is to cause a port or ports (e.g., all ports) of the NIC 1204 to be reserved (e.g., assigned) for blockchain data (e.g., packets) of the network 1201 and send that data to and/or from accelerator 1206. In one embodiment, dispatcher circuit 1210 is to cause a port or ports (e.g., all ports) of the NIC 1204 to be reserved (e.g., assigned) for non blockchain data (e.g., packets) of the network 1201 and send that data to and/or socket 1202. In certain embodiments, a dispatcher circuit is to inspect incoming data (e.g., an incoming packet) for information that identifies it as a blockchain transaction or a non blockchain transaction. In one embodiment, the dispatcher circuit is to inspect a header of the incoming data (e.g., an incoming packet) for information to determine if the data a blockchain transaction or a non blockchain transaction. In one embodiment, the dispatcher circuit and/or NIC is to determine which port of the NIC that the incoming data (e.g., an incoming packet) is arriving on and compare it to a list of port(s) that are assigned (e.g., only) for blockchain data and a list of port(s) that are assigned (e.g., only) for non blockchain data to determine if the data a blockchain transaction or a non blockchain transaction, respectively. In one embodiment, the dispatcher and/or NIC (e.g., second NIC 1204) is to send outgoing data (e.g., an outgoing packet) on a port of the NIC reserved for blockchain data when the source of the outgoing data is a blockchain accelerator (e.g., a component thereof). In one embodiment, the dispatcher and/or NIC (e.g., first NIC 1205) is to send outgoing data (e.g., an outgoing packet) on a port of the NIC reserved for non blockchain data when the source of the outgoing data is not the blockchain accelerator (e.g., not a component thereof). Example components of accelerator 1206 are discussed herein, for example, in reference to FIGS. 13-17, and 21. Example components of NIC (e.g., second NIC 1204) are discussed herein, for example, in reference to FIGS. 18-20. In one embodiment, dispatcher circuit is a message processing circuit, e.g., as in FIG. 21. In one embodiment, dispatcher circuit includes one or more of the components in FIG. 21. In one embodiment, dispatcher circuit is to receive an incoming blockchain message (or portion of the message) (for example, but not receive any incoming non blockchain messages, e.g., from NIC 1205) and route the blockchain message to the corresponding component of the accelerator, e.g., one or more of the components in FIGS. 15-17. In one embodiment, the blockchain message includes blockchain data and/or a request for a blockchain operation (e.g., on that blockchain data). In one embodiment, dispatcher circuit is to receive an incoming blockchain packet (or portion of the packet) (for example, but not receive any incoming non blockchain packets, e.g., from NIC 1205) and route the blockchain packet to the corresponding component of the accelerator, e.g., one or more of the components in FIGS. 15-17.

In one embodiment, socket (e.g., or a core) is to send (e.g., in response to an instruction being decoded into a decoded instruction by a decoder circuit and the decoded instruction being executed by an execution unit (circuit)) a message (e.g., command) into the accelerator, for example, as an offload for the accelerator to process (e.g., outgoing) blockchain messages and/or to configure the accelerator to perform blockchain operations. In one embodiment, (e.g., during startup) there is a configuration phase where the socket (e.g., or core) prepares the accelerator to perform the desired functionality (e.g., one or more of the functionalities discussed herein).

A discussion of example accelerator architectures follows, however, these are merely examples. For example, a hardware accelerator may include a message processing circuit, e.g., message processing circuit 2150 from FIG. 21. An accelerator used for blockchain transaction acceleration may be any accelerator disclosed herein. For example, accelerator 1006 in FIG. 10, accelerator 1106 in FIG. 11, or accelerator 1206 in FIG. 12 may be accelerator 1300 in FIG. 13, accelerator 1400 in FIG. 14, accelerator from circuitry 2300 in FIG. 23, or an accelerator including one or more (e.g., any) of the components in FIG. 22 (for example, an accelerator including from one or more of circuits 2210, 2220, 2230, 2240, or 2250).

FIG. 13 illustrates a hardware accelerator 1300 for blockchain transaction acceleration according to embodiments of the disclosure. In the depicted embodiment, hardware accelerator 1300 includes a transaction processing circuit 1302 and a block processing circuit 1304. Transaction processing circuit 1302 may include one or more of the components of transaction processing circuit 1510 in FIG. 15. Block processing circuit 1304 may include one or more of the components of block processing circuit 1620 in FIG. 16. Cache 1301 may be included within the accelerator 1300, e.g., to store data for transaction processing circuit 1302 and/or block processing circuit 1304. In one embodiment, a dispatcher circuit (e.g., message processing circuit 1350) is to route an operation to one of the transaction processing circuit 1302 or block processing circuit 1304 based on the type of operation, for example, a transaction operation is routed to the transaction processing circuit 1302 and a block transaction is routed to block processing circuit 1304. In one embodiment, message processing circuit 1350 is a component within accelerator 1300. In one embodiment, a block type of operation (e.g., block operation) includes deduplication, checking that a previous block hash is correct, recovering the public key used to sign the block, checking the block signature (e.g., signature verification), checking the block integrity (e.g., validating the block), retrieving all transactions referenced by the block, and/or that the proof of work meets the requirements. In one embodiment, a transaction type of operation (e.g., transaction operation) includes deduplication, recovering the public key used to sign the transaction, checking the transaction signature (e.g., signature verification), checking the transaction integrity (e.g., validating the transaction), checking that the sum of the inputs equals the sum of the outputs (e.g., for Bitcoin), and/or checking that a (e.g., smart) contract executes successfully.

Transaction processing circuit 1302 may be coupled to block processing circuit 1304, e.g., to pass data therebetween. Accelerator 1300 may also include (e.g., within the circuitry or via a coupling to) a Global Positioning System (GPS) receiver 1303 and/or an atomic clock 1305, e.g., to provide a (e.g., trusted absolute) time, e.g., for use in providing a timestamp for a transaction and/or a block of transactions (e.g., timestamped on creation or finalization of that transaction or block).

FIG. 14 illustrates a hardware accelerator 1400 for blockchain transaction acceleration according to embodiments of the disclosure. In the depicted embodiment, hardware accelerator 1400 includes a transaction processing circuit 1402, a block processing circuit 1404, and a peer processing circuit 1406. Transaction processing circuit 1302 may include one or more of the components of transaction processing circuit 1510 in FIG. 15. Block processing circuit 1304 may include one or more of the components of block processing circuit 1620 in FIG. 16. Peer processing circuit 1406 may include one or more of the components of peer processing circuit 1730 in FIG. 17. Cache 1401 may be included within the accelerator 1400, e.g., to store data for transaction processing circuit 1402, block processing circuit 1404, and/or peer processing circuit 1406. In one embodiment, a dispatcher circuit (e.g., message processing circuit 1450) is to route an operation to one of the transaction processing circuit 1402, block processing circuit 1404, or peer processing circuit 1406 based on the type of operation, for example, a transaction operation is routed to the transaction processing circuit 1402, a block transaction is routed to block processing circuit 1404, and a peer operation is routed to peer processing circuit 1406. In one embodiment, message processing circuit 1450 is a component within accelerator 1400.

In one embodiment, a block type of operation (e.g., block operation) includes deduplication, checking that a previous block hash is correct, recovering the public key used to sign the block, checking the block signature (e.g., signature verification), checking the block integrity (e.g., validating the block), retrieving all transactions referenced by the block, and/or that the proof of work meets the requirements. In one embodiment, a transaction type of operation (e.g., transaction operation) includes deduplication, recovering the public key used to sign the transaction, checking the transaction signature (e.g., signature verification), checking the transaction integrity (e.g., validating the transaction), checking that the sum of the inputs equals the sum of the outputs (e.g., for Bitcoin), and/or checking that a (e.g., smart) contract executes successfully. In one embodiment, a peer type of operation (e.g., peer operation) includes requesting a missing transaction of a block from peers (e.g., via the network), or requesting a missing block from peers. In one embodiment, a peer type of operation (e.g., peer operation) includes sending a missing transaction of a block or a missing block to peers (e.g., via the network), sending a requested transaction or requested block to peers (e.g., via the network), responding to peer requests for discovery of additional peers, registering a peer (e.g., for participation in the blockchain operations), or unregistering a peer (e.g., from participation in the blockchain operations). Transaction processing circuit 1402 may be coupled to block processing circuit 1404 and/or peer processing circuit 1406, e.g., to pass data therebetween. Block processing circuit 1404 may be coupled to peer processing circuit 1406, e.g., to pass data therebetween. Accelerator 1400 may also include (e.g., within the circuitry or via a coupling to) a Global Positioning System (GPS) receiver 1403 and/or an atomic clock 1405, e.g., to provide a (e.g., trusted absolute) time, e.g., for use in providing a timestamp for a transaction and/or a block of transactions (e.g., timestamped on creation or finalization of that transaction or block).

Figure 15:
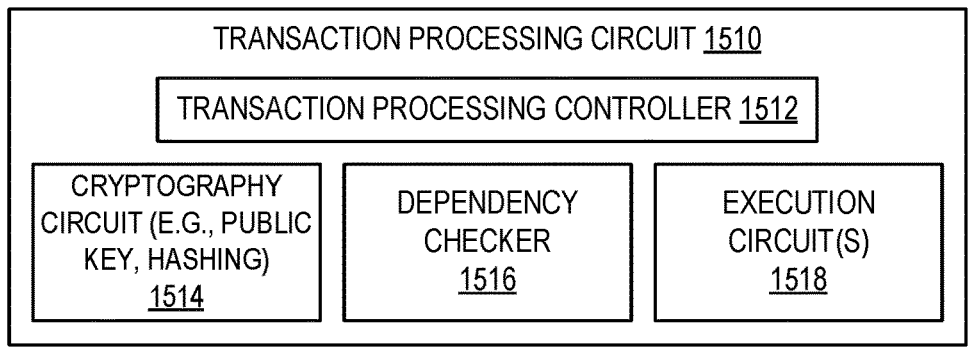
FIG. 15 illustrates a transaction processing circuit according to embodiments of the disclosure.
Figure 16:
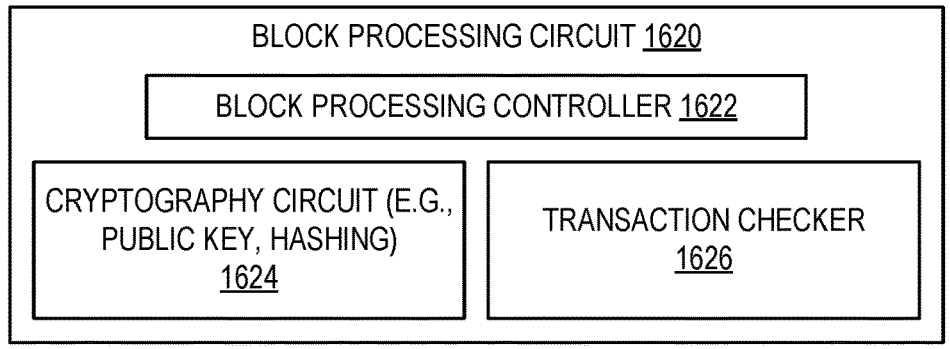
FIG. 16 illustrates a block processing circuit according to embodiments of the disclosure.
Figure 17:
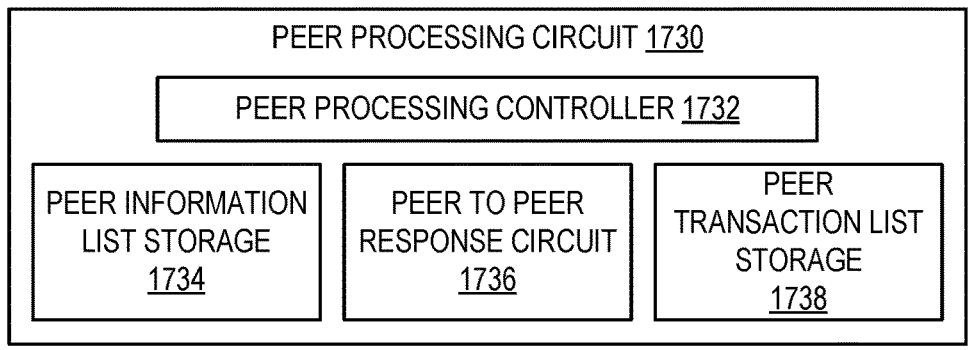
FIG. 17 illustrates a peer processing circuit according to embodiments of the disclosure.

The following FIGS. 15-17 are examples of a transaction processing circuit, block processing circuit, and peer processing circuit, e.g., as the circuits utilized in FIGS. 13-14, 18-19, and 22-24.

FIG. 15 illustrates a transaction processing circuit 1510 according to embodiments of the disclosure. Depicted transaction processing circuit 1510 includes a transaction processing controller 1512, a cryptography circuit 1514, dependency checker 1516 (e.g., circuit), and an execution circuit(s) 1518. In certain embodiments, the transaction processing controller 1512 orchestrates transaction processing through the transaction processing circuit 1510. In one embodiment, the transaction processing controller 1512 receives data (for example, a request and/or data for a transaction operation, e.g., received from a dispatcher circuit) and sequences its processing through the cryptography circuit 1514, dependency checker 1516 (e.g., circuit), and execution circuit(s) 1518, for example, based on the request. In one embodiment, if at any time a transaction processing controller detects a condition its circuits (e.g., 1514, 1516, 1518) are not able to handle, transaction processing controller will reroute the transaction to a core (e.g., core 2205 in FIG. 22) for further processing. In one embodiment, the transaction processing controller 1512 receives a request for a transaction operation and routes it to the cryptography circuit 1514, then to the dependency checker 1516 (e.g., circuit), and then to the execution circuit(s) 1518. In certain embodiments, cryptography circuit 1514 is to perform cryptographic operations, including, but not limited to public key and hashing operations. In one embodiment, cryptography circuit 1514 is to perform public key operations for key extraction and message signature verification for a transaction. In one embodiment, cryptography circuit 1514 is to perform hashing operations to compute a message hash for signature verification for a transaction. In one embodiment, cryptography circuit 1514 is to perform a digital signature operation. In certain embodiments, dependency checker 1516 (e.g., circuit) is to check a transaction for dependencies, e.g., and then send the dependencies (e.g., to a peer processing circuit) to retrieve any missing transactions. In certain embodiments, execution circuit(s) 1518 are to (e.g., immediately and/or without utilizing the core of a processor) execute a subset of transaction types. As one example, a transaction type to be executed by execution circuit(s) 1518 may be based on the action requested. In one embodiment, the action requested is a transfer of an item (e.g., a Bitcoin) from party A to party B, but does not involve more than two parties (e.g., such that a transaction type not to be executed by execution circuit(s) 1518 are passed to the host processor for execution therein).

FIG. 16 illustrates a block processing circuit 1620 according to embodiments of the disclosure. Depicted block processing circuit 1620 includes a block processing controller 1622, a cryptography circuit 1624, and a transaction checker 1626 (e.g., circuit). In certain embodiments, the block processing controller 1622 orchestrates block processing through the block processing circuit 1620. In one embodiment, the block processing controller 1622 receives data (for example, a request for a block operation, e.g., received from a dispatcher circuit) and sequences its processing through the cryptography circuit 1624 and the transaction checker 1626 (e.g., circuit), for example, based on the request. In one embodiment, if at any time a block processing controller detects a condition its circuits (e.g., 1624, 1626) are not able to handle, block processing controller will reroute the block to a core (e.g., core 2205 in FIG. 22) for further processing. In one embodiment, the block processing controller 1512 receives a request for a block operation and routes it to the cryptography circuit 1624, then to the transaction checker 1626 (e.g., circuit). In certain embodiments, cryptography circuit 1624 is to perform cryptographic operations, including, but not limited to public key and hashing operations. In one embodiment, cryptography circuit 1624 is to perform public key operations for key extraction and message signature verification for a block. In one embodiment, cryptography circuit 1624 is to perform hashing operations to compute a message hash for signature verification for a block. In certain embodiments, transaction checker 1626 (e.g., circuit) is to extract a list of the transaction(s) from a block, e.g., and then request any missing transactions (e.g., via a peer processing circuit).

FIG. 17 illustrates a peer processing circuit 1730 according to embodiments of the disclosure. Depicted block processing circuit 1730 includes a peer processing controller 1732, peer information list storage 1734, peer to peer (p2p) response circuit 1736, and peer transaction list storage 1738. In certain embodiments, the peer processing controller 1732 orchestrates peer to peer processing through the peer processing circuit 1730. In certain embodiments, the peer processing controller 1732 manages (e.g., updates) the information data structure (e.g., list or table) in peer information list storage 1734, manages (e.g., updates) the transaction data structure (e.g., list or table) in peer transaction list storage 1738, and/or orchestrates peer to peer responses via peer to peer (p2p) response circuit 1736. In one embodiment, the peer processing controller 1732 receives data (for example, a request for a peer to peer operation, e.g., received from a dispatcher circuit) and routes it to one of the peer information list storage 1734, peer to peer (p2p) response circuit 1736, and peer transaction list storage 1738, for example, based on the request. In one embodiment, if at any time a peer processing controller detects a condition its circuits (e.g., 1734, 1736, 1738) are not able to handle, peer processing controller will reroute the peer request to a core (e.g., core 2205 in FIG. 22) for further processing. In certain embodiments, peer information list storage 1734 is updated (e.g., by peer processing controller 1732) with information about peer nodes, such as, but not limited to, network (e.g., IP) address, public key, network latency, etc. In certain embodiments, peer transaction list storage 1738 is updated (e.g., by peer processing controller 1732) with information about (e.g., recent) transactions for use in responding to transaction requests from peers and/or identifying missing dependencies, e.g., from a transaction processing circuit or a block processing circuit. In certain embodiments, peer to peer (p2p) response circuit 1736 is to process and respond to peer to peer network requests, including, but not limited to, connect, disconnect, request peer list, request transaction, and request block.

In one embodiment, one of (e.g., each of) transaction processing circuit, block processing circuit, and peer processing circuit is to communicate with one or more of the other of the transaction processing circuit, block processing circuit, and peer processing circuit, for example, to pass data therebetween.

Figure 18:
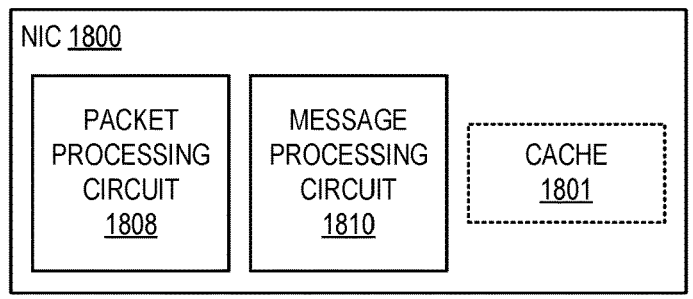
FIG. 18 illustrates a network interface circuit (NIC) according to embodiments of the disclosure.

FIG. 18 illustrates a network interface circuit (NIC) 1800 according to embodiments of the disclosure. In the depicted embodiment, NIC 1800 includes a packet processing circuit 1808 and a message processing circuit 1810. Packet processing circuit 1808 may include one or more of the components of packet processing circuit 2040 in FIG. 20. Message processing circuit 1810 may include one or more of the components of message processing circuit 2150 in FIG. 21. Cache 1801 may be included within the NIC 1800, e.g., to store data for packet processing circuit 1808 and/or a message processing circuit 1810. In certain embodiments, a packet processing circuit 1808 is to receive data (e.g., parts of a packet) and send that data (e.g., once assembled into a whole packet) to the message processing circuit 1810.

In one embodiment, a dispatcher circuit (e.g., message processing circuit 1810) is to route an operation to an accelerator (e.g., to one of a transaction processing circuit, block processing circuit, and/or peer processing circuit) based on the type of operation, for example, a transaction operation is routed to the transaction processing circuit, a block transaction is routed to block processing circuit, and/or a peer operation is routed to peer processing circuit. In one embodiment, a block type of operation (e.g., block operation) includes deduplication, checking that a previous block hash is correct, recovering the public key used to sign the block, checking the block signature (e.g., signature verification), checking the block integrity (e.g., validating the block), retrieving all transactions referenced by the block, and/or that the proof of work meets the requirements. In one embodiment, a transaction type of operation (e.g., transaction operation) includes deduplication, recovering the public key used to sign the transaction, checking the transaction signature (e.g., signature verification), checking the transaction integrity (e.g., validating the transaction), checking that the sum of the inputs equals the sum of the outputs (e.g., for Bitcoin), and/or checking that a (e.g., smart) contract executes successfully. In one embodiment, a peer type of operation (e.g., peer operation) includes requesting a missing transaction of a block from peers (e.g., via the network), or requesting a missing block from peers. In one embodiment, a peer type of operation (e.g., peer operation) includes sending a missing transaction of a block or a missing block to peers (e.g., via the network), sending a requested transaction or requested block to peers (e.g., via the network), responding to peer requests for discovery of additional peers, registering a peer (e.g., for participation in the blockchain operations), or unregistering a peer (e.g., from participation in the blockchain operations). Packet processing circuit 1808 may be coupled to message processing circuit 1810, e.g., to pass data therebetween. NIC 1800 (e.g., and any other component in this disclosure) may include a transceiver (e.g., a receiver and/or transmitter) to receive and/or send data. In one embodiment, NIC 1800 is coupled to a network, e.g., network 2401 in FIG. 24.

Figure 19:
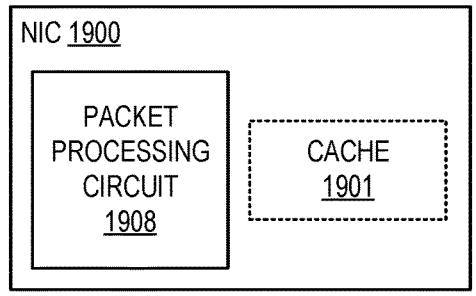
FIG. 19 illustrates a network interface circuit (NIC) according to embodiments of the disclosure.

FIG. 19 illustrates a network interface circuit (NIC) 1900 according to embodiments of the disclosure. In the depicted embodiment, NIC 1900 includes a packet processing circuit 1808. Packet processing circuit 1808 may include one or more of the components of packet processing circuit 2040 in FIG. 20. Cache 1901 may be included within the NIC 1900, e.g., to store data for packet processing circuit 1908. In certain embodiments, a packet processing circuit 1808 is to receive data (e.g., parts of a packet) from a network and send that data (e.g., once assembled into a whole packet) to an accelerator (e.g., to a dispatcher circuit of the accelerator). In one embodiment, a dispatcher circuit (e.g., message processing circuit) is to route an operation (e.g., a requested operation) to one of a transaction processing circuit, block processing circuit, and/or peer processing circuit of an accelerator based on the type of operation, for example, a transaction operation is routed to the transaction processing circuit, a block transaction is routed to block processing circuit, and/or a peer operation is routed to peer processing circuit. In one embodiment, a block type of operation (e.g., block operation) includes deduplication, checking that a previous block hash is correct, recovering the public key used to sign the block, checking the block signature (e.g., signature verification), checking the block integrity (e.g., validating the block), retrieving all transactions referenced by the block, and/or that the proof of work meets the requirements. In one embodiment, a transaction type of operation (e.g., transaction operation) includes deduplication, recovering the public key used to sign the transaction, checking the transaction signature (e.g., signature verification), checking the transaction integrity (e.g., validating the transaction), checking that the sum of the inputs equals the sum of the outputs (e.g., for Bitcoin), and/or checking that a (e.g., smart) contract executes successfully. In one embodiment, a peer type of operation (e.g., peer operation) includes requesting a missing transaction of a block from peers (e.g., via the network), or requesting a missing block from peers. In one embodiment, a peer type of operation (e.g., peer operation) includes sending a missing transaction of a block or a missing block to peers (e.g., via the network), sending a requested transaction or requested block to peers (e.g., via the network), responding to peer requests for discovery of additional peers, registering a peer (e.g., for participation in the blockchain operations), or unregistering a peer (e.g., from participation in the blockchain operations). NIC 1900 (e.g., and any other component in this disclosure) may include a transceiver (e.g., a receiver and/or transmitter) to receive and/or send data. In one embodiment, NIC 1900 is coupled to a network, e.g., network 2401 in FIG. 24.

Figure 20:
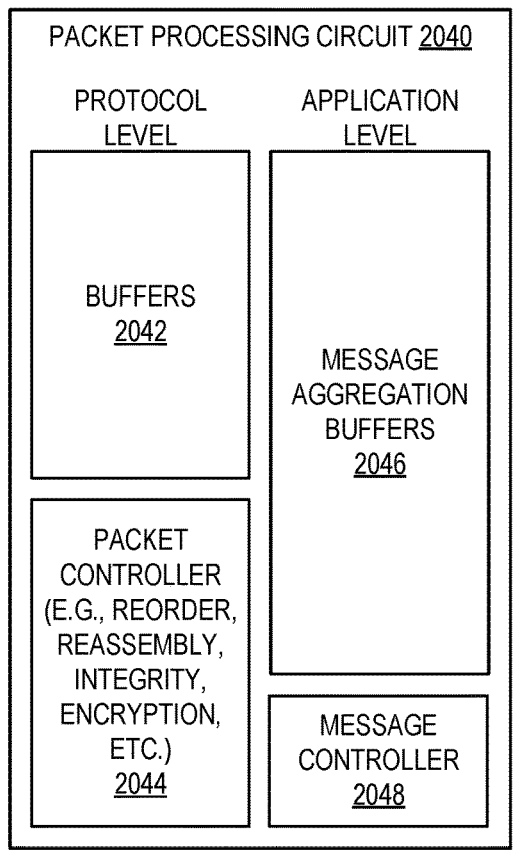
FIG. 20 illustrates a packet processing circuit according to embodiments of the disclosure.
Figure 21:
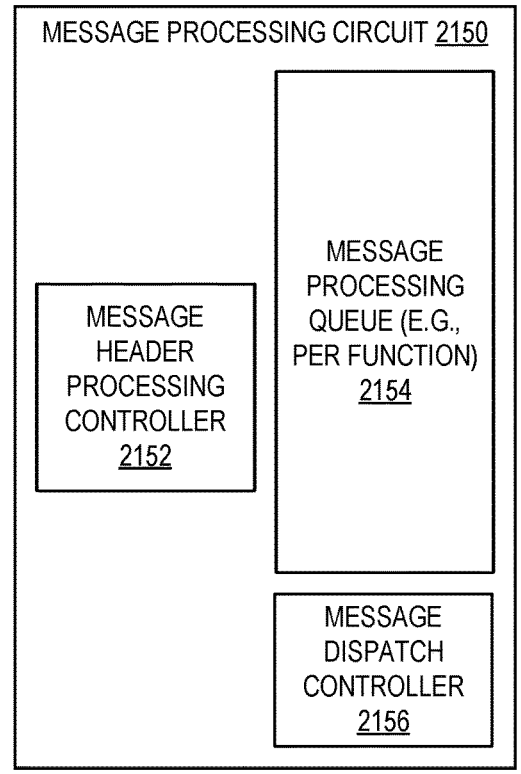
FIG. 21 illustrates a message processing circuit according to embodiments of the disclosure.

The following FIGS. 20-21 are examples of a packet processing circuit and a message processing circuit, e.g., as the circuits utilized in FIGS. 13-14, 18-19, and 22-24.

FIG. 20 illustrates a packet processing circuit 2040 according to embodiments of the disclosure. In one embodiment, packet processing circuit 2040 is to receive data (e.g., parts of a packet) from a network and send that data (e.g., once assembled into a whole packet) to an accelerator (e.g., to a dispatcher circuit of the accelerator). Depicted packet processing circuit 2040 includes buffers 2042, packet controller 2044, message aggregation buffers 2046, and message controller 2048. In one embodiment, buffers 2042 and packet controller 2044 are at a protocol level and/or message aggregation buffers 2046 and message controller 2048 are at an application level. In certain embodiments, the buffers are to store incoming packets (or parts of an incoming packet) from the network for processing and/or outgoing packets (or parts of an outgoing packet) for transmission. In one embodiment, packet controller 2044 processes packets, including, but not limited to, reorder, assembly, integrity, encryption, and queue management. In one embodiment, packet controller 2044 performs a reorder operation to correctly order packets that arrive out of order. In one embodiment, packet controller 2044 performs an assembly operation to reassemble split incoming packets into a message and/or splits outgoing (e.g., large) messages into smaller (e.g., packet) sized chunks. In one embodiment, packet controller 2044 performs an integrity operation to check integrity of incoming packets and request retransmission if necessary and/or for outgoing packets, calculate and attach integrity codes. In one embodiment, packet controller 2044 performs encryption for an outgoing packet and/or decryption for an incoming packet. In one embodiment, packet controller 2044 performs a queue management operation to handle packet buffering in the buffers 2042. In one embodiment, message aggregation buffers 2046 are to store message fragments as a message or messages are reassembled from incoming packets and/or store (e.g., long) messages for breaking into smaller packet fragments for outgoing packets. In one embodiment, message controller is to aggregate packets in message aggregation buffers 2046, for example, by sending received data that belongs to a message to any previous received portion of that message until the entire message is formed in message aggregation buffers 2046. In one embodiment, a completed incoming message in message aggregation buffers 2046 may then be sent (e.g., as caused by the message controller 2048) to a dispatcher circuit (e.g., message processing circuit) of an accelerator.

FIG. 21 illustrates a message processing circuit 2150 according to embodiments of the disclosure. Message processing circuit 2150 may receive data for a blockchain operation (for example, a message or a packet from a network, e.g., via a packet processing circuit) and then route that data for the blockchain operation (e.g., route the operation request and/or the data to be operated on) to the appropriate component(s) of a blockchain accelerator for further processing. Depicted message processing circuit 2150 includes message header processing controller 2152, message processing queue 2154, and message dispatch controller 2156. In one embodiment, message header processing controller is to inspect the incoming message (e.g., metadata and/or header of the message) to determine (e.g., per function) where in the message processing queue 2154 the incoming message is to be stored (e.g., and for outgoing data, it is to insert a header or metadata). For example, for an accelerator with one or more instances of a transaction processing circuit, block processing circuit, and peer processing circuit, three different areas of the message processing queue 2154 may be used to store each respective type of message, e.g., stored until an instance of that circuit has availability to operate on the next data from the message processing queue 2154. For example, for an accelerator with a transaction processing circuit and a block processing circuit, two different areas of the message processing queue 2154 may be used to store each respective type of message, e.g., stored until that circuit has availability to operate on the next data from the message processing queue 2154. In one embodiment, message processing queue 2154 (e.g., per function) provides per function message queuing (e.g., for transaction, block, and peer). In one embodiment, message dispatch controller 2156 is to forward messages to available circuits of an accelerator (e.g., for an accelerator with a transaction processing circuit, block processing circuit, and peer processing circuit) for processing. In one embodiment, there are multiple instances of one or more of each of a transaction processing circuit, block processing circuit, and peer processing circuit, e.g., for load balancing, and the message dispatch controller is responsible for routing messages of the appropriate type to the processing circuits.

In certain embodiments, a dispatcher circuit (e.g., message processing circuit 2150) includes a message header processing controller 2152 to receive data (e.g., that is to be operated on) and is to route that data (e.g., corresponding to the message) to one of a transaction processing circuit and a block processing circuit, for example, directly or through message processing queue 2154 and/or message dispatch controller 2156. In certain embodiments, a dispatcher circuit (e.g., message processing circuit 2150) includes a message header processing controller 2152 to receive data (e.g., that is to be operated on) and is to route that data to one of a transaction processing circuit, block processing circuit, and peer processing circuit, for example, directly or through message processing queue 2154 and/or message dispatch controller 2156. In one embodiment, message header processing controller 2152 is to inspect a field of the incoming data (e.g., data message) and route the data (for example, payload of the data message, e.g., with or without the header) based on that field, for example, where a field indicating a transaction operation (e.g., is to be performed) causes the data (e.g., message) to be routed to a transaction processing circuit, a field indicating a block transaction (e.g., is to be performed) causes the data (e.g., packet) to be routed to a block processing circuit, and/or a field indicating a peer operation (e.g., is to be performed) causes the data (e.g., message) to be routed to a peer processing circuit. As one example, a blockchain may be a Bitcoin type of blockchain that has a message structure according to Table 1 below.

TABLE 1

Example Message Structure

| Field Bit Size | Description | Data type | Comments |
| --- | --- | --- | --- |
| 4 | magic | uint32_t | Magic value indicating message origin network, and used to seek to next message when stream state is unknown |
| 12 | command | char[12] | ASCII string identifying the packet content, NULL padded (non-NULL padding results in packet rejected) |
| 4 | length | uint32_t | Length of payload in number of bytes |
| 4 | checksum | uint32_t | First 4 bytes of hash (e.g., sha256(sha256(payload))) |
| variable | payload | uchar[ ] | The actual data |

In one embodiment, the message header processing controller 2152 is to inspect the command field (e.g., as shown in Table 1) to determine where to route the data (e.g., message), for example, to one of a transaction processing circuit, a block processing circuit, and a peer processing circuit. In one embodiment, a block field (e.g., in a header of a message) indicates a block message (e.g., or payload thereof) and the message header processing controller 2152 causes the data (e.g., message or payload thereof) to be routed to a block processing circuit, a transaction field (e.g., in a header of a message) indicates a transaction message and the message header processing controller 2152 causes the data (e.g., message or payload thereof) to be routed to a transaction processing circuit, and/or a peer field (e.g., in a header of a message) indicates a peer message and the message header processing controller 2152 causes the data (e.g., message or payload thereof) to be routed to a peer processing circuit. In one embodiment, an outgoing command is sent to the peer network and the returning data (e.g., message) includes a header (e.g., or metadata) that indicates it is a block message, a transaction message, or a peer message, and the message header processing controller 2152 routes the returning data according to the header (e.g., or metadata). In certain embodiments, a (e.g., input) message includes a header, metadata, or other data indicating the message (e.g., payload data thereof) is a block message, a transaction message, or a peer message, and the message processing circuit (e.g., message header processing controller thereof) routes the message (e.g., payload data thereof or a request message) to a transaction processing circuit, a block processing circuit, or a peer processing circuit, respectively. In one embodiment, each of a transaction processing circuit, a block processing circuit, or a peer processing circuit is to perform one or more operations (e.g., as discussed herein) on that message, for example, performing operation(s) on the payload data thereof or a performing a fulfillment operation for a requested action of the request message.

Figure 22:
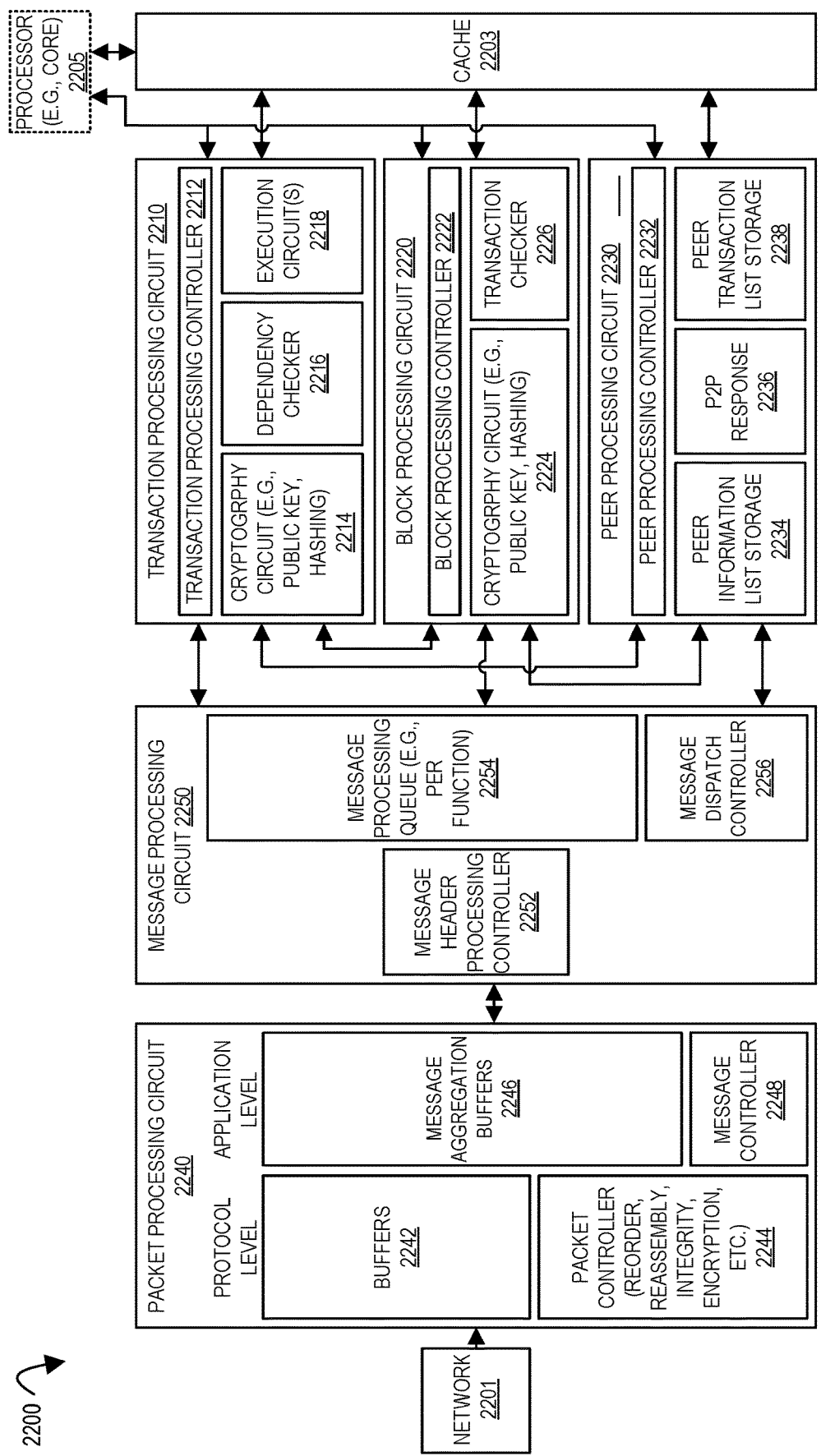
FIG. 22 illustrates circuitry for blockchain transaction acceleration according to embodiments of the disclosure.

FIG. 22 illustrates circuitry 2200 for blockchain transaction acceleration according to embodiments of the disclosure. Depicted circuitry 2200 includes a packet processing circuit 2240 coupled to message processing circuit 2250. Depicted message processing circuit 2250 is coupled to transaction processing circuit 2210, block processing circuit 2220, and peer processing circuit 2230. In one embodiment, each one of transaction processing circuit 2210, block processing circuit 2220, and peer processing circuit 2230 are coupled to the others of transaction processing circuit 2210, block processing circuit 2220, and peer processing circuit 2230. In one embodiment, transaction processing circuit 2210, block processing circuit 2220, and peer processing circuit 2230 are each coupled to a processor (e.g., a core) 2205. In certain embodiments, processor (e.g., a core) 2205 is to offload certain operations of a blockchain transaction, for example, offload to the components (e.g., transaction processing circuit 2210, block processing circuit 2220, and peer processing circuit 2230) that form an accelerator. In one embodiment, accelerator includes at least one of (or all of) transaction processing circuit 2210, block processing circuit 2220, and peer processing circuit 2230. In one embodiment, accelerator further includes message processing circuit 2250 (e.g., and not packet processing circuit 2240.). In one embodiment, NIC (e.g., separate from the accelerator) includes packet processing circuit 2240. Cache 2203 may be included, e.g., coupled to transaction processing circuit 2210, block processing circuit 2220, peer processing circuit 2230, and/or processor (e.g., core) 2205. In one embodiment, cache 2203 is used to pass data between accelerator and processor (e.g., core) 2205.

In one embodiment, packet processing circuit 2240 is to receive data (e.g., parts of a packet) from network 2201 (e.g., network 2401 in FIG. 24) and send that data (e.g., once assembled into a whole packet) to an accelerator (e.g., to a dispatcher circuit of the accelerator). Depicted packet processing circuit 2240 includes buffers 2242, packet controller 2244, message aggregation buffers 2246, and message controller 2248. In one embodiment, buffers 2242 and packet controller 2244 are at a protocol level and/or message aggregation buffers 2246 and message controller 2248 are at an application level. In certain embodiments, the buffers are to store incoming packets (or parts of an incoming packet) from the network for processing and/or outgoing packets (or parts of an outgoing packet) for transmission. In one embodiment, packet controller 2244 processes packets, including, but not limited to, reorder, assembly, integrity, encryption, and queue management. In one embodiment, packet controller 2244 performs a reorder operation to correctly order packets that arrive out of order. In one embodiment, packet controller 2244 performs an assembly operation to reassemble split incoming packets into a message and/or splits outgoing (e.g., large) messages into smaller (e.g., packet) sized chunks. In one embodiment, packet controller 2244 performs an integrity operation to check integrity of incoming packets and request retransmission if necessary and/or for outgoing packets, calculate and attach integrity codes. In one embodiment, packet controller 2244 performs encryption for an outgoing packet and/or decryption for an incoming packet. In one embodiment, packet controller 2244 performs a queue management operation to handle packet buffering in the buffers 2242. In one embodiment, message aggregation buffers 2246 are to store message fragments as messages are reassembled from incoming packets and/or store long messages for breaking into smaller packet fragments for outgoing packets. In one embodiment, message controller is to aggregate packets in message aggregation buffers 2046, for example, by sending a received data that belongs to a message to any previous received portion of that message until the entire message is formed in message aggregation buffers 2046. In one embodiment, a completed incoming message in message aggregation buffers 2046 may then be sent (e.g., as caused by the message controller 2248) to a dispatcher circuit (e.g., message processing circuit 2250) of an accelerator.

Message processing circuit 2250 may receive data for a blockchain operation (for example, a packet from a network, e.g., via packet processing circuit 2240) and then route that data for the blockchain operation (e.g., route the operation request and/or the data for that operation request) to the appropriate component(s) of a blockchain accelerator for further processing. Depicted message processing circuit 2250 includes message header processing controller 2252, message processing queue 2254, and message dispatch controller 2256. In one embodiment, message header processing controller is to inspect the incoming message (e.g., metadata and/or a header of the message) to determine (e.g., per function) where in the message processing queue 2254 the incoming message is to be stored (e.g., and for outgoing data, it is to insert a header or metadata). For example, for an accelerator with transaction processing circuit 2210, block processing circuit 2220, and peer processing circuit 2230, three different areas of the message processing queue 2254 may be used to store each respective type of message, e.g., stored until that circuit has availability to operate on the next data from the message processing queue 2254. For example, for an accelerator with (e.g., only) a transaction processing circuit 2210 and a block processing circuit 2220, two different areas of the message processing queue 2254 may be used to store each respective type of message, e.g., stored until that circuit has availability to operate on the next data from the message processing queue 2254. In one embodiment, message processing queue 2254 (e.g., per function) provides per function message queuing (e.g., for transaction, block, and peer). In one embodiment, message dispatch controller 2256 is to forward messages to available circuits of an accelerator (e.g., for an accelerator with transaction processing circuit 2210, block processing circuit 2220, and peer processing circuit 2230) for processing. In one embodiment, there are multiple instances of one or more of each of a transaction processing circuit, block processing circuit, and peer processing circuit, e.g., for load balancing.

In certain embodiments, a dispatcher circuit (e.g., message processing circuit 2250) includes a message header processing controller 2252 to receive data (e.g., that is to be operated on) and is to route that data to one of a transaction processing circuit and a block processing circuit, for example, directly or through message processing queue 2254 and/or message dispatch controller 2256. In certain embodiments, a dispatcher circuit (e.g., message processing circuit 2250) includes a message header processing controller 2252 to receive data (e.g., that is to be operated on) and is to route that data to one of a transaction processing circuit, block processing circuit, and peer processing circuit, for example, directly or through message processing queue 2254 and/or message dispatch controller 2256. In one embodiment, message header processing controller 2252 is to inspect a field of the incoming data (e.g., data message from network 2201) and route the data based on that field, for example, a field indicating a transaction operation causes the data (e.g., packet) to be routed to transaction processing circuit 2210, a field indicating a block transaction causes the data (e.g., packet) to be routed to block processing circuit 2220, and/or a field indicating a peer operation causes the data (e.g., packet) to be routed to peer processing circuit 2232. As one example, a blockchain may be a Bitcoin type of blockchain that has a message structure according to Table 1 above.

In one embodiment, the message header processing controller 2252 is to inspect the command field (e.g., as shown in Table 1) to determine where to route the data (e.g., message), for example, to one of transaction processing circuit 2210, block processing circuit 2220, and peer processing circuit 2230. In one embodiment, a block field (e.g., in a header of a message) indicates a block message (e.g., or packets thereof) and the message header processing controller 2252 causes the data (e.g., message) to be routed to block processing circuit 2220, a transaction field (e.g., in a header of a message) indicates a transaction message (e.g., or packets thereof) and the message header processing controller 2252 causes the data (e.g., message) to be routed to transaction processing circuit 2210, and/or a peer field (e.g., in a header of a message) indicates a peer message (e.g., or packets thereof) and the message header processing controller 2252 causes the data (e.g., message) to be routed to peer processing circuit 2230. In one embodiment, an outgoing command is sent to the (e.g., peer) network 2201 and the returning data includes a header that indicates it is a block message, a transaction message, or a peer message, and the message header processing controller 2252 routes the returning data according to the header. In certain embodiments, a message includes a header, metadata, or other data indicating the message (e.g., payload data thereof) is a block message, a transaction message, or a peer message, and the message processing circuit routes the message (e.g., payload data thereof or a request message) to a transaction processing circuit, a block processing circuit, or a peer processing circuit, respectively. In one embodiment, a message includes a request field that indicates a requested action or operation. In one embodiment, a message does not include a request or request field, but the message type (e.g., transaction message, block message, or peer message) is used to route the message (e.g., payload thereof) to a transaction processing circuit, a block processing circuit, or a peer processing circuit such that operations are performed on that message (e.g., payload thereof), for example, as caused by a controller of the transaction processing circuit, block processing circuit, or peer processing circuit.

In one embodiment, each of a transaction processing circuit, a block processing circuit, or a peer processing circuit is to perform one or more operations (e.g., as discussed herein) on a message, for example, performing operation(s) on the payload data thereof or a performing a fulfillment operation for a requested action of the request message). In one embodiment, a transaction message (e.g., including a transaction or identifying a transaction) is sent to transaction processing circuit 2210 to perform an operation(s) for the transaction, e.g., by cryptography circuit 2214, dependency checker 2216 (e.g., circuit), and/or an execution circuit(s) 2218. In one embodiment, a block message (e.g., including a block or identifying a block) is sent to block processing circuit 2220 to perform an operation(s) for the block, e.g., by block processing controller 2222, cryptography circuit 2224, and/or transaction checker 2226 (e.g., circuit). In one embodiment, a peer message (e.g., identifying peer(s) or a request from a peer(s)) is sent to peer processing circuit 2230 to perform an operation(s) for the peer or with the peer, e.g., by peer information list storage 2234, peer to peer (p2p) response circuit 2236, and/or peer transaction list storage 2238.

Depicted transaction processing circuit 2210 includes a transaction processing controller 2212, a cryptography circuit 2214, dependency checker 2216 (e.g., circuit), and an execution circuit(s) 2218. In certain embodiments, the transaction processing controller 2212 orchestrates transaction processing through the transaction processing circuit 2210. In one embodiment, the transaction processing controller 2212 receives transaction data and routes it to one of the cryptography circuit 2214, dependency checker 2216 (e.g., circuit), and execution circuit(s) 2218, for example, based on the request. In one embodiment, the transaction processing controller 2212 receives a transaction message (e.g., received from message processing circuit 2250) and routes it to one of the cryptography circuit 2214, dependency checker 2216 (e.g., circuit), and execution circuit(s) 2218, for example, based on the transaction message. In one embodiment, the transaction processing controller 2212 receives a request for a transaction operation (e.g., received from message processing circuit 2250) and routes it to one of the cryptography circuit 2214, dependency checker 2216 (e.g., circuit), and execution circuit(s) 2218, for example, based on the request. In one embodiment, the transaction processing controller 2212 receives a request for a transaction operation and routes it to the cryptography circuit 2214, then to the dependency checker 2216 (e.g., circuit), and then to the execution circuit(s) 2218. In certain embodiments, cryptography circuit 2214 is to perform cryptographic operations, including, but not limited to public key and hashing operations. In one embodiment, cryptography circuit 2214 is to perform public key operations for key extraction and message signature verification for a transaction. In one embodiment, cryptography circuit 2214 is to perform hashing operations to compute a message hash for signature verification for a transaction. In one embodiment, cryptography circuit 2214 is to perform a digital signature operation. In certain embodiments, dependency checker 2216 (e.g., circuit) is to check a transaction for dependencies, e.g., and then send the dependencies (e.g., to peer processing circuit 2230) to retrieve any missing transactions. For example, a reference to a transaction (e.g., from a block) may come into circuitry 2200 (e.g., transaction processing circuit 2220) and dependency checker 2216 is then to check if circuitry 2200 includes (e.g., in cache 2203) the transaction or if that transaction is missing. In one embodiment, dependency checker 2216 is to cause a request to be sent to the network peers to request they send that missing transaction to circuitry 2200, for example, if circuitry 2200 is in peer (1), the request is sent to one or more (e.g., all) of at least peers (2)-(8) of network 2401. In one embodiment, a transaction is missing from circuitry 2200 because the transaction has not yet been sent to the circuitry 2200 on network 2201 (e.g., the circuitry 2200 has not yet received the transaction). In one embodiment, a transaction is missing from circuitry 2200 because the transaction was removed from the cache 2203, e.g., to make room to store different (e.g., newer) transaction(s).

In certain embodiments, execution circuit(s) 2218 are to (e.g., immediately and/or without utilizing the core of a processor) execute a subset of transaction types. As one example, a transaction type to be executed by execution circuit(s) 2218 may be based on the action requested. In one embodiment, the action requested is a transfer of an item (e.g., a Bitcoin) from party A to party B, but not involved more than two parties (e.g., such that a transaction type not to be executed by execution circuit(s) 2218 are passed to the host processor (e.g., core) 2205 for execution therein).

Depicted block processing circuit 2220 includes a block processing controller 2222, a cryptography circuit 2224, and a transaction checker 2226 (e.g., circuit). In certain embodiments, the block processing controller 2222 orchestrates block processing through the block processing circuit 2220. In one embodiment, the block processing controller 2222 receives block data and routes it to one of the cryptography circuit 2224 and the transaction checker 2226 (e.g., circuit), for example, based on the request. In one embodiment, the block processing controller 2222 receives a block message (e.g., received from message processing circuit 2250) and routes it to one of the cryptography circuit 2224 and the transaction checker 2226 (e.g., circuit), for example, based on the block message. In one embodiment, the block processing controller 2222 receives a request for a block operation (e.g., received from message processing circuit 2250) and routes it to one of cryptography circuit 2224 and the transaction checker 2226 (e.g., circuit), for example, based on the request. In one embodiment, the block processing controller 2212 receives a request for a block operation and routes it to the cryptography circuit 2224, then to the transaction checker 2226 (e.g., circuit). In certain embodiments, cryptography circuit 2224 is to perform cryptographic operations, including, but not limited to public key and hashing operations. In one embodiment, cryptography circuit 2224 is to perform public key operations for key extraction and message signature verification for a block. In one embodiment, cryptography circuit 2224 is to perform hashing operations to compute a message hash for signature verification for a block. In one embodiment, cryptography circuit 2224 is to perform a digital signature operation. In certain embodiments, transaction checker 2226 (e.g., circuit) is to extract a list of the transaction(s) from a block, e.g., and then request any missing transactions (e.g., via peer processing circuit 2230).

Depicted peer processing circuit 2230 includes a peer processing controller 2232, peer information list storage 2234, peer to peer (p2p) response circuit 2236, and peer transaction list storage 2238. In certain embodiments, the peer processing controller 2232 orchestrates peer to peer processing through the peer processing circuit 2230. In certain embodiments, the peer processing controller 2232 manages (e.g., updates) the information data structure (e.g., list or table) in peer information list storage 2234, manages (e.g., updates) the transaction data structure (e.g., list or table) in peer transaction list storage 2238, and/or orchestrates peer to peer responses via peer to peer (p2p) response circuit 2236. In one embodiment, the peer processing controller 2232 receives data and routes it to one of the peer information list storage 2234, peer to peer (p2p) response circuit 2236, and peer transaction list storage 2238, for example, based on the request. In one embodiment, the peer processing controller 2232 receives a peer message (e.g., received from message processing circuit 2250) and routes it to one of the peer information list storage 2234, peer to peer (p2p) response circuit 2236, and peer transaction list storage 2238, for example, based on the peer message. In one embodiment, the peer processing controller 2232 receives a request for a peer operation (e.g., received from message processing circuit 2250) and routes it to one of the peer information list storage 2234, peer to peer (p2p) response circuit 2236, and peer transaction list storage 2238, for example, based on the request. In certain embodiments, peer information list storage 2234 is updated (e.g., by peer processing controller 2232) with information about peer nodes, such as, but not limited to, network (e.g., IP) address, public key, network latency, etc. In certain embodiments, peer transaction list storage 2238 is updated (e.g., by peer processing controller 2232) with information about (e.g., recent) transactions for use in responding to transaction requests from peers and/or identifying missing dependencies, e.g., from transaction processing circuit 2210 or block processing circuit 2220. In certain embodiments, peer to peer (p2p) response circuit 2236 is to process and respond to peer to peer network requests, including, but not limited to, connect, disconnect, request peer list, request transaction, and request block.

Figure 23:
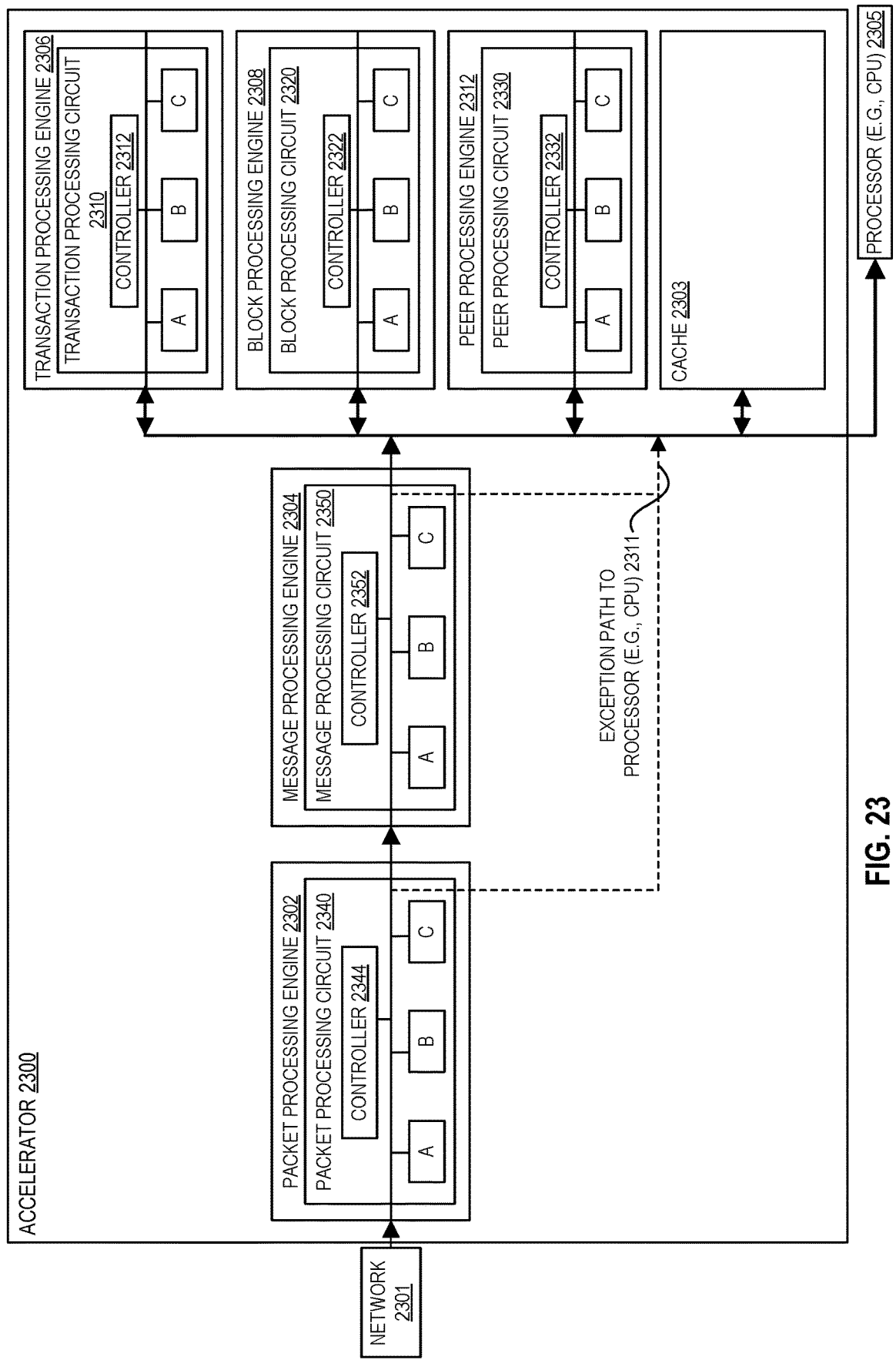
FIG. 23 illustrates circuitry for a hardware accelerator for blockchain transaction acceleration according to embodiments of the disclosure.

FIG. 23 illustrates circuitry 2300 for a hardware accelerator for blockchain transaction acceleration according to embodiments of the disclosure. The following discusses one implementation of an incoming data (e.g., packet) flow, and there could be an associated, outgoing flow.

Overview of FIG. 23

FIG. 23 shows one implementation of circuitry 2300 for a blockchain accelerator. Other processing engines (e.g., and circuits) or configurations could be used if needed to meet different needs.

General Engine Operation

Each engine (2302, 2304, 2306, 2308, 2312) includes a circuit having a controller (e.g., control) and some number of compute circuit blocks (A, B, C, . . . ). In one embodiment, at reset time, a controller polls the bus (or interconnect) to discover what compute blocks are present. This could vary based on the application, performance needs, etc.

When data comes into (e.g., each) engine from the left, the respective controller first inspects the data to determine what computation steps are needed and sends the data to the first compute block that is called for. After the compute block is finished, the data goes back to the controller, which determines the next compute block needed, and repeats until no more processing is required. The data is then passed to the next engine or component.

If a controller determines that a compute block is needed but it is not present in the instance, or if any other unrecoverable error occurs, the data may be passed to the processor (e.g., CPU) 2305, for example, through an exception path (e.g., exception path 2311). This structure may provide for pipelining and scaling of the data to achieve throughput requirements.

Packet Processing Engine

The depicted packet processing engine 2302 (e.g., circuit 2340 thereof) takes packets off the network 2301 and handles reconstruction them into a (e.g., single) message. This may be a TCP/IP stack or something more specific to blockchain.

The types of compute blocks present may include (but is not limited to):

Packet deduplication
Packet reordering
Message reconstruction
Error recovery

In one embodiment, the compute blocks for packet processing circuit 2340 are those from packet processing circuit 2240 in FIG. 22, for example, buffers 2242, packet controller 2244, message aggregation buffers 2246, and message controller 2248. In one embodiment, controller 2344 is packet controller 2244 and/or message controller 2248. In one embodiment, circuitry 2300 couples directly to network 2301, e.g., not through a NIC.

Message Processing Engine (e.g., Dispatcher)

The depicted message processing engine 2304 (e.g., circuit 2350 thereof) takes reconstructed messages from the packet processing engine 2302 and performs processing, e.g., that is common to all message types. The types of compute blocks present may include (but is not limited to):

Decompression
Authentication (for example, performing digital signature operation(s), e.g., key recovery, key caching, signing, or signature verifying)

After the processing is done in a circuit (e.g., engine), its controller may determine the next engine (e.g., circuit) required based on the type of message (e.g., transaction, block, or peer type of message) and forward the message (e.g., and/or other data) to the appropriate engine of a plurality of engines (e.g., circuits). For example, each block of a blockchain may have one or more transactions and other payload (e.g., as show in FIG. 2 or FIG. 3). In one embodiment, a dispatcher (e.g., message processing engine 2304) routes (e.g., forwards) an operation (e.g., or a request for an action or message to cause an action) to one of a plurality of engines (e.g., accelerators or circuits) based on the type of operation (e.g., type of action requested), e.g., and based on the type of engine. In one embodiment, a block type of operation (e.g., block operation) includes checking that a previous block hash is correct and/or that the proof of work meets the requirements. In one embodiment, a transaction type of operation (e.g., transaction operation) includes checking that the sum of the inputs equals the sum of the outputs (e.g., for Bitcoin) or some other function for a different blockchain. In one embodiment, some circuitry may be duplicated in multiple engines, for example, a decompression circuit.

In one embodiment, the compute blocks for message processing circuit 2350 are those from message processing circuit 2250 in FIG. 22, for example, message header processing controller 2252, message processing queue 2254, and message dispatch controller 2256. In one embodiment, controller 2352 is message header processing controller 2252 and/or message dispatch controller 2256.

Transaction Processing Engine

The depicted transaction processing engine 2306 (e.g., circuit 2310 thereof) handles transaction type messages.

The types of compute blocks present may include (but is not limited to):

Deduplication
Public key recovery (e.g., once recovered the public key may be cached and reused for future transactions from the same originator)
Signature verification
Request missing transactions
Validate transaction Once processed, the transaction may be stored in the cache 2303 and/or sent to the processor (e.g., CPU) 2305.

In one embodiment, the compute blocks for transaction processing circuit 2310 are those from transaction processing circuit 2210 in FIG. 22, for example, transaction processing controller 2212, a cryptography circuit 2214, dependency checker 2216 (e.g., circuit), and an execution circuit(s) 2218. In one embodiment, controller 2332 is transaction processing controller 2212.

Block Processing Engine

The depicted block processing engine 2308 (e.g., circuit 2320 thereof) handles block type messages. The types of compute blocks present may include (but is not limited to):

Deduplication
Public key recovery (e.g., once recovered the public key may be cached and reused for future transactions from the same originator)
Signature verification
Request missing transactions
Validate block Once processed the block may be stored in the cache 2303 and/or sent to the processor (e.g., CPU) 2305.

In one embodiment, the compute blocks for block processing circuit 2320 are those from block processing circuit 2220 in FIG. 22, for example, block processing controller 2222, a cryptography circuit 2224, and a transaction checker 2226 (e.g., circuit). In one embodiment, controller 2322 is block processing controller 2222.

Peer Processing Engine

The depicted peer processing engine 2312 (e.g., circuit 2330 thereof) handles peer type messages.

The types of compute blocks present may include (but is not limited to):

Register peer
Unregister peer
Forward transaction/block to peer

In one embodiment, the compute blocks for peer processing circuit 2330 are those from peer processing circuit 2230 in FIG. 22, for example, peer processing controller 2232, peer information list storage 2234, peer to peer (p2p) response circuit 2236, and peer transaction list storage 2238. In one embodiment, controller 2332 is peer processing controller 2232.

Cache

The cache 2303 may store data for use by engines (e.g., circuits thereof).

Figure 24:
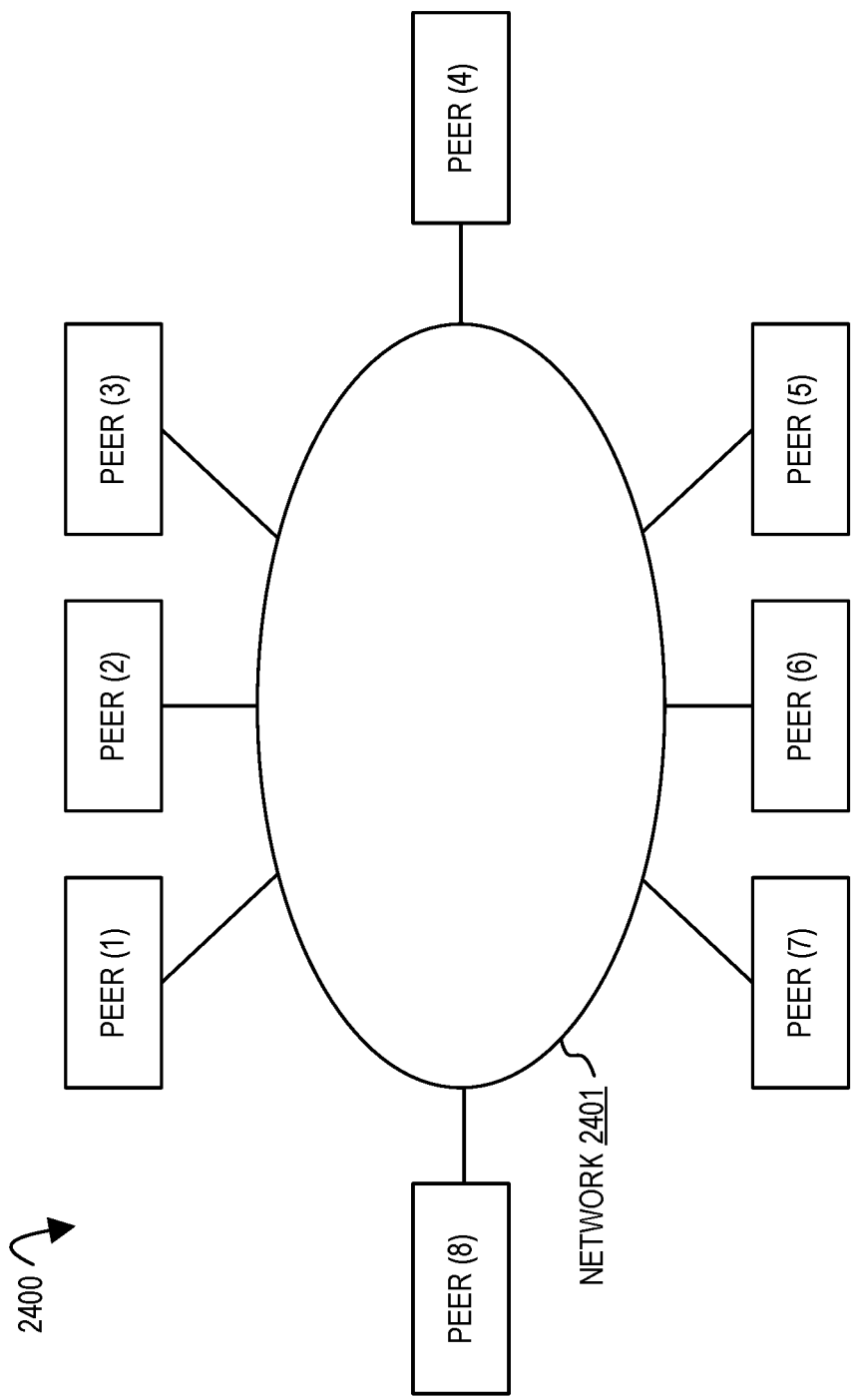
FIG. 24 illustrates a peer to peer network according to embodiments of the disclosure.

FIG. 24 illustrates a peer to peer network 2400 according to embodiments of the disclosure. Although FIG. 24 illustrates eight peer nodes coupled together by network 2401, any plurality of nodes may be coupled together by network(s). In one embodiment, a peer (e.g., peer (1)) includes an accelerator according to one or more embodiments herein and that peer (e.g., accelerator thereof) is to send and receive data on network 2401. In one embodiment, accelerator (e.g., a peer processing circuit thereof) is to send data (e.g., a missing transaction) to one or more (e.g., all of or all of the other of) the peers. In one embodiment, accelerator (e.g., a peer processing circuit thereof) is to send a request (e.g., request a missing transaction) to one or more (e.g., all of or all of the other of) the peers. In one embodiment, a first peer includes an accelerator according to one or more embodiments herein and that peer sends and/or receives data with a second peer or group of peers that each include an accelerator according to one or more embodiments herein. As one example, a first peer processing circuit of a first accelerator of a first peer may communicate over network 2401 with a second peer processing circuit of a second accelerator of a second peer, for example, such that peer to peer communications occurs (e.g., without involving (e.g., utilizing) a core of a processor at either of the first peer and the second peer). In one embodiment, one or more peers are full peer nodes. In one embodiment, a peer is a miner, e.g., a blockchain miner that produces a block of transactions.

Figure 25A:
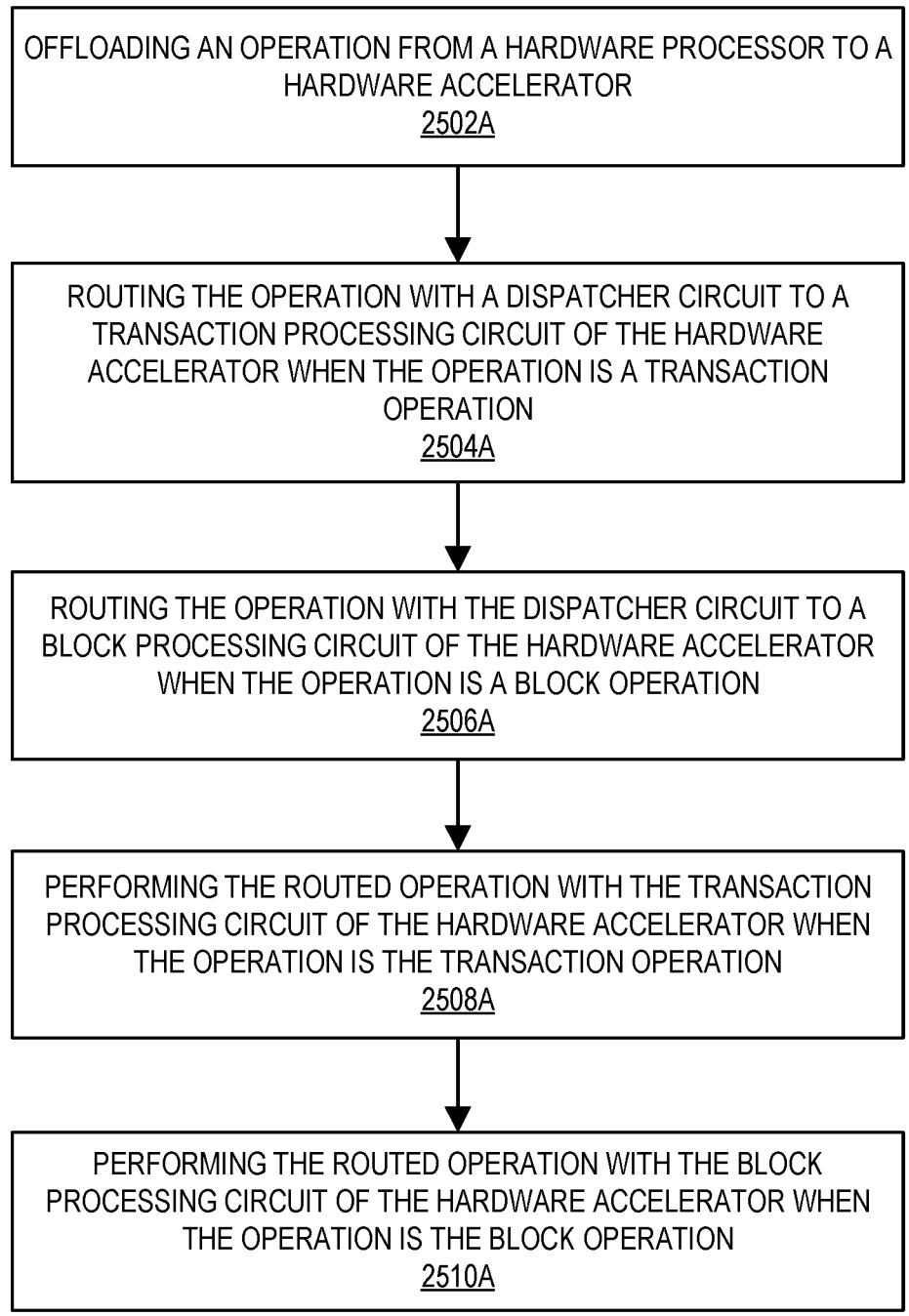
FIG. 25A illustrates a flow diagram according to embodiments of the disclosure.

FIG. 25A illustrates a flow diagram 2500A according to embodiments of the disclosure. Depicted flow 2500A includes offloading an operation from a hardware processor to a hardware accelerator 2502A; routing the operation with a dispatcher circuit to a transaction processing circuit of the hardware accelerator when the operation is a transaction operation 2504A; routing the operation with the dispatcher circuit to a block processing circuit of the hardware accelerator when the operation is a block operation 2506A; performing the routed operation with the transaction processing circuit of the hardware accelerator when the operation is the transaction operation 2508A; and performing the routed operation with the block processing circuit of the hardware accelerator when the operation is the block operation 2510A.

Figure 25B:
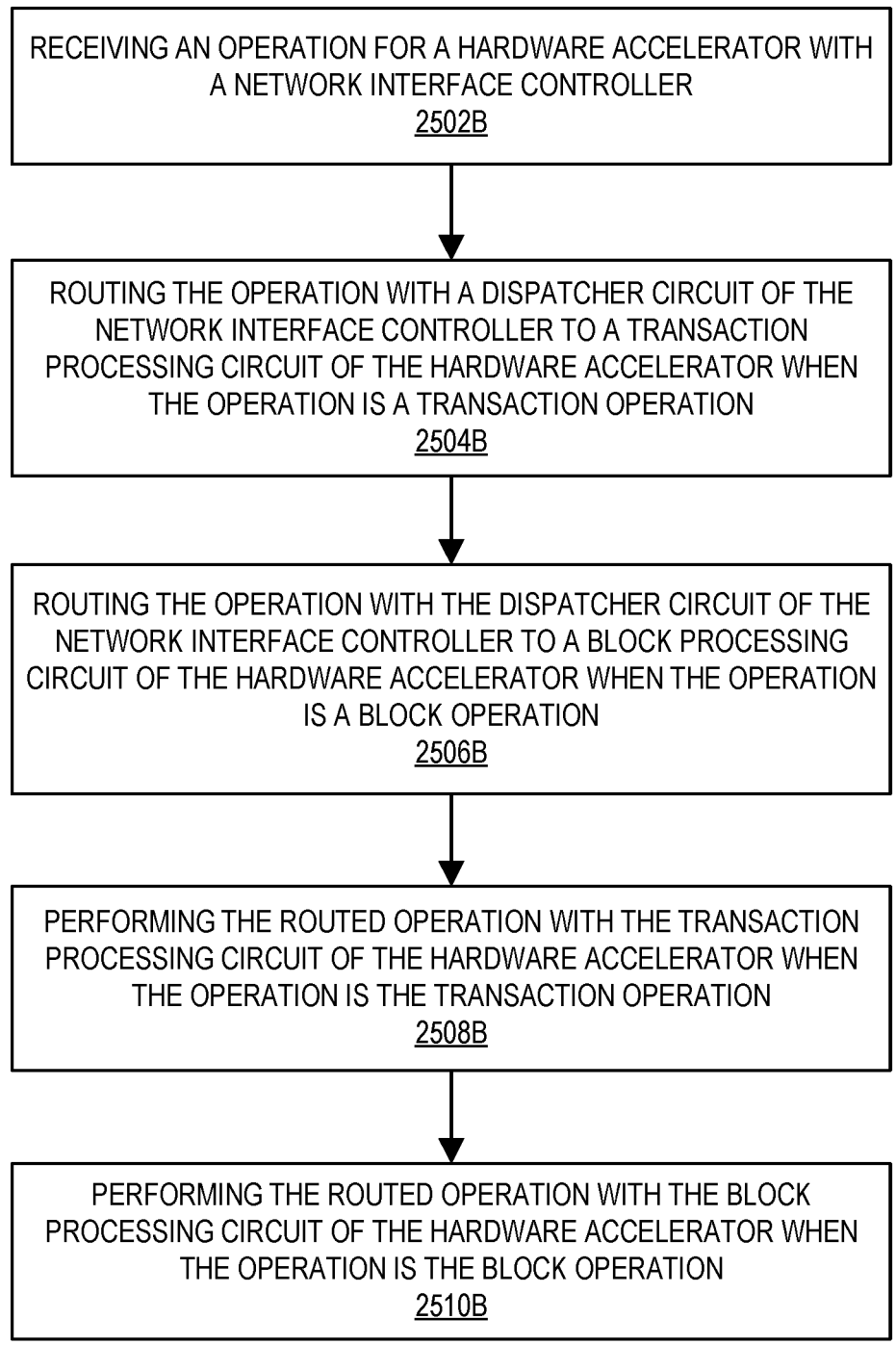
FIG. 25B illustrates a flow diagram according to embodiments of the disclosure.

FIG. 25B illustrates a flow diagram 2500B according to embodiments of the disclosure. Depicted flow 2500B includes receiving an operation for a hardware accelerator with a network interface controller 2502B; routing the operation with a dispatcher circuit of the network interface controller to a transaction processing circuit of the hardware accelerator when the operation is a transaction operation 2504B; routing the operation with the dispatcher circuit of the network interface controller to a block processing circuit of the hardware accelerator when the operation is a block operation 2506B; performing the routed operation with the transaction processing circuit of the hardware accelerator when the operation is the transaction operation 2508B; and performing the routed operation with the block processing circuit of the hardware accelerator when the operation is the block operation 2510B.

In one embodiment, an apparatus includes a core to execute a thread and offload an operation of a blockchain transaction; a transaction processing circuit of a hardware accelerator to execute an offloaded operation of a blockchain transaction; a block processing circuit of the hardware accelerator to execute an offloaded operation of a blockchain transaction; and a dispatcher circuit of the hardware accelerator to route an offloaded operation to the transaction processing circuit of the hardware accelerator when the offloaded operation is a transaction operation and route the offloaded operation to the block processing circuit of the hardware accelerator when the offloaded operation is a block operation. The dispatcher circuit may perform an initial processing for the offloaded operation before routing the offloaded operation, and the initial processing comprises a digital signature operation. The dispatcher circuit may route the offloaded operation to a peer processing circuit when the offloaded operation is a peer operation. The peer operation may include a request for a missing transaction of a block from peers. The peer operation may be causing the peer processing circuit to send a missing transaction of a block to peers. The transaction processing circuit may include a dependency checker is to check a transaction of the transaction operation for dependent transactions, and cause the peer processing circuit to retrieve any missing dependent transactions.

In another embodiment, a method includes offloading an operation from a hardware processor to a hardware accelerator; routing the operation with a dispatcher circuit to a transaction processing circuit of the hardware accelerator when the operation is a transaction operation; routing the operation with the dispatcher circuit to a block processing circuit of the hardware accelerator when the operation is a block operation; performing the routed operation with the transaction processing circuit of the hardware accelerator when the operation is the transaction operation; and performing the routed operation with the block processing circuit of the hardware accelerator when the operation is the block operation. The method may include performing an initial processing for the operation with the dispatcher circuit before routing the operation, wherein the initial processing comprises a digital signature operation. The method may include routing the operation with the dispatcher circuit to a peer processing circuit of the hardware accelerator when the operation is a peer operation; and performing the routed operation with the peer processing circuit of the hardware accelerator when the operation is the peer operation. The peer operation may include requesting a missing transaction of a block from peers. The peer operation may include sending a missing transaction of a block to peers. The method may include checking a transaction of the transaction operation for dependent transactions with a dependency checker of the transaction processing circuit, and the dependency checker causing the peer processing circuit to retrieve any missing dependent transactions.

In yet another embodiment, an apparatus includes a transaction processing circuit of a hardware accelerator to execute an operation of a blockchain transaction; a block processing circuit of the hardware accelerator to execute an operation of a blockchain transaction; and a network interface controller comprising a dispatcher circuit to route an operation to the transaction processing circuit of the hardware accelerator when the operation is a transaction operation and route the operation to a block processing circuit of the hardware accelerator when the operation is a block operation. The dispatcher circuit may perform an initial processing for the operation before routing the operation, and the initial processing comprises a digital signature operation. The dispatcher circuit may route the operation to a peer processing circuit when the operation is a peer operation. The peer operation may include a request for a missing transaction of a block from peers. The peer operation may be causing the peer processing circuit to send a missing transaction of a block to peers. The transaction processing circuit may include a dependency checker is to check a transaction of the transaction operation for dependent transactions, and cause the peer processing circuit to retrieve any missing dependent transactions.

In another embodiment, a method may include receiving an operation for a hardware accelerator with a network interface controller; routing the operation with a dispatcher circuit of the network interface controller to a transaction processing circuit of the hardware accelerator when the operation is a transaction operation; routing the operation with the dispatcher circuit of the network interface controller to a block processing circuit of the hardware accelerator when the operation is a block operation; performing the routed operation with the transaction processing circuit of the hardware accelerator when the operation is the transaction operation; and performing the routed operation with the block processing circuit of the hardware accelerator when the operation is the block operation. The method may include performing an initial processing for the operation with the dispatcher circuit before routing the operation, wherein the initial processing comprises a digital signature operation. The method may include routing the operation with the dispatcher circuit to a peer processing circuit of the hardware accelerator when the operation is a peer operation; and performing the routed operation with the peer processing circuit of the hardware accelerator when the operation is the peer operation. The peer operation may include requesting a missing transaction of a block from peers with the network interface controller. The peer operation may include sending a missing transaction of a block to peers with the network interface controller. The method may include checking a transaction of the transaction operation for dependent transactions with a dependency checker of the transaction processing circuit, and the dependency checker causing the peer processing circuit to retrieve any missing dependent transactions.

In one embodiment, a hardware processor includes a core to execute a thread and offload an operation of a blockchain transaction; and a hardware accelerator to execute the operation of the blockchain transaction, wherein the hardware accelerator comprises a dispatcher circuit to route the operation to a transaction processing circuit of the hardware accelerator when the operation is a transaction operation and route the operation to a block processing circuit of the hardware accelerator when the operation is a block operation. The dispatcher circuit may perform an initial processing for the operation before routing the operation. The initial processing may include digital signature operation(s), e.g., one or more of: key recovery for the operation, key caching, signing, or signature verifying. The dispatcher circuit may route the operation to a peer processing circuit when the operation is a peer operation. The peer operation may include requesting a missing transaction of a block from peers. The peer operation may include sending a missing transaction of a block to peers.

In another embodiment, a method includes offloading an operation from a hardware processor to a hardware accelerator; routing the operation with a dispatcher circuit to a transaction processing circuit of the hardware accelerator when the operation is a transaction operation; and routing the operation with the dispatcher circuit to a block processing circuit of the hardware accelerator when the operation is a block operation. The method may include performing an initial processing for the operation with the dispatcher circuit before routing the operation. The initial processing may include digital signature operation(s), e.g., one or more of: key recovery for the operation, key caching, signing, or signature verifying. The method may include routing the operation with the dispatcher circuit to a peer processing circuit of the hardware accelerator when the operation is a peer operation. The peer operation may include requesting a missing transaction of a block from peers. The peer operation may include sending a missing transaction of a block to peers. The method may include checking a transaction of the transaction operation for dependent transactions with a dependency checker of the transaction processing circuit, and the dependency checker causing the peer processing circuit to retrieve any missing dependent transactions.

In yet another embodiment, a hardware processor includes a hardware accelerator to execute an operation of a blockchain transaction; and a network interface controller comprising a dispatcher circuit to route the operation to a transaction processing circuit of the hardware accelerator when the operation is a transaction operation and route the operation to a block processing circuit of the hardware accelerator when the operation is a block operation. The dispatcher circuit may perform an initial processing for the operation before routing the operation. The initial processing may include digital signature operation(s), e.g., one or more of: key recovery for the operation, key caching, signing, or signature verifying. The dispatcher circuit may route the operation to a peer processing circuit when the operation is a peer operation. The peer operation may include requesting a missing transaction of a block from peers with the network interface controller. The peer operation may include sending a missing transaction of a block to peers with the network interface controller. The transaction processing circuit may include a dependency checker to check a transaction of the transaction operation for dependent transactions, and may cause the peer processing circuit to retrieve any missing dependent transactions.

In another embodiment, a method includes receiving an operation for a hardware accelerator with a network interface controller; routing the operation with a dispatcher circuit of the network interface controller to a transaction processing circuit of the hardware accelerator when the operation is a transaction operation; and routing the operation with the dispatcher circuit of the network interface controller to a block processing circuit of the hardware accelerator when the operation is a block operation. The method may include performing an initial processing for the operation with the dispatcher circuit before routing the operation. The initial processing may include digital signature operation(s), e.g., one or more of: key recovery for the operation, key caching, signing, or signature verifying. The method may include routing the operation with the dispatcher circuit to a peer processing circuit of the hardware accelerator when the operation is a peer operation. The peer operation may include requesting a missing transaction of a block from peers with the network interface controller. The peer operation may include sending a missing transaction of a block to peers with the network interface controller. The method may include checking a transaction of the transaction operation for dependent transactions with a dependency checker of the transaction processing circuit, and the dependency checker causing the peer processing circuit to retrieve any missing dependent transactions.

In yet another embodiment, a hardware processor includes a core to execute a thread and offload an operation of a blockchain transaction; and means to execute the operation of the blockchain transaction, wherein the means is to route the operation to a transaction processing circuit when the operation is a transaction operation and route the operation to a block processing circuit when the operation is a block operation.

In another embodiment, a hardware processor includes means to execute an operation of a blockchain transaction; and means to route the operation to a transaction processing circuit when the operation is a transaction operation and route the operation to a block processing circuit when the operation is a block operation.

In one embodiment, a system includes a hardware processor to execute a thread and offload an operation of a blockchain transaction; and a hardware accelerator to execute the operation of the blockchain transaction, wherein the hardware accelerator comprises a dispatcher circuit to route the operation to a transaction processing circuit of the hardware accelerator when the operation is a transaction operation and route the operation to a block processing circuit of the hardware accelerator when the operation is a block operation. The dispatcher circuit may perform an initial processing for the operation before routing the operation. The initial processing may include digital signature operation(s), e.g., one or more of: key recovery for the operation, key caching, signing, or signature verifying. The dispatcher circuit may route the operation to a peer processing circuit when the operation is a peer operation. The peer operation may include requesting a missing transaction of a block from peers. The peer operation may include sending a missing transaction of a block to peers. The transaction processing circuit may include a dependency checker to check a transaction of the transaction operation for dependent transactions, and may cause the peer processing circuit to retrieve any missing dependent transactions.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, July 2017; and see Intel® Architecture Instruction Set Extensions Programming Reference, April 2017).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 26A is a block diagram illustrating both an exemplary in-order pipeline and an exemplary register renaming, out-of-order issue/execution pipeline according to embodiments of the disclosure. FIG. 26B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 26A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 26A, a processor pipeline 2600 includes a fetch stage 2602, a length decode stage 2604, a decode stage 2606, an allocation stage 2608, a renaming stage 2610, a scheduling (also known as a dispatch or issue) stage 2612, a register read/memory read stage 2614, an execute stage 2616, a write back/memory write stage 2618, an exception handling stage 2622, and a commit stage 2624.

FIG. 26B shows processor core 2690 including a front end unit 2630 coupled to an execution engine unit 2650, and both are coupled to a memory unit 2670. The core 2690 may be a reduced instruction set computing (RISC) core, a complex instruction set computing (CISC) core, a very long instruction word (VLIW) core, or a hybrid or alternative core type. As yet another option, the core 2690 may be a special-purpose core, such as, for example, a network or communication core, compression engine, coprocessor core, general purpose computing graphics processing unit (GPGPU) core, graphics core, or the like.

The front end unit 2630 includes a branch prediction unit 2632 coupled to an instruction cache unit 2634, which is coupled to an instruction translation lookaside buffer (TLB) 2636, which is coupled to an instruction fetch unit 2638, which is coupled to a decode unit 2640. The decode unit 2640 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 2640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2690 includes a microcode ROM or other medium that stores microcode for certain macroinstructions (e.g., in decode unit 2640 or otherwise within the front end unit 2630). The decode unit 2640 is coupled to a rename/allocator unit 2652 in the execution engine unit 2650.

The execution engine unit 2650 includes the rename/allocator unit 2652 coupled to a retirement unit 2654 and a set of one or more scheduler unit(s) 2656. The scheduler unit(s) 2656 represents any number of different schedulers, including reservations stations, central instruction window, etc. The scheduler unit(s) 2656 is coupled to the physical register file(s) unit(s) 2658. Each of the physical register file(s) units 2658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2658 comprises a vector registers unit, a write mask registers unit, and a scalar registers unit. These register units may provide architectural vector registers, vector mask registers, and general purpose registers. The physical register file(s) unit(s) 2658 is overlapped by the retirement unit 2654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2654 and the physical register file(s) unit(s) 2658 are coupled to the execution cluster(s) 2660. The execution cluster(s) 2660 includes a set of one or more execution units 2662 and a set of one or more memory access units 2664. The execution units 2662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2656, physical register file(s) unit(s) 2658, and execution cluster(s) 2660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2664). It should also be understood that where separate pipelines are used, one or more of these pipelines may be out-of-order issue/execution and the rest in-order.

The set of memory access units 2664 is coupled to the memory unit 2670, which includes a data TLB unit 2672 coupled to a data cache unit 2674 coupled to a level 2 (L2) cache unit 2676. In one exemplary embodiment, the memory access units 2664 may include a load unit, a store address unit, and a store data unit, each of which is coupled to the data TLB unit 2672 in the memory unit 2670. The instruction cache unit 2634 is further coupled to a level 2 (L2) cache unit 2676 in the memory unit 2670. The L2 cache unit 2676 is coupled to one or more other levels of cache and eventually to a main memory.

By way of example, the exemplary register renaming, out-of-order issue/execution core architecture may implement the pipeline 2600 as follows: 1) the instruction fetch 2638 performs the fetch and length decoding stages 2602 and 2604; 2) the decode unit 2640 performs the decode stage 2606; 3) the rename/allocator unit 2652 performs the allocation stage 2608 and renaming stage 2610; 4) the scheduler unit(s) 2656 performs the schedule stage 2612; 5) the physical register file(s) unit(s) 2658 and the memory unit 2670 perform the register read/memory read stage 2614; the execution cluster 2660 perform the execute stage 2616; 6) the memory unit 2670 and the physical register file(s) unit(s) 2658 perform the write back/memory write stage 2618; 7) various units may be involved in the exception handling stage 2622; and 8) the retirement unit 2654 and the physical register file(s) unit(s) 2658 perform the commit stage 2624.

The core 2690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2634/2674 and a shared L2 cache unit 2676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 27B:
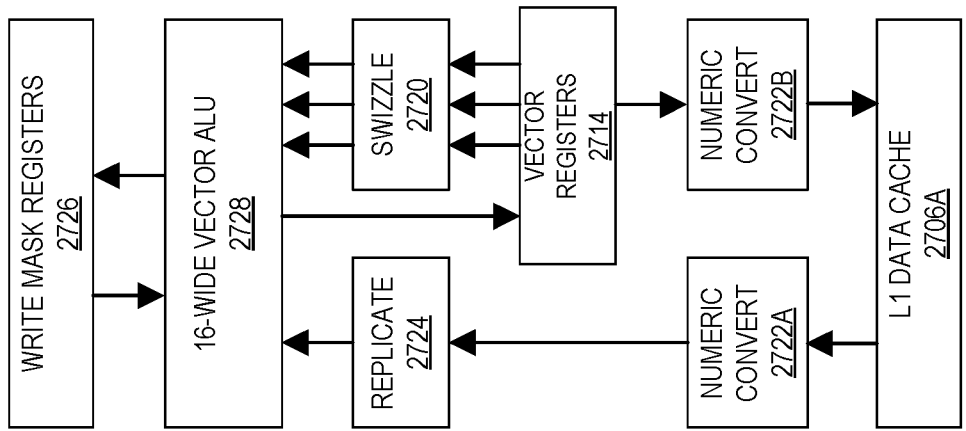
FIG. 27B is an expanded view of part of the processor core in FIG. 27A according to embodiments of the disclosure.
Figure 27A:
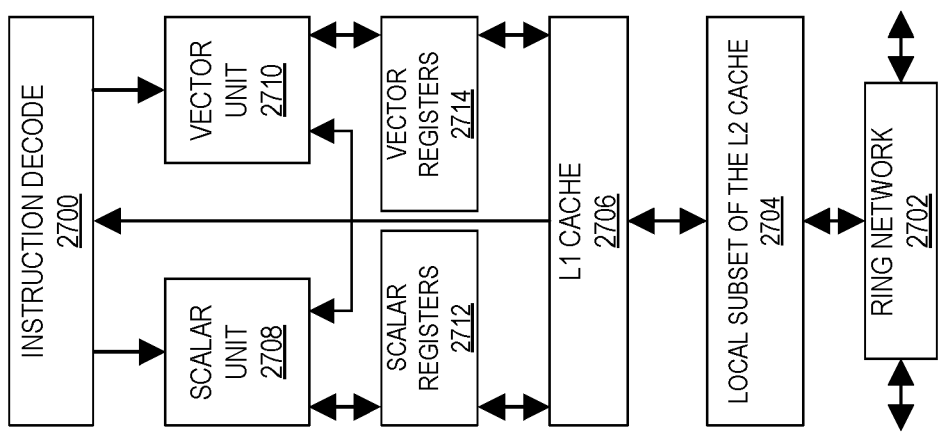
FIG. 27A is a block diagram of a single processor core, along with its connection to the on-die interconnect network and with its local subset of the Level 2 (L2) cache, according to embodiments of the disclosure.

FIGS. 27A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 27A is a block diagram of a single processor core, along with its connection to the on-die interconnect network 2702 and with its local subset of the Level 2 (L2) cache 2704, according to embodiments of the disclosure. In one embodiment, an instruction decode unit 2700 supports the x86 instruction set with a packed data instruction set extension. An L1 cache 2706 allows low-latency accesses to cache memory into the scalar and vector units. While in one embodiment (to simplify the design), a scalar unit 2708 and a vector unit 2710 use separate register sets (respectively, scalar registers 2712 and vector registers 2714) and data transferred between them is written to memory and then read back in from a level 1 (L1) cache 2706, alternative embodiments of the disclosure may use a different approach (e.g., use a single register set or include a communication path that allow data to be transferred between the two register files without being written and read back).

The local subset of the L2 cache 2704 is part of a global L2 cache that is divided into separate local subsets, one per processor core. Each processor core has a direct access path to its own local subset of the L2 cache 2704. Data read by a processor core is stored in its L2 cache subset 2704 and can be accessed quickly, in parallel with other processor cores accessing their own local L2 cache subsets. Data written by a processor core is stored in its own L2 cache subset 2704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 27B is an expanded view of part of the processor core in FIG. 27A according to embodiments of the disclosure. FIG. 27B includes an L1 data cache 2706A part of the L1 cache 2704, as well as more detail regarding the vector unit 2710 and the vector registers 2714. Specifically, the vector unit 2710 is a 16-wide vector processing unit (VPU) (see the 16-wide ALU 2728), which executes one or more of integer, single-precision float, and double-precision float instructions. The VPU supports swizzling the register inputs with swizzle unit 2720, numeric conversion with numeric convert units 2722A-B, and replication with replication unit 2724 on the memory input. Write mask registers 2726 allow predicating resulting vector writes.

Figure 28:
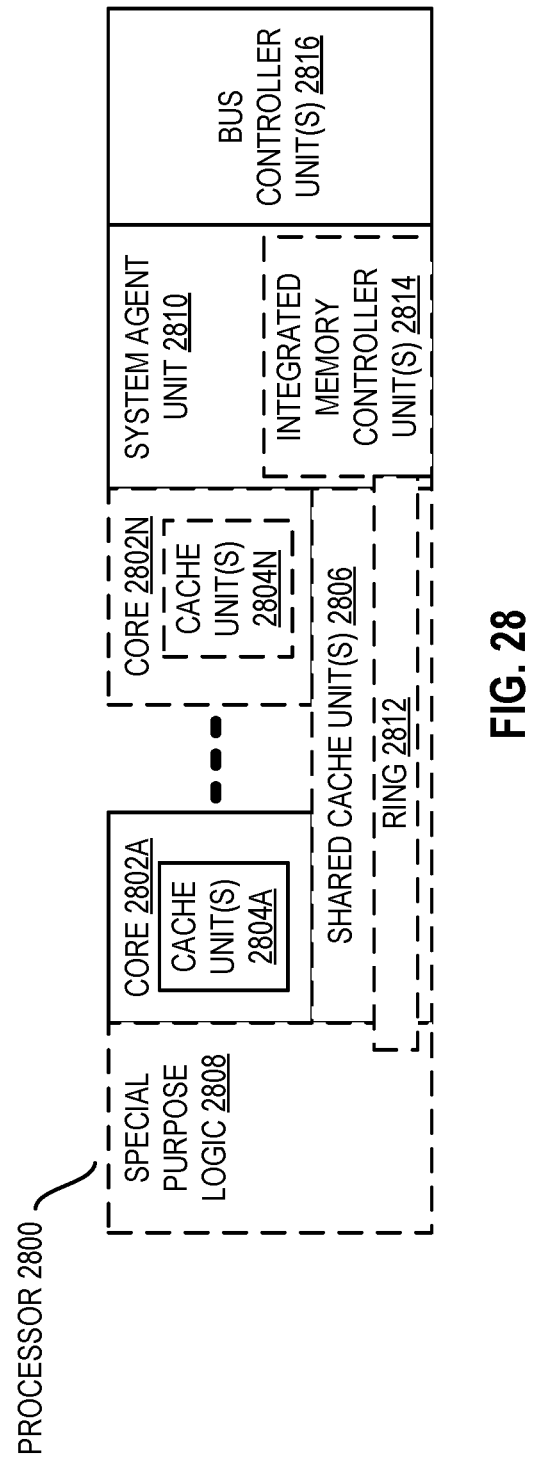
FIG. 28 is a block diagram of a processor that may have more than one core, may have an integrated memory controller, and may have integrated graphics according to embodiments of the disclosure.

FIG. 28 is a block diagram of a processor 2800 that may have more than one core, may have an integrated memory controller, and may have integrated graphics according to embodiments of the disclosure. The solid lined boxes in FIG. 28 illustrate a processor 2800 with a single core 2802A, a system agent 2810, a set of one or more bus controller units 2816, while the optional addition of the dashed lined boxes illustrates an alternative processor 2800 with multiple cores 2802A-N, a set of one or more integrated memory controller unit(s) 2814 in the system agent unit 2810, and special purpose logic 2808.

Thus, different implementations of the processor 2800 may include: 1) a CPU with the special purpose logic 2808 being integrated graphics and/or scientific (throughput) logic (which may include one or more cores), and the cores 2802A-N being one or more general purpose cores (e.g., general purpose in-order cores, general purpose out-of-order cores, a combination of the two); 2) a coprocessor with the cores 2802A-N being a large number of special purpose cores intended primarily for graphics and/or scientific (throughput); and 3) a coprocessor with the cores 2802A-N being a large number of general purpose in-order cores. Thus, the processor 2800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2806, and external memory (not shown) coupled to the set of integrated memory controller units 2814. The set of shared cache units 2806 may include one or more mid-level caches, such as level 2 (L2), level 3 (L3), level 4 (L4), or other levels of cache, a last level cache (LLC), and/or combinations thereof. While in one embodiment a ring based interconnect unit 2812 interconnects the integrated graphics logic 2808, the set of shared cache units 2806, and the system agent unit 2810/integrated memory controller unit(s) 2814, alternative embodiments may use any number of well-known techniques for interconnecting such units. In one embodiment, coherency is maintained between one or more cache units 2806 and cores 2802-A-N.

In some embodiments, one or more of the cores 2802A-N are capable of multi-threading. The system agent 2810 includes those components coordinating and operating cores 2802A-N. The system agent unit 2810 may include for example a power control unit (PCU) and a display unit. The PCU may be or include logic and components needed for regulating the power state of the cores 2802A-N and the integrated graphics logic 2808. The display unit is for driving one or more externally connected displays.

The cores 2802A-N may be homogenous or heterogeneous in terms of architecture instruction set; that is, two or more of the cores 2802A-N may be capable of execution the same instruction set, while others may be capable of executing only a subset of that instruction set or a different instruction set.

Exemplary Computer Architectures

FIGS. 29-32 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 29:
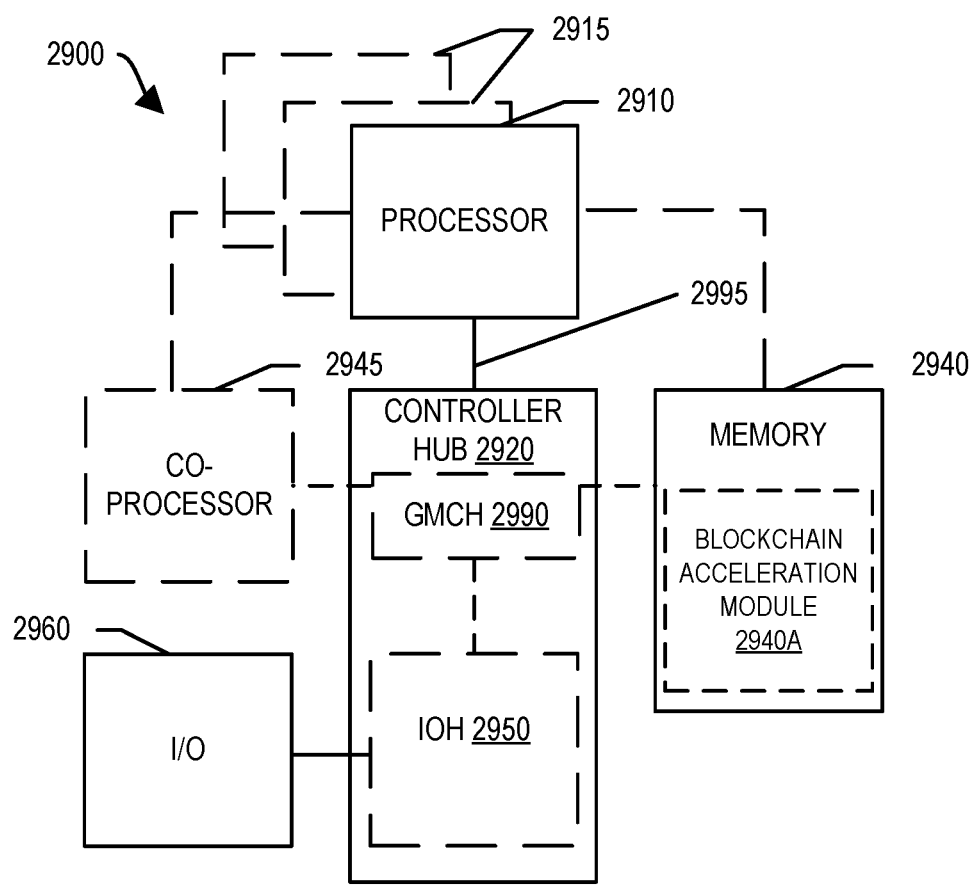
FIG. 29 is a block diagram of a system in accordance with one embodiment of the present disclosure.

Referring now to FIG. 29, shown is a block diagram of a system 2900 in accordance with one embodiment of the present disclosure. The system 2900 may include one or more processors 2910, 2915, which are coupled to a controller hub 2920. In one embodiment the controller hub 2920 includes a graphics memory controller hub (GMCH) 2990 and an Input/Output Hub (IOH) 2950 (which may be on separate chips); the GMCH 2990 includes memory and graphics controllers to which are coupled memory 2940 and a coprocessor 2945; the IOH 2950 is couples input/output (I/O) devices 2960 to the GMCH 2990. Alternatively, one or both of the memory and graphics controllers are integrated within the processor (as described herein), the memory 2940 and the coprocessor 2945 are coupled directly to the processor 2910, and the controller hub 2920 in a single chip with the IOH 2950. Memory 2940 may include a blockchain acceleration module 2940A, for example, to store code that when executed causes a processor to perform any method of this disclosure.

The optional nature of additional processors 2915 is denoted in FIG. 29 with broken lines. Each processor 2910, 2915 may include one or more of the processing cores described herein and may be some version of the processor 2800.

The memory 2940 may be, for example, dynamic random access memory (DRAM), phase change memory (PCM), or a combination of the two. For at least one embodiment, the controller hub 2920 communicates with the processor(s) 2910, 2915 via a multi-drop bus, such as a frontside bus (FSB), point-to-point interface such as QuickPath Interconnect (QPI), or similar connection 2995.

In one embodiment, the coprocessor 2945 is a special-purpose processor, such as, for example, a high-throughput MIC processor, a network or communication processor, compression engine, graphics processor, GPGPU, embedded processor, or the like. In one embodiment, controller hub 2920 may include an integrated graphics accelerator.

There can be a variety of differences between the physical resources 2910, 2915 in terms of a spectrum of metrics of merit including architectural, microarchitectural, thermal, power consumption characteristics, and the like.

In one embodiment, the processor 2910 executes instructions that control data processing operations of a general type. Embedded within the instructions may be coprocessor instructions. The processor 2910 recognizes these coprocessor instructions as being of a type that should be executed by the attached coprocessor 2945. Accordingly, the processor 2910 issues these coprocessor instructions (or control signals representing coprocessor instructions) on a coprocessor bus or other interconnect, to coprocessor 2945. Coprocessor (s) 2945 accept and execute the received coprocessor instructions.

Figure 30:
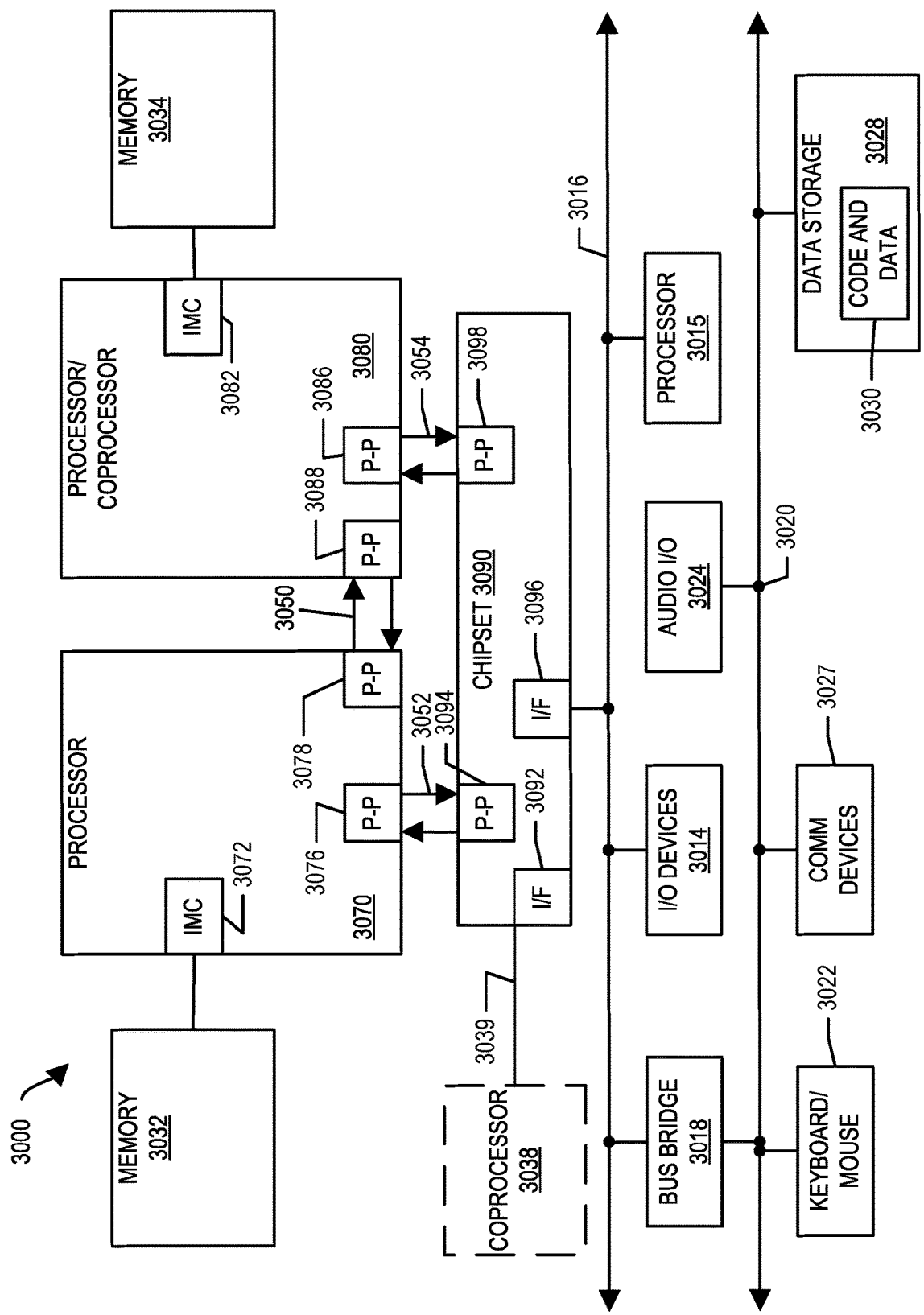
FIG. 30 is a block diagram of a more specific exemplary system in accordance with an embodiment of the present disclosure.

Referring now to FIG. 30, shown is a block diagram of a first more specific exemplary system 3000 in accordance with an embodiment of the present disclosure. As shown in FIG. 30, multiprocessor system 3000 is a point-to-point interconnect system, and includes a first processor 3070 and a second processor 3080 coupled via a point-to-point interconnect 3050. Each of processors 3070 and 3080 may be some version of the processor 2800. In one embodiment of the disclosure, processors 3070 and 3080 are respectively processors 2910 and 2915, while coprocessor 3038 is coprocessor 2945. In another embodiment, processors 3070 and 3080 are respectively processor 2910 coprocessor 2945.

Processors 3070 and 3080 are shown including integrated memory controller (IMC) units 3072 and 3082, respectively. Processor 3070 also includes as part of its bus controller units point-to-point (P-P) interfaces 3076 and 3078; similarly, second processor 3080 includes P-P interfaces 3086 and 3088. Processors 3070, 3080 may exchange information via a point-to-point (P-P) interface 3050 using P-P interface circuits 3078, 3088. As shown in FIG. 30, IMCs 3072 and 3082 couple the processors to respective memories, namely a memory 3032 and a memory 3034, which may be portions of main memory locally attached to the respective processors.

Processors 3070, 3080 may each exchange information with a chipset 3090 via individual P-P interfaces 3052, 3054 using point to point interface circuits 3076, 3094, 3086, 3098. Chipset 3090 may optionally exchange information with the coprocessor 3038 via a high-performance interface 3039. In one embodiment, the coprocessor 3038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3090 may be coupled to a first bus 3016 via an interface 3096. In one embodiment, first bus 3016 may be a Peripheral Component Interconnect (PCI) bus, or a bus such as a PCI Express bus or another third generation I/O interconnect bus, although the scope of the present disclosure is not so limited.

As shown in FIG. 30, various I/O devices 3014 may be coupled to first bus 3016, along with a bus bridge 3018 which couples first bus 3016 to a second bus 3020. In one embodiment, one or more additional processor(s) 3015, such as coprocessors, high-throughput MIC processors, GPGPU's, accelerators (such as, e.g., graphics accelerators or digital signal processing (DSP) units), field programmable gate arrays, or any other processor, are coupled to first bus 3016. In one embodiment, second bus 3020 may be a low pin count (LPC) bus. Various devices may be coupled to a second bus 3020 including, for example, a keyboard and/or mouse 3022, communication devices 3027 and a storage unit 3028 such as a disk drive or other mass storage device which may include instructions/code and data 3030, in one embodiment. Further, an audio I/O 3024 may be coupled to the second bus 3020. Note that other architectures are possible. For example, instead of the point-to-point architecture of FIG. 30, a system may implement a multi-drop bus or other such architecture.

Figure 31:
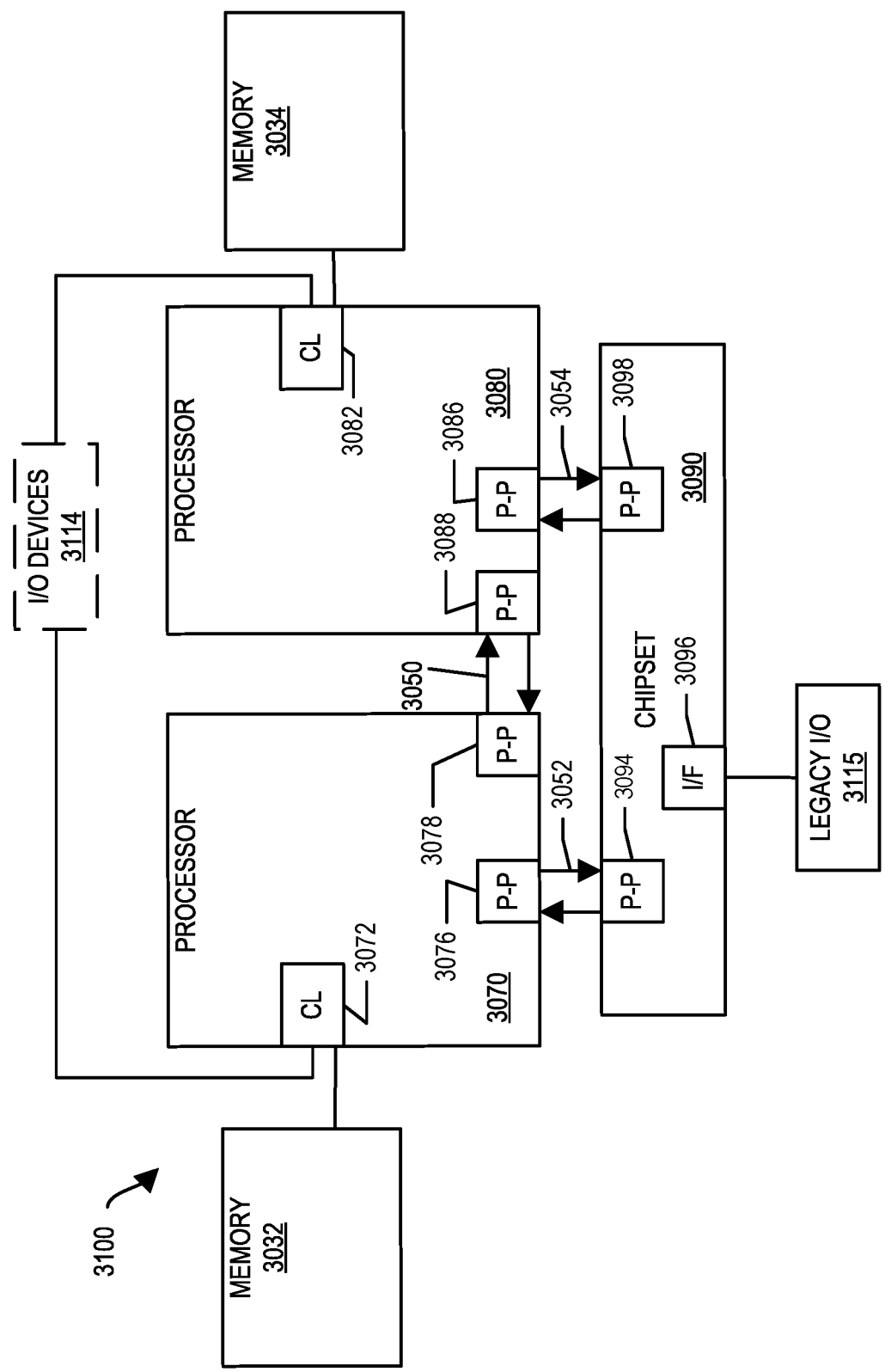
FIG. 31, shown is a block diagram of a second more specific exemplary system in accordance with an embodiment of the present disclosure.

Referring now to FIG. 31, shown is a block diagram of a second more specific exemplary system 3100 in accordance with an embodiment of the present disclosure. Like elements in FIGS. 30 and 31 bear like reference numerals, and certain aspects of FIG. 30 have been omitted from FIG. 31 in order to avoid obscuring other aspects of FIG. 31.

FIG. 31 illustrates that the processors 3070, 3080 may include integrated memory and I/O control logic ("CL") 3072 and 3082, respectively. Thus, the CL 3072, 3082 include integrated memory controller units and include I/O control logic. FIG. 31 illustrates that not only are the memories 3032, 3034 coupled to the CL 3072, 3082, but also that I/O devices 3114 are also coupled to the control logic 3072, 3082. Legacy I/O devices 3115 are coupled to the chipset 3090.

Figure 32:
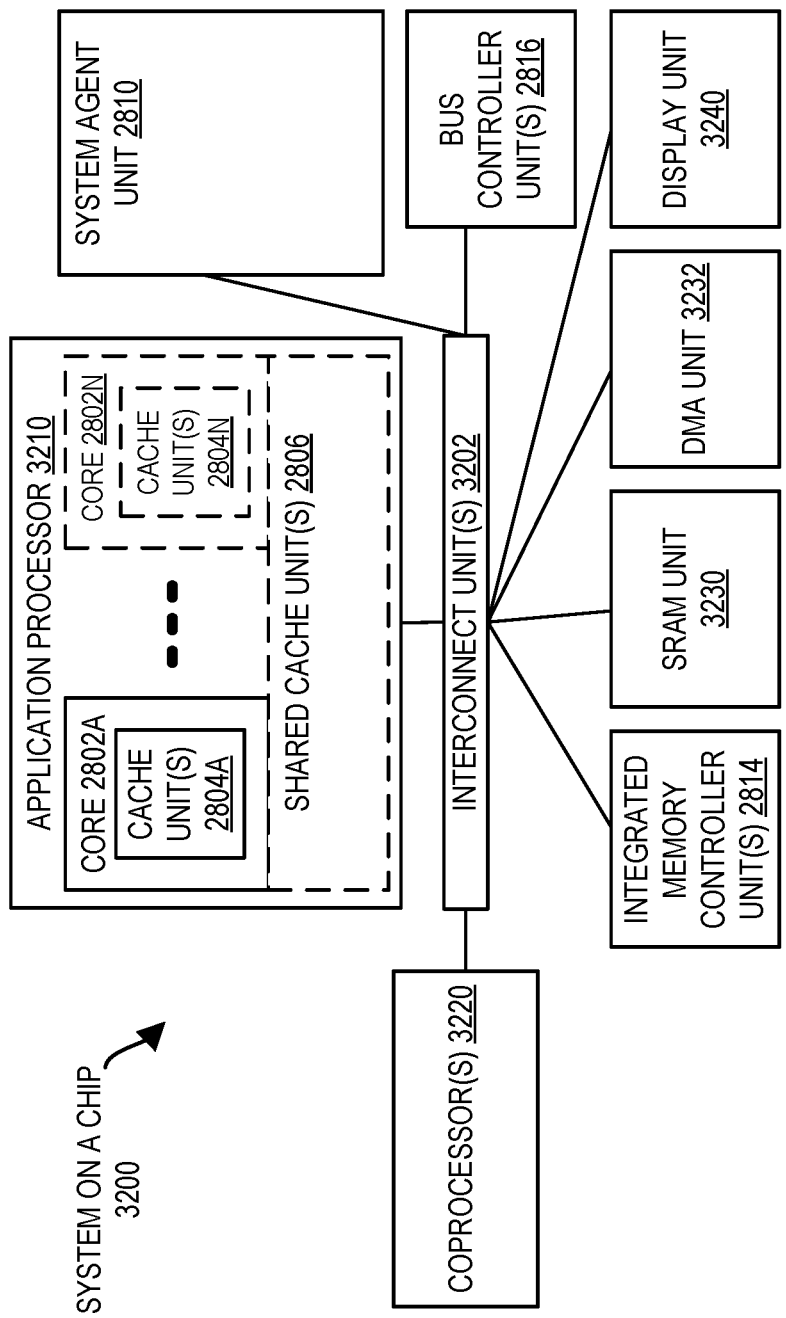
FIG. 32, shown is a block diagram of a system on a chip (SoC) in accordance with an embodiment of the present disclosure.

Referring now to FIG. 32, shown is a block diagram of a SoC 3200 in accordance with an embodiment of the present disclosure. Similar elements in FIG. 28 bear like reference numerals. Also, dashed lined boxes are optional features on more advanced SoCs. In FIG. 32, an interconnect unit(s) 3202 is coupled to: an application processor 3210 which includes a set of one or more cores 202A-N and shared cache unit(s) 2806; a system agent unit 2810; a bus controller unit(s) 2816; an integrated memory controller unit(s) 2814; a set or one or more coprocessors 3220 which may include integrated graphics logic, an image processor, an audio processor, and a video processor; an static random access memory (SRAM) unit 3230; a direct memory access (DMA) unit 3232; and a display unit 3240 for coupling to one or more external displays. In one embodiment, the coprocessor(s) 3220 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 3030 illustrated in FIG. 30, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 33:
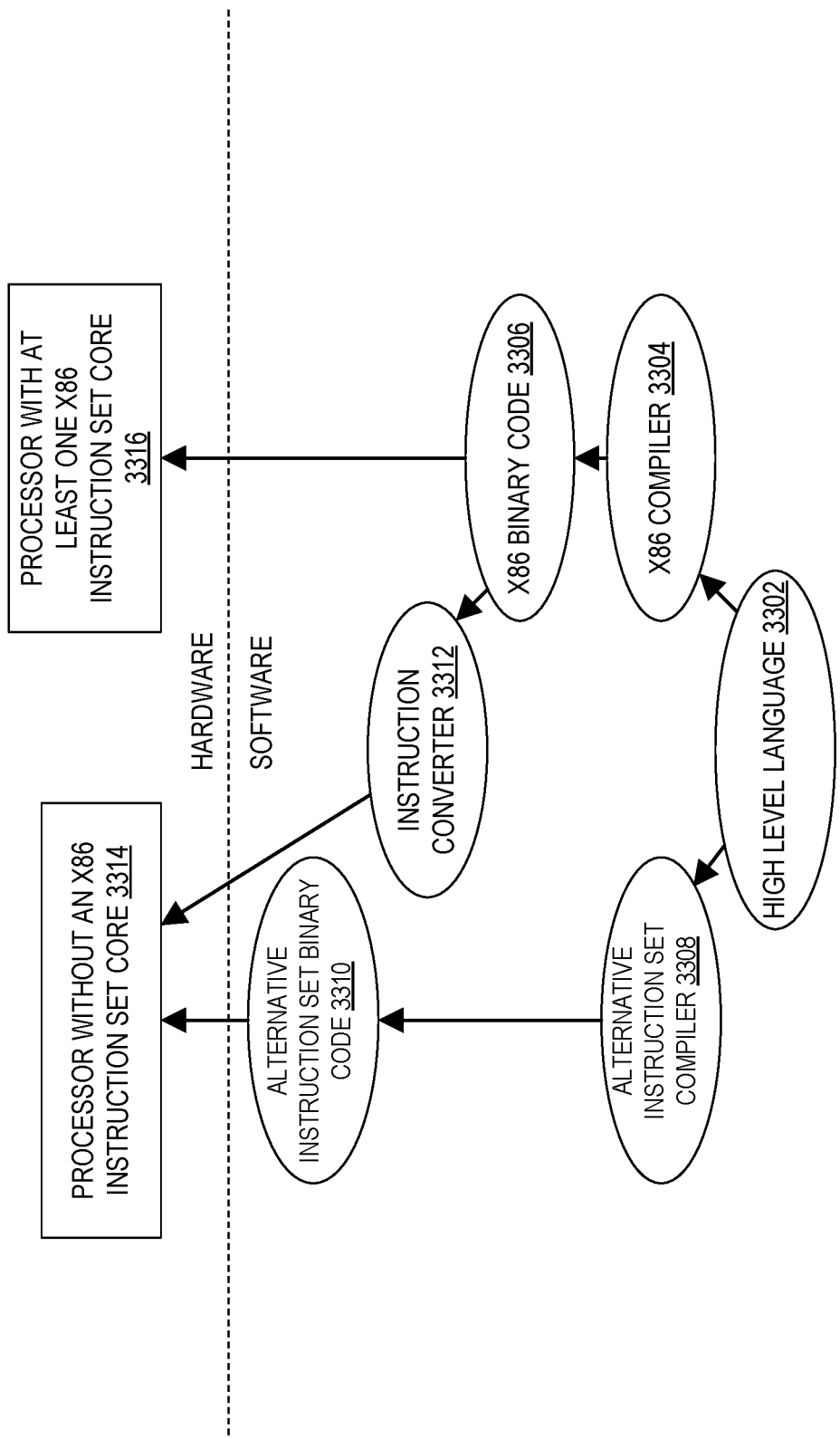
FIG. 33 is a block diagram contrasting the use of a software instruction converter to convert binary instructions in a source instruction set to binary instructions in a target instruction set according to embodiments of the disclosure.

FIG. 33 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 33 shows a program in a high level language 3302 may be compiled using an x86 compiler 3304 to generate x86 binary code 3306 that may be natively executed by a processor with at least one x86 instruction set core 3316. The processor with at least one x86 instruction set core 3316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3304 represents a compiler that is operable to generate x86 binary code 3306 (e.g., object code) that can, with or without additional linkage processing, be executed on the processor with at least one x86 instruction set core 3316. Similarly, FIG. 33 shows the program in the high level language 3302 may be compiled using an alternative instruction set compiler 3308 to generate alternative instruction set binary code 3310 that may be natively executed by a processor without at least one x86 instruction set core 3314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3312 is used to convert the x86 binary code 3306 into code that may be natively executed by the processor without an x86 instruction set core 3314. This converted code is not likely to be the same as the alternative instruction set binary code 3310 because an instruction converter capable of this is difficult to make; however, the converted code will accomplish the general operation and be made up of instructions from the alternative instruction set. Thus, the instruction converter 3312 represents software, firmware, hardware, or a combination thereof that, through emulation, simulation or any other process, allows a processor or other electronic device that does not have an x86 instruction set processor or core to execute the x86 binary code 3306.

What is claimed is:

1. An apparatus comprising:
   a core to execute a thread and offload an operation of a blockchain transaction;
   a transaction processing circuit of a hardware accelerator to execute an offloaded operation of a blockchain transaction;
   a block processing circuit of the hardware accelerator to execute an offloaded operation of a blockchain transaction; and
   a dispatcher circuit of the hardware accelerator to route an offloaded operation to a controller of the transaction processing circuit of the hardware accelerator when the offloaded operation is a transaction operation and route the offloaded operation to a controller of the block processing circuit of the hardware accelerator when the offloaded operation is a block operation, wherein the controller of the transaction processing circuit is to determine a compute circuit block of a plurality of different types of compute blocks of the transaction processing circuit to be used and send the transaction operation to the compute circuit block if available and to the core if not available, and the controller of the block processing circuit is to determine a compute circuit block of a plurality of different types of compute blocks of the block processing circuit to be used and send the block operation to the compute circuit block if available and to the core if not available.

2. The apparatus of claim 1, wherein the dispatcher circuit is to perform an initial processing for the offloaded operation before routing the offloaded operation, and the initial processing comprises a digital signature operation.

3. The apparatus of claim 1, wherein the dispatcher circuit is to route the offloaded operation to a peer processing circuit when the offloaded operation is a peer operation.

4. The apparatus of claim 3, wherein the peer operation is a request for a missing transaction of a block from peers.

5. The apparatus of claim 3, wherein the peer operation is to cause the peer processing circuit to send a missing transaction of a block to peers.

6. The apparatus of claim 3, wherein the transaction processing circuit comprises a dependency checker to check a transaction of the transaction operation for dependent transactions, and cause the peer processing circuit to retrieve any missing dependent transactions.

7. A method comprising:
offloading an operation from a hardware processor to a hardware accelerator;
routing the operation with a dispatcher circuit to a controller of a transaction processing circuit of the hardware accelerator when the operation is a transaction operation;
routing the operation with the dispatcher circuit to a controller of a block processing circuit of the hardware accelerator when the operation is a block operation;
determining, by the controller of the transaction processing circuit, a compute circuit block of a plurality of different types of compute blocks of the transaction processing circuit to be used;
sending the transaction operation to the compute circuit block of the transaction processing circuit if available and to the hardware processor if not available;
determining, by the controller of the block processing circuit, a compute circuit block of a plurality of different types of compute blocks of the block processing circuit to be used;
sending the block operation to the compute circuit block of the block processing circuit if available and to the hardware processor if not available;
performing the routed operation with the compute circuit block of the transaction processing circuit of the hardware accelerator when the operation is the transaction operation and the compute circuit block of the transaction processing circuit is available; and
performing the routed operation with the compute circuit block of the block processing circuit of the hardware accelerator when the operation is the block operation and the compute circuit block of the block processing circuit is available.

8. The method of claim 7, further comprising performing an initial processing for the operation with the dispatcher circuit before routing the operation, wherein the initial processing comprises a digital signature operation.

9. The method of claim 7, further comprising routing the operation with the dispatcher circuit to a peer processing circuit of the hardware accelerator when the operation is a peer operation; and performing the routed operation with the peer processing circuit of the hardware accelerator when the operation is the peer operation.

10. The method of claim 9, wherein the peer operation comprises requesting a missing transaction of a block from peers.

11. The method of claim 9, wherein the peer operation comprises sending a missing transaction of a block to peers.

12. The method of claim 9, further comprising checking a transaction of the transaction operation for dependent transactions with a dependency checker of the transaction processing circuit, and the dependency checker causing the peer processing circuit to retrieve any missing dependent transactions.

13. An apparatus comprising:
a transaction processing circuit of a hardware accelerator to execute an operation of a blockchain transaction;
a block processing circuit of the hardware accelerator to execute an operation of a blockchain transaction; and
a network interface controller comprising a dispatcher circuit to route an operation to a controller of the transaction processing circuit of the hardware accelerator when the operation is a transaction operation and route the operation to a controller of the block processing circuit of the hardware accelerator when the operation is a block operation, wherein the controller of the transaction processing circuit is to determine a compute circuit block of a plurality of different types of compute blocks of the transaction processing circuit to be used and send the transaction operation to the compute circuit block if available and from the transaction processing circuit if not available, and the controller of the block processing circuit is to determine a compute circuit block of a plurality of different types of compute blocks of the block processing circuit to be used and send the block operation to the compute circuit block if available and from the block processing circuit if not available.

14. The apparatus of claim 13, wherein the dispatcher circuit is to perform an initial processing for the operation before routing the operation, and the initial processing comprises a digital signature operation.

15. The apparatus of claim 13, wherein the dispatcher circuit is to route the operation to a peer processing circuit when the operation is a peer operation.

16. The apparatus of claim 15, wherein the peer operation is a request for a missing transaction of a block from peers.

17. The apparatus of claim 15, wherein the peer operation is to cause the peer processing circuit to send a missing transaction of a block to peers.

18. The apparatus of claim 15, wherein the transaction processing circuit comprises a dependency checker to check a transaction of the transaction operation for dependent transactions, and cause the peer processing circuit to retrieve any missing dependent transactions.

19. A method comprising:
receiving an operation for a hardware accelerator with a network interface controller;
routing the operation with a dispatcher circuit of the network interface controller to a controller of a transaction processing circuit of the hardware accelerator when the operation is a transaction operation;
routing the operation with the dispatcher circuit of the network interface controller to a controller of a block processing circuit of the hardware accelerator when the operation is a block operation;

determining, by the controller of the transaction processing circuit, a compute circuit block of a plurality of different types of compute blocks of the transaction processing circuit to be used;

sending the transaction operation to the compute circuit block of the transaction processing circuit if available and from the transaction processing circuit if not available;

determining, by the controller of the block processing circuit, a compute circuit block of a plurality of different types of compute blocks of the block processing circuit to be used;

sending the block operation to the compute circuit block of the block processing circuit if available and from the block processing circuit if not available;

performing the routed operation with the compute circuit block of the transaction processing circuit of the hardware accelerator when the operation is the transaction operation and the compute circuit block of the transaction processing circuit is available; and performing the routed operation with the compute circuit block of the block processing circuit of the hardware accelerator when the operation is the block operation and the compute circuit block of the block processing circuit is available.

20. The method of claim 19, further comprising performing an initial processing for the operation with the dispatcher circuit before routing the operation, wherein the initial processing comprises a digital signature operation.

21. The method of claim 19, further comprising routing the operation with the dispatcher circuit to a peer processing circuit of the hardware accelerator when the operation is a peer operation; and performing the routed operation with the peer processing circuit of the hardware accelerator when the operation is the peer operation.

22. The method of claim 21, wherein the peer operation comprises requesting a missing transaction of a block from peers with the network interface controller.

23. The method of claim 21, wherein the peer operation comprises sending a missing transaction of a block to peers with the network interface controller.

24. The method of claim 21, further comprising checking a transaction of the transaction operation for dependent transactions with a dependency checker of the transaction processing circuit, and the dependency checker causing the peer processing circuit to retrieve any missing dependent transactions.

* * * * *